US011333948B2

(12) United States Patent
Dixit et al.

(10) Patent No.: US 11,333,948 B2
(45) Date of Patent: May 17, 2022

(54) ELECTROCHROMIC DEVICES ON NON-RECTANGULAR SHAPES

(71) Applicant: View, Inc., Milpitas, CA (US)

(72) Inventors: Abhishek Anant Dixit, Collierville, TN (US); Todd Martin, Mountain View, CA (US); Anshu A. Pradhan, Collierville, TN (US); Gordon Jack, San Jose, CA (US); Yashraj Bhatnagar, Santa Clara, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 16/579,778

(22) Filed: Sep. 23, 2019

(65) Prior Publication Data

US 2020/0041860 A1    Feb. 6, 2020

Related U.S. Application Data

(62) Division of application No. 14/893,505, filed as application No. PCT/US2014/042819 on Jun. 17, 2014, now Pat. No. 10,481,458.
(Continued)

(51) Int. Cl.
*G02F 1/163* (2006.01)
*G02F 1/153* (2006.01)
(Continued)

(52) U.S. Cl.
CPC .......... *G02F 1/163* (2013.01); *B23K 26/082* (2015.10); *B29C 59/16* (2013.01); *G01B 21/02* (2013.01);
(Continued)

(58) Field of Classification Search
CPC .......... G02F 1/163; G02F 1/155; G02F 1/153; G02F 1/1533; G02F 1/0121; G02F 1/1524; G02F 1/13439; G02F 2001/1536; G02F 2201/122; G02F 2001/1555; G02F 2001/15145; G02F 2001/164; G02F 2203/01; G02F 1/13306; G02F 1/13318; G02F 1/1345; G02F 1/15165; G02F 1/157; G02F 2201/14; G02F 2202/16
(Continued)

(56) References Cited

U.S. PATENT DOCUMENTS 4,878,743 A    11/1989  Aikawa et al.
5,076,673 A    12/1991  Lynam et al.
(Continued)

FOREIGN PATENT DOCUMENTS

CN    1936711 A    3/2007
CN    102237446 A    11/2011
(Continued)

OTHER PUBLICATIONS

U.S. Notice of Allowance dated Mar. 11, 2010 for U.S. Appl. No. 12/212,482.
(Continued)

*Primary Examiner* — Brandi N Thomas
(74) *Attorney, Agent, or Firm* — Weaver Austin Villeneuve & Sampson LLP; Brian D. Griedel

(57) ABSTRACT

Bus bar configurations and fabrication methods for non-rectangular shaped (e.g., triangular, trapezoidal, circular, pentagonal, hexagonal, arched, etc.) optical devices.

15 Claims, 40 Drawing Sheets

Related U.S. Application Data

(60) Provisional application No. 61/836,602, filed on Jun. 18, 2013, provisional application No. 61/859,131, filed on Jul. 26, 2013, provisional application No. 61/862,928, filed on Aug. 6, 2013.

(51) Int. Cl.
*B23K 26/082* (2014.01)
*B29C 59/16* (2006.01)
*G01B 21/02* (2006.01)
*G01B 21/20* (2006.01)
*G02B 27/00* (2006.01)
*B29L 11/00* (2006.01)

(52) U.S. Cl.
CPC ......... *G01B 21/20* (2013.01); *G02B 27/0012* (2013.01); *G02F 1/153* (2013.01); *G02F 1/1533* (2013.01); *B29L 2011/00* (2013.01); *G02F 2201/56* (2013.01)

(58) Field of Classification Search
USPC ........ 359/237, 265–267, 273–275, 290–292, 359/315–321
See application file for complete search history.

(56) References Cited

U.S. PATENT DOCUMENTS

| | | | |
|---|---|---|---|
| 5,140,455 A | 8/1992 | Varaprasad et al. |
| 5,142,407 A | 8/1992 | Varaprasad et al. |
| 5,145,609 A | 9/1992 | Varaprasad et al. |
| 5,151,816 A | 9/1992 | Varaprasad et al. |
| 5,187,607 A | 2/1993 | Endo et al. |
| 5,233,461 A | 8/1993 | Dornan et al. |
| 5,239,405 A | 8/1993 | Varaprasad et al. |
| 5,340,503 A | 8/1994 | Varaprasad et al. |
| 5,379,146 A | 1/1995 | Defendini |
| 5,471,338 A | 11/1995 | Yu et al. |
| 5,472,643 A | 12/1995 | Varaprasad et al. |
| 5,500,760 A | 3/1996 | Varaprasad et al. |
| 5,567,360 A | 10/1996 | Varaprasad et al. |
| 5,657,149 A | 8/1997 | Buffat et al. |
| 5,657,150 A | 8/1997 | Kailman et al. |
| 5,668,663 A | 9/1997 | Varaprasad et al. |
| 5,724,175 A | 3/1998 | Hichwa et al. |
| 5,724,187 A | 3/1998 | Varaprasad et al. |
| 5,805,330 A | 9/1998 | Byker et al. |
| 5,805,367 A | 9/1998 | Kanazawa |
| 5,953,150 A | 9/1999 | Smarto et al. |
| 5,969,847 A | 10/1999 | Coleman et al. |
| 5,985,184 A | 11/1999 | Lynam |
| 5,995,271 A | 11/1999 | Zieba et al. |
| 6,001,487 A | 12/1999 | Ladang et al. |
| 6,002,511 A | 12/1999 | Varaprasad et al. |
| 6,031,201 A | 2/2000 | Amako et al. |
| 6,045,643 A | 4/2000 | Byker et al. |
| 6,045,896 A | 4/2000 | Boire et al. |
| 6,055,088 A | 4/2000 | Fix et al. |
| 6,055,089 A | 4/2000 | Schulz et al. |
| 6,118,573 A | 9/2000 | Kubo et al. |
| 6,143,209 A | 11/2000 | Lynam |
| 6,154,306 A | 11/2000 | Varaprasad et al. |
| 6,166,849 A | 12/2000 | Coleman et al. |
| 6,204,953 B1 | 3/2001 | Zieba et al. |
| 6,207,083 B1 | 3/2001 | Varaprasad et al. |
| 6,244,716 B1 | 6/2001 | Steenwyk et al. |
| 6,261,641 B1 | 7/2001 | Zieba et al. |
| 6,337,758 B1 | 1/2002 | Beteille et al. |
| 6,433,913 B1 | 8/2002 | Bauer et al. |
| 6,471,360 B2 | 10/2002 | Rukavina et al. |
| 6,515,787 B1 | 2/2003 | Westfall et al. |
| 6,529,308 B2 | 3/2003 | Beteille et al. |
| 6,535,126 B2 | 3/2003 | Lin et al. |
| 6,559,411 B2 | 5/2003 | Borgeson et al. |
| 6,561,460 B2 | 5/2003 | Rukavina et al. |
| 6,783,099 B2 | 8/2004 | Rukavina et al. |
| 6,795,226 B2 | 9/2004 | Agrawal et al. |
| 6,798,556 B2 | 9/2004 | Tench et al. |
| 6,822,778 B2 | 11/2004 | Westfall et al. |
| 6,853,472 B2 | 2/2005 | Warner et al. |
| 6,862,125 B2 | 3/2005 | Warner et al. |
| 6,919,530 B2 | 7/2005 | Borgeson et al. |
| 6,995,891 B2 | 2/2006 | Agrawal et al. |
| 7,002,720 B2 | 2/2006 | Beteille et al. |
| 7,004,592 B2 | 2/2006 | Varaprasad et al. |
| 7,033,655 B2 | 4/2006 | Beteille et al. |
| 7,130,101 B2 | 10/2006 | Rukavina et al. |
| 7,133,181 B2 | 11/2006 | Greer |
| 7,173,750 B2 | 2/2007 | Rukavina |
| 7,202,987 B2 | 4/2007 | Varaprasad et al. |
| 7,230,748 B2 | 6/2007 | Giron et al. |
| 7,248,392 B2 | 7/2007 | Rukavina et al. |
| 7,277,215 B2 | 10/2007 | Greer |
| 7,300,166 B2 | 11/2007 | Agrawal et al. |
| 7,317,106 B2 | 1/2008 | Warner et al. |
| 7,324,261 B2 | 1/2008 | Tonar et al. |
| 7,362,491 B2 | 4/2008 | Busick et al. |
| 7,477,439 B2 | 1/2009 | Tonar et al. |
| 7,531,101 B2 | 5/2009 | Beteille |
| 7,710,671 B1 | 5/2010 | Kwak et al. |
| 7,719,751 B2 | 5/2010 | Egerton et al. |
| 7,869,114 B2 | 1/2011 | Valentin et al. |
| 7,894,119 B2 | 2/2011 | Valentin et al. |
| 7,929,194 B2 | 4/2011 | Legois et al. |
| 7,952,785 B2 | 5/2011 | Karmhag et al. |
| 8,035,882 B2 | 10/2011 | Fanton et al. |
| 10,429,712 B2 | 10/2019 | Jack et al. |
| 10,481,458 B2 | 11/2019 | Dixit et al. |
| 2002/0021481 A1 | 2/2002 | Lin et al. |
| 2002/0041443 A1 | 4/2002 | Varaprasad et al. |
| 2002/0075552 A1 | 6/2002 | Poll et al. |
| 2002/0135881 A1 | 9/2002 | Rukavina et al. |
| 2002/0149829 A1 | 10/2002 | Mochizuka et al. |
| 2003/0227663 A1 | 12/2003 | Agrawal et al. |
| 2004/0047050 A1 | 3/2004 | Bauer et al. |
| 2004/0257633 A1 | 12/2004 | Agrawal et al. |
| 2005/0002081 A1 | 1/2005 | Beteille et al. |
| 2005/0056257 A1 | 3/2005 | Yoshioka et al. |
| 2006/0077511 A1 | 4/2006 | Poll et al. |
| 2006/0187608 A1 | 8/2006 | Stark |
| 2007/0002422 A1 | 1/2007 | O'Shaughnessy |
| 2007/0020442 A1 | 1/2007 | Giron et al. |
| 2007/0067048 A1 | 3/2007 | Bechtel et al. |
| 2007/0103761 A1 | 5/2007 | Giron et al. |
| 2007/0133078 A1 | 6/2007 | Fanton et al. |
| 2008/0074724 A1 | 3/2008 | Agrawal et al. |
| 2008/0115428 A1 | 5/2008 | Schlam et al. |
| 2009/0058295 A1 | 3/2009 | Auday et al. |
| 2009/0067031 A1 | 3/2009 | Piroux et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0130409 A1 | 5/2009 | Reutler et al. |
| 2009/0148642 A1 | 6/2009 | Mauser et al. |
| 2009/0174300 A1 | 7/2009 | Jousse et al. |
| 2009/0181203 A1 | 7/2009 | Valentin et al. |
| 2009/0251758 A1 | 10/2009 | Valentin et al. |
| 2009/0262411 A1 | 10/2009 | Karmhag et al. |
| 2009/0297806 A1 | 12/2009 | Dawson-Elli et al. |
| 2009/0323160 A1 | 12/2009 | Egerton et al. |
| 2010/0062975 A1 | 3/2010 | Houck |
| 2010/0062976 A1 | 3/2010 | Naicker et al. |
| 2010/0067090 A1 | 3/2010 | Egerton et al. |
| 2010/0208326 A1 | 8/2010 | Kwak et al. |
| 2010/0243427 A1 | 9/2010 | Kozlowski et al. |
| 2011/0043885 A1 | 2/2011 | Lamine et al. |
| 2011/0048614 A1 | 3/2011 | Veerasamy et al. |
| 2011/0051221 A1 | 3/2011 | Veerasamy |
| 2011/0059275 A1 | 3/2011 | Stark |
| 2011/0211246 A1 | 9/2011 | Agrawal et al. |
| 2011/0216389 A1 | 9/2011 | Piroux et al. |
| 2011/0260961 A1 | 10/2011 | Burdis |
| 2011/0267672 A1 | 11/2011 | Sbar et al. |

(56) References Cited

U.S. PATENT DOCUMENTS

| | | |
|---|---|---|
| 2011/0299149 A1 | 12/2011 | Park et al. |
| 2012/0019889 A1 | 1/2012 | Lamine et al. |
| 2012/0026573 A1 | 2/2012 | Collins et al. |
| 2012/0062975 A1 | 3/2012 | Mehtani et al. |
| 2012/0062976 A1 | 3/2012 | Burdis |
| 2012/0194895 A1 | 8/2012 | Podbelski et al. |
| 2012/0200908 A1 | 8/2012 | Bergh et al. |
| 2012/0300280 A1 | 11/2012 | Murphy et al. |
| 2012/0327499 A1 | 12/2012 | Parker et al. |
| 2013/0016417 A1 | 1/2013 | Veerawamy |
| 2013/0032084 A1 | 2/2013 | Sivaramakrishnan et al. |
| 2013/0037992 A1 | 2/2013 | Milstein et al. |
| 2013/0278988 A1* | 10/2013 | Jack .................. G02F 1/155 359/275 |
| 2014/0007418 A1 | 1/2014 | Song et al. |
| 2016/0097960 A1 | 4/2016 | Dixit et al. |
| 2019/0011793 A1 | 1/2019 | Jack et al. |

FOREIGN PATENT DOCUMENTS

| | | |
|---|---|---|
| CN | 102460291 A | 5/2012 |
| CN | 102460292 A | 5/2012 |
| CN | 102460630 A | 5/2012 |
| CN | 103238107 A | 8/2013 |
| CN | 103370649 A | 10/2013 |
| CN | 103492940 A | 1/2014 |
| DE | 102006042538 | 3/2008 |
| EP | 0356099 A2 | 2/1990 |
| EP | 0470867 | 2/1992 |
| EP | 0851271 A2 | 7/1998 |
| EP | 0950568 A1 | 10/1999 |
| EP | 1420287 A1 | 5/2004 |
| EP | 2348357 | 7/2011 |
| GB | 2190760 A | 11/1987 |
| JP | 2004537846 A | 12/2004 |
| KR | 10-2012-0038439 A | 4/2012 |
| TW | 201235757 A1 | 9/2012 |
| WO | WO2005/076061 | 8/2005 |
| WO | WO2007/100921 A2 | 9/2007 |
| WO | WO2008/043951 | 4/2008 |
| WO | WO2OOI145876 | 12/2009 |
| WO | WO2009/148861 | 12/2009 |
| WO | WO2011/010067 | 1/2011 |
| WO | WO2011/028253 | 3/2011 |
| WO | WO2011028254 | 3/2011 |
| WO | WO2011/050291 | 4/2011 |
| WO | WO2011/109688 | 9/2011 |
| WO | WO2012/145155 | 10/2012 |
| WO | WO2014/205014 | 12/2014 |

OTHER PUBLICATIONS

U.S. Office Action dated Nov. 21, 2013 for U.S. Appl. No. 13/452,032.
U.S. Final Office Action dated May 2, 2014 for U.S. Appl. No. 13/452,032.
U.S. Office Action dated Nov. 13, 2014 for U.S. Appl. No. 13/452,032.
U.S. Final Office Action dated Apr. 20, 2015 for U.S. Appl. No. 13/452,032.
U.S. Office Action dated Dec. 8, 2015 for U.S. Appl. No. 13/452,032.
U.S. Final Office Action dated Sep. 1, 2016 for U.S. Appl. No. 13/452,032.
U.S. Office Action dated Nov. 3, 2016 for U.S. Appl. No. 14/893,505.
U.S. Office Action dated Jun. 23, 2017 for U.S. Appl. No. 13/452,032.
U.S. Notice of Allowance dated Jan. 28, 2019 for U.S. Appl. No. 13/452,032.
U.S. Notice of Allowance dated May 24, 2019 for U.S. Appl. No. 13/452,032.
U.S. Final Office Action dated Aug. 29, 2017 for U.S. Appl. No. 14/893,505.
U.S. Office Action dated May 17, 2018 for U.S. Appl. No. 14/893,505.
U.S. Final Office Action dated Jan. 7, 2019 for U.S. Appl. No. 14/893,505.
U.S. Notice of Allowance dated Jun. 26, 2019 for U.S. Appl. No. 14/893,505.
European Supplementary Search Report dated Jun. 25, 2015 for EP09815048.5.
European Office Action/Intention to Grant dated Apr. 19, 2018 for EP09815048.5.
International Preliminary Report on Patentability dated Mar. 22, 2011 from PCT/US2009/56928.
International Search Report and Written Opinion dated May 4, 2010 from PCT/US2009/56928.
Chinese Office Action dated Sep. 28, 2016 in CN Application No. 201380020654.4.
Chinese Office Action dated Jul. 20, 2017 for CN Application No. 201380020654.4.
Chinese Office Action dated Mar. 20, 2018 in CN Application No. 201380020654.4.
Chinese Office Action dated Mar. 5, 2019 in CN Application No. 201380020654.4.
European Supplementary Search Report dated Oct. 27, 2015 for EP Application No. 13778088.8.
European Extended Search Report dated Jul. 24, 2018 for EP Application No. 17205976.8.
European Examination Report dated Nov. 16, 2016 for EP Application No. 13778088.8.
International Preliminary Report on Patentability dated Oct. 30, 2014 from PCTUS2013/037115.
International Search Report and Written Opinion dated Jul. 22, 2013 from PCTUS2013/037115.
Chinese Office Action dated Jun. 4, 2018 in CN Application No. 201480035059.2.
Chinese Office Action dated Apr. 15, 2019 in CN Application No. 201480035059.2.
European Extended Search Report dated Nov. 2, 2016 for EP Application No. 14814624.4.
European Office Action dated Aug. 31, 2017 for EP Application No. 14814624.4.
European Office Action dated May 4, 2018 for EP Application No. 14814624.4.
European Office Action dated Nov. 12, 2018 for EP Application No. 14814624.4.
European Office Action dated Jun. 28, 2019 for EP Application No. 14814624.4.
Russian Office Action dated Mar. 6, 2018 for RU Application No. 2016101089.
Russian Office Action dated Jul. 30, 2018 for RU Application No. 2016101089.
Taiwanese Office Action dated Dec. 27, 2017 for TW Application No. 103120947.
Taiwanese Office Action dated Aug. 3, 2018 for TW Application No. 103120947.
Taiwanese Office Action dated Jan. 23, 2019 for TW Application No. 103120947.
International Preliminary Report on Patentability dated Dec. 30, 2015 from PCT/US2014/042819.
International Search Report and Written Opinion dated Oct. 21, 2014 from PCT/US2014/042819.
U.S. Office Action dated Apr. 17, 2020 for U.S. Appl. No. 16/032,842.
U.S. Office Action dated Sep. 25, 2020 for U.S. Appl. No. 16/032,842.
Canadian Office Action dated Jul. 3, 2020, in Canadian Patent Application No. 2,915,525.
Notice of Allowance with Search Report, dated Dec. 5, 2019 in CN Application No. 201480035059.2, No translation.
European Office Action dated Jun. 3, 2020 for EP Application No. 14814624.4.
Indian Office Action dated Mar. 11, 2020, for Indian Patent Application No. 4020//KOLNP/2015.
Canadian Office Action dated Mar. 31, 2021 in CA Application No. 2,915,525.
European Office Action dated Apr. 22, 2021 in EP Application No. 14814624.4.
CN Office Action dated Sep. 1, 2021, in CN Application No. CN201910816267.0 with English translation.

(56) References Cited

OTHER PUBLICATIONS

IN First Examination Report dated Sep. 27, 2021, in application No. IN202138008053.
U.S. Office Action dated May 13, 2021 for U.S. Appl. No. 16/032,842.
U.S. Final Office Action dated Dec. 13, 2021 for U.S. Appl. No. 16/032,842.
CA Office Action dated Jan. 21, 2022, in Application No. CA2915525.

* cited by examiner

Position Across Device

Bus Bar with 0.5 bus bar Ratio

Bus Bar with 0.55 bus bar Ratio

Bus Bar with 0.6 bus bar Ratio

Bus Bar with 0.7 bus bar Ratio

ELECTROCHROMIC DEVICES ON NON-RECTANGULAR SHAPES

CROSS-REFERENCE TO RELATED APPLICATIONS

This application is a divisional of U.S. patent application Ser. No. 14/893,505, titled "ELECTROCHROMIC DEVICES ON NON-RECTANGULAR SHAPES," filed on Nov. 23, 2015, which is a national stage application under 35 U.S.C. § 371 to International Application No. PCT/US2014/042819 (designating the United States), titled "ELECTROCHROMIC DEVICES ON NON-RECTANGULAR SHAPES," filed on Jun. 17, 2014, which claims benefit and priority to U.S. Provisional Patent Application No. 61/836,602, titled "ELECTROCHROMIC DEVICES ON NON-RECTANGULAR SHAPES," filed on Jun. 18, 2013, U.S. Provisional Patent Application No. 61/859,131, titled "ELECTROCHROMIC DEVICES ON NON-RECTANGULAR SHAPES," filed on Jul. 26, 2013, and U.S. Provisional Patent Application No. 61/862,928, titled "ELECTROCHROMIC DEVICES ON NON-RECTANGULAR SHAPES," filed on Aug. 6, 2013; all of which are hereby incorporated by reference in their entirety for all purposes.

FIELD

Embodiments disclosed herein generally relate to optically switchable devices such as electrochromic devices, and more particularly to methods of fabricating optically switchable devices.

BACKGROUND

Electrochromic (EC) devices are typically multi-layer stacks including (a) at least one layer of electrochromic material that changes its optical properties in response to the application of an electrical potential, (b) an ion conductor (IC) layer that allows ions, such as lithium ions, to move through it, into and out from the electrochromic material to cause the optical property to change, while preventing electrical shorting, and (c) transparent conductor layers, such as transparent conducting oxides (TCOs), over which an electrical potential is applied to the electrochromic layer. In some cases, the electric potential is applied from opposing edges of an electrochromic device and across the viewable area of the device. The transparent conductor layers are designed to have relatively high electronic conductance properties. Electrochromic devices may have more than the above-described layers such as ion storage or counter electrode layers that optionally change optical states.

Due to the physics of the device operation, proper functioning of the electrochromic device depends upon many factors such as ion movement through the material layers, the electrical potential required to move the ions, the sheet resistance of the transparent conductor layers, and other factors. Size and shape of the electrochromic device play an important role in the uniformity of coloration across the face of the device. Additionally, the size and shape of the device play a role in the transition of the device from a starting optical state to an ending optical state (e.g., from colored to bleached state or bleached to colored state). The conditions applied to drive the transitions and hold an optical end state can have quite different requirements for different shaped devices.

Further, where an electrochromic device is of a non-rectangular shape, certain fabrication processes are more difficult. For example, laser edge delete (LED) and bus bar pad expose (BPE) operations utilize square/rectangular laser patterns which are oriented parallel or perpendicular to the local edge of the substrate. These patterns are defined by vector files that are implemented by the scanner/laser. While these patterns lend themselves to simple processing with rectangular-shaped devices, they are much more difficult to implement on shapes that are more complex, for example shapes having curved edges or edges that are at non-right angles to adjacent edges.

SUMMARY

Certain embodiments described herein pertain to bus bars configurations for non-rectangular shaped optically switchable devices (e.g., triangular-shaped, trapezoidal-shaped, shaped with curved portions, etc.). These bus bars are designed to deliver electrical potential to the device in a manner that equalizes, to the extent possible, the effective voltage over the entire face of the device. In doing so, these bus bars may provide a uniform ending optical state and smooth and speedy optical transitions across the face of the device without hotspots. In some embodiments, the bus bars are positioned and sized lengthwise so that the distance to both bus bars is equalized, to the extent possible, across the device surface. Various techniques for accomplishing this result will be described herein.

In another aspect, certain embodiments herein relate to methods of performing laser edge delete and bus bar pad expose operations on non-rectangular shaped electrochromic devices. These methods may include using a non-rectangular laser pattern (e.g., a circular laser pattern) and/or a rectangular laser pattern oriented in a direction that is not parallel to a side of the substrate that forms two right angles with adjacent sides of the substrate. The latter laser pattern is sometimes referred to herein as an angled laser pattern. It may be appropriate for use in performing edge deletion or bus bar pad exposure operations of non-rectangular windows such as triangular windows, trapezoidal windows, pentagonal windows, hexagonal windows, and other polygonal windows. In the case of a right triangular shaped window, an angled laser pattern may be used to perform edge deletion and/or bus bar pad exposure along the edge of the window forming a hypotenuse.

Certain embodiments relate to an optically switchable window comprising a non-rectangular optically switchable device comprising a first side, a second side, and a third side adjacent the second side. The optically switchable window further comprises a first bus bar spanning a first portion along a first side of the non-rectangular optically switchable device. The optically switchable window further comprises a second bus bar spanning a second portion of a second side of the non-rectangular optically switchable device, the second side opposing the first side. In these embodiments, the first bus bar and second bus bar are configured to apply voltage to the optically switchable device.

Certain embodiments relate to a method of determining a bus bar configuration for an optically switchable device having a non-rectangular shape. In these embodiments, the method comprises determining a centroid of the non-rectangular shape; determining first and second anchor points on a first side and second side of the non-rectangular shape based on the determined centroid; determining lengths of a first bus bar segment and a second bus bar segment extending from the first anchor point and lengths of a third bus bar segment and a fourth bus bar segment extending from the second anchor point, wherein a first bus bar comprises the first bus bar segment and the second bus bar segment, and wherein the second bus bar comprises the third bus bar segment and the fourth bus bar segment; determining a summed minimum bus bar distance as a distance of a weakest coloring point on the optically switchable device to the first bus bar and a distance of the weakest coloring point to the second bus bar; determining a summed minimum bus bar distance of a distance of a strongest coloring point on the optically switchable device to the first bus bar and a distance of the strongest coloring point to the second bus bar; calculating a difference between the summed maximum bus bar distance and the summed minimum bus bar distance; adjusting the lengths of the first bus bar segment, the second bus bar segment, the third bus bar segment, and the fourth bus bar segment until the calculated difference reaches convergent lengths for each of the first, second, third, and fourth bus bar segments; and using the convergent lengths of the first bus bar segment, the second bus bar segment, the third bus bar segment, and the fourth bus bar segment to determine a bus bar configuration for the optically switchable device.

Certain embodiments relate to a method of fabricating an optically switchable device on a substrate. The method comprises receiving at a laser tool said substrate having disposed thereon one or more layers of the optically switchable device and directing a laser spot according to a non-rectangular laser pattern onto a region of the optically switchable device proximate one or more edges of the substrate to remove at least one of the one or more layers of the optically switchable device at the region. In some cases, the method further comprises repeating the direct the laser spot operation to direct the laser spot at different regions of the optically switchable device proximate the one or more edges of the substrate to define a portion of the substrate where at least one of the one or more layers is removed.

Certain embodiments relate to a method of fabricating an optically switchable device on a non-rectangular substrate having at least one edge that does not form a right angle with an adjacent edge, said non-rectangular substrate having disposed thereon one or more layers of the optically switchable device. The method comprises (a) receiving at a laser tool said non-rectangular substrate; (b) directing a laser spot from the laser tool onto the one or more layers at a region of the substrate proximate the at least one edge that does not form a right angle with an adjacent edge to thereby remove the one or more layers at the region; and (c) repeating operation (b) at different regions of the substrate proximate the edge or edges of the substrate to define a portion of the substrate where at least one of the one or more layers is removed. In these embodiments, the laser spot is rectangular in shape and having two sides parallel to the at least one edge.

Certain embodiments relate to an apparatus for fabricating an optically switchable device on a non-rectangular substrate having at least one edge that does not form a right angle with an adjacent edge, said non-rectangular substrate having disposed thereon one or more layers of the optically switchable device. The apparatus comprises a laser tool and a scanner configured to perform the operations of: (a) receiving at a laser tool said non-rectangular substrate; (b) directing a laser spot from the laser tool onto the one or more layers at a region of the substrate proximate the at least one edge that does not form a right angle with an adjacent edge to thereby remove the one or more layers at the region; and (c) repeating operation (b) at different regions of the substrate proximate the edge or edges of the substrate to define a portion of the substrate where at least one of the one or more layers is removed. In these embodiments, the laser spot is rectangular in shape and having two sides parallel to the at least one edge. In one case, the laser tool has a dove prism.

Embodiments include EC devices fabricated using methods described herein.

These and other features and embodiments will be described in more detail below with reference to the drawings.

DETAILED DESCRIPTION

Figure 1A:
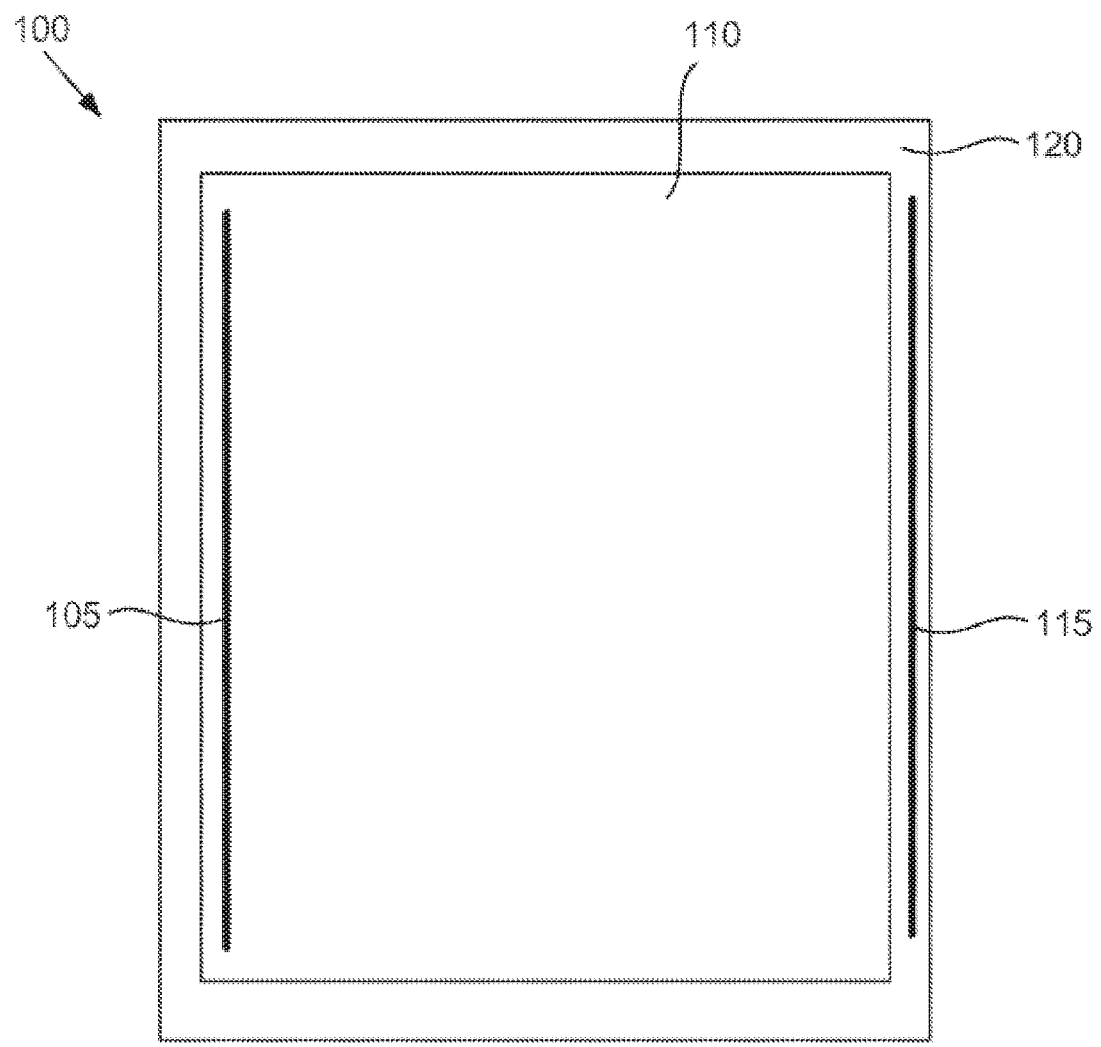
FIG. 1A is a schematic drawing of a top view of a rectangular electrochromic device with a planar bus bar arrangement.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

Definitions

An "optically switchable device" can refer to a thin device that changes optical state in response to electrical input. It reversibly cycles between two or more optical states. Switching between these states is controlled by applying predefined current and/or voltage to the device. The device typically includes two thin conductive layers (e.g., transparent conductive oxide layers or "TCOs") that sandwich at least one optically active layer. The electrical input driving the change in optical state is applied to the thin conductive layers. In certain implementations, the input is provided by bus bars in electrical communication with the conductive layers. While the disclosure emphasizes electrochromic devices as examples of optically switchable devices, the disclosure is not so limited. Examples of other types of optically switchable devices include certain electrophoretic devices, liquid crystal devices, and the like. In certain cases, the optically switchable device is disposed over a substantially transparent substrate such as glass. Optically switchable devices may be provided in various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format; that is, having a monolithic switchable device coating.

An "optical transition" can refer to a change in any one or more optical properties of an optically switchable device. The optical property that changes may be, for example, tint, reflectivity, refractive index, color, etc. In certain embodiments, the optical transition will have a defined starting optical state and a defined ending optical state. For example, the starting optical state may be 80% transmissivity and the ending optical state may be 50% transmissivity. The optical transition is typically driven by applying an appropriate electric potential across the two thin conductive layers of the optically switchable device.

A "starting optical state" can refer to the optical state of an optically switchable device immediately prior to the beginning of an optical transition. The starting optical state is typically defined as the magnitude of an optical state which may be tint, reflectivity, refractive index, color, etc. The starting optical state may be a maximum or minimum optical state for the optically switchable device; e.g., 90% or 4% transmissivity. Alternatively, the starting optical state may be an intermediate optical state having a value somewhere between the maximum and minimum optical states for the optically switchable device; e.g., 50% transmissivity.

An "ending optical state" can refer to the optical state of an optically switchable device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the optically switchable device; e.g., 90% or 4% transmissivity. Alternatively, the ending optical state may be an intermediate optical state having a value somewhere between the maximum and minimum optical states for the optically switchable device; e.g., 50% transmissivity.

A "bus bar" can refer to an electrically conductive material, e.g. a metal tape or strip, metallized ink or similar material used for such applications, electrically connected to a conductive layer such as a transparent conductive electrode of an optically switchable device. The bus bar delivers electrical potential and current from a lead to the conductive layer. An optically switchable device may include two or more bus bars, each connected to one or more conductive layers of the device. In various embodiments, a bus bar is illustrated in the form of a line and spans at least a portion of a side of the device. Often, a bus bar is located near the edge of the device.

"Applied Voltage" or $V_{app}$ can refer to the difference in electrical potential (e.g., voltage potential) applied by bus bars of opposite polarity to the electrochromic device. Each bus bar may be electrically connected to a separate transparent conductive layer. The applied voltage may have different magnitudes or functions such as driving an optical transition or holding an optical state. Between the transparent conductive layers are sandwiched the optically switchable device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of an optically switchable device.

"Effective Voltage" ($V_{eff}$) can refer to the potential between the positive and negative transparent conducting layers at any particular location on the optically switchable device. In Cartesian space, the effective voltage is defined for a particular x,y coordinate on the face of the device. At the point where $V_{eff}$ is measured, the two transparent conducting layers are separated in the z-direction (by the device materials), but share the same x,y coordinate. As described elsewhere herein, transitioning optical state at an area of an electrochromic device is dependent on the effective voltage, $V_{eff}$, at that area. The effective voltage, $V_{eff}$, at that area depends on the applied voltage $V_{app}$ delivered by the bus bars, the distance of the area to the bus bars, and the material properties (e.g., L, J, R, etc.) of the electrochromic device.

"Hold Voltage" can refer to the applied voltage necessary to indefinitely maintain the device in an ending optical state.

Figure 3:
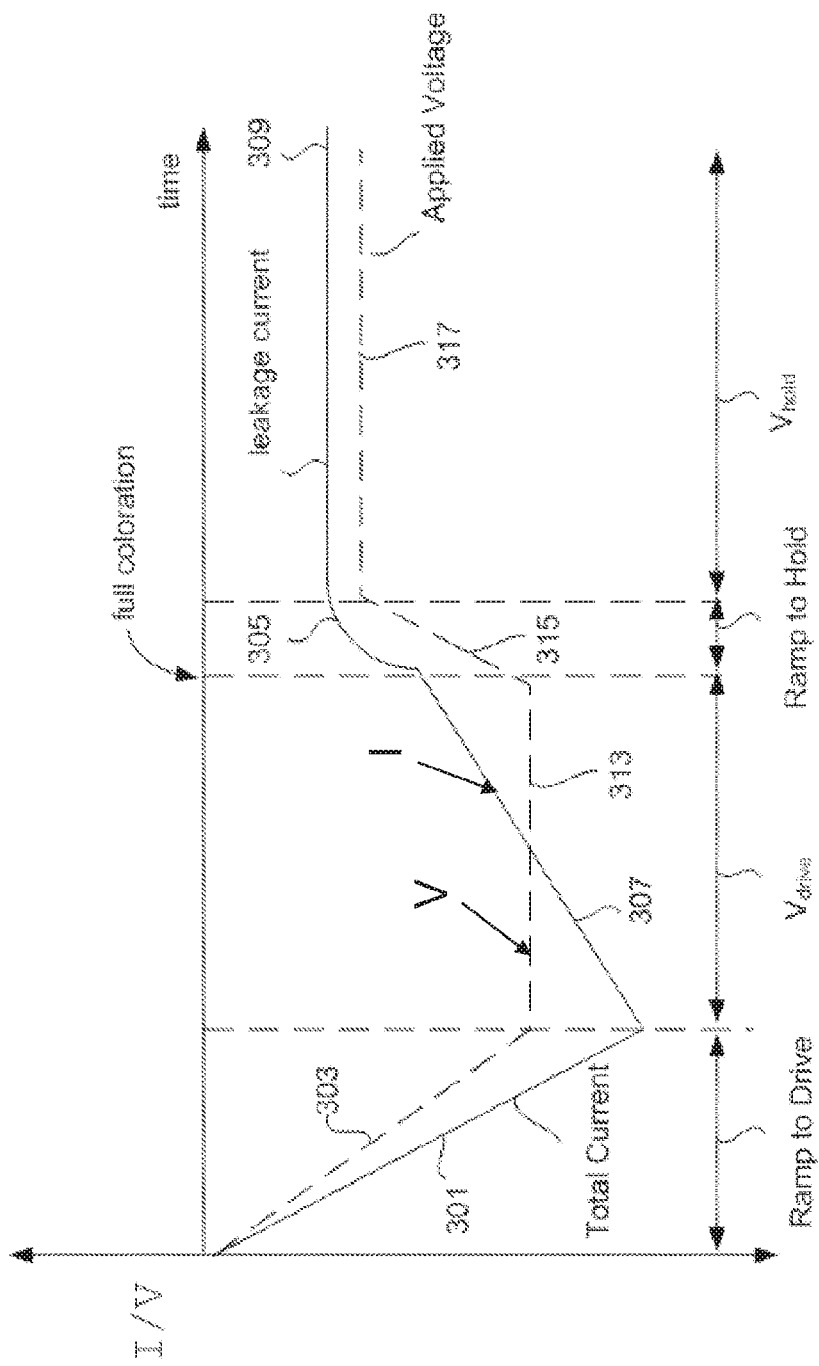
FIG. 3 is a graph depicting certain voltage and current profiles associated with driving an electrochromic device from bleached to colored state.

"Drive Voltage" can refer to the applied voltage provided during at least a portion of the optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage. An example application of drive and hold voltages is depicted in FIG. 3.

"Laser Pattern" can refer to a vector file or other instructions, as well as an associated shape of a laser cutting region on a substrate surface. The vector file or other instructions may be used to program the movement of a laser's focus area over the surface of a device. These patterns are used to define the area over which material is removed during a laser edge delete or bus bar pad expose operation, for example. The laser pattern is a unit of material removal that is repeated over multiple positions on the substrate surface to remove a significantly larger amount of material (e.g., a bus bar pad expose region or an edge delete region). In various embodiments, the field of view of the laser cutting tool applying the laser pattern limits the laser pattern size. In a typical embodiment, the laser pattern has a dimension (e.g., a side or diameter) that is on the order of millimeters (e.g., about 5 to 100 millimeters).

Introduction

Driving a color transition in a typical electrochromic device is accomplished by applying a voltage potential delivered by separated bus bars on the device. If such a device has a rectangular shape, it may be desirable to position two bus bars perpendicular to the shorter sides (along the longer parallel sides) in a planar configuration such as illustrated in FIG. 1A. This planar configuration in a rectangular shaped device may be desirable because the transparent conducting layers used to deliver an applied voltage/current over the face of the thin film device have an associated sheet resistance, and this bus bar arrangement allows for the shortest span over which current must travel to cover the entire area of the device, thus lowering the time it takes for the conductor layers to be fully charged across their respective areas, and thus lowering the time to transition the device to a new optical state.

While an applied voltage, $V_{app}$, is delivered by the bus bars, essentially all areas of the device see a lower local effective voltage, $V_{eff}$, due to the sheet resistance of the transparent conducting layers and the ohmic drop in potential across the device. The center of the device (the position midway between the two bus bars) frequently has the lowest value of $V_{eff}$. This may result in an unacceptably small optical switching range and/or an unacceptably slow switching time in the center of the device. These problems may not exist at the areas nearer to the bus bars. This is explained in more detail below with reference to FIGS. 1B and 1C.

FIG. 1A shows a top view of a rectangular electrochromic lite 100 including bus bars in the planar configuration. The electrochromic lite 100 comprises a first conductive layer 110, a second conductive layer, 120, and an electrochromic stack (not shown) between first conductive layer 110 and second conductive layer 120. Other layers may be included. Electrochromic lite 100 also includes a first bus bar 105 disposed on first conductive layer 110 and a second bus bar 115 disposed on second conductive layer, 120. As shown, first bus bar 105 may extend substantially along one side of first conductive layer 110 near an edge of the electrochromic lite 100. Second bus bar 115 may extend substantially along one side of second conductive layer 120 opposite the side of electrochromic lite 100 on which first bus bar 105 is disposed. Some devices may have extra bus bars, e.g., along all four sides. A further discussion of bus bar configurations and designs, including planar configured bus bars, is found in U.S. patent application Ser. No. 13/452,032, titled "ANGLED BUS BAR," filed on Apr. 20, 2012, which is incorporated herein by reference in its entirety.

Figure 1B:
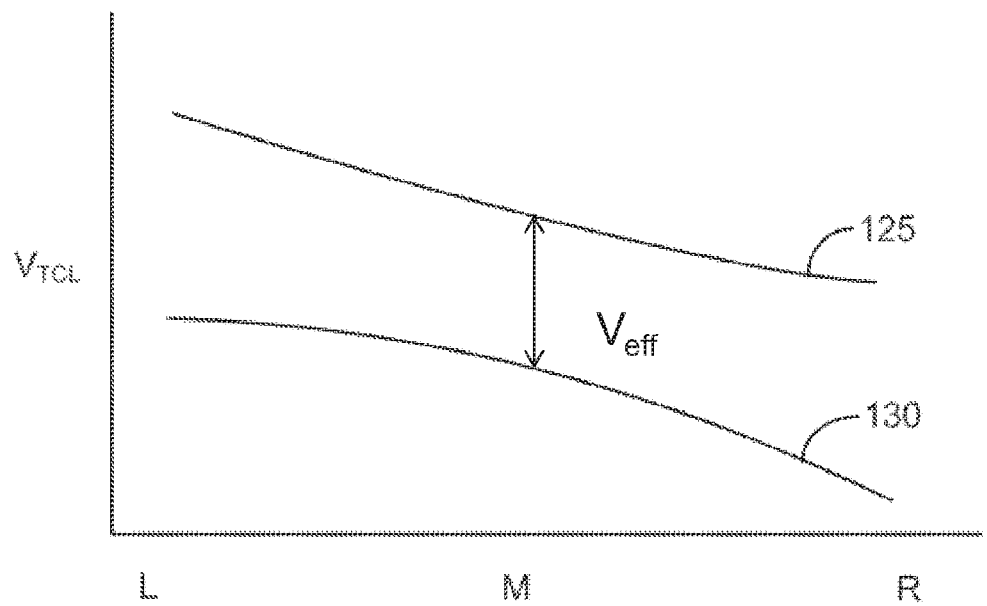
FIG. 1B is a simplified plot of the local voltage values at each transparent conductive layer as a function of position across the electrochromic device.

FIG. 1B is a graph showing a plot of the local voltage $V_{TCL}$ applied to first transparent conductive layer 110 and the local voltage $V_{TCL}$ applied to second transparent conductive layer 120 that drives the transition of electrochromic lite 100 from a bleached state to a colored state, for example. Curve 125 shows the local values of the voltage $V_{TCL}$ in first transparent conductive layer 110. As shown, the voltage drops from the left "L" hand side (e.g., where first bus bar 105 is disposed on first conductive layer 110 and where the voltage is applied) to the right "R" hand side of the first conductive layer 110 due to the sheet resistance and current passing through first conductive layer 110. Curve 130 shows the local voltage $V_{TCL}$, in second conductive layer 120. As shown, the voltage increases (becomes less negative) from the right hand side (e.g., where second bus bar 115 is disposed on second conductive layer 120 and where the voltage is applied) to the left hand side of second conductive layer 120 due to the sheet resistance of second conductive layer 120. The value of the applied voltage, $V_{app}$, in this example is the difference in voltage values between the right end of the curve 130 and the left end of curve 125. The value of the effective voltage, $V_{eff}$, at any location between the bus bars is the difference in values of curves 130 and 125 at the position on the x-axis corresponding to the location of interest.

Figure 1C:
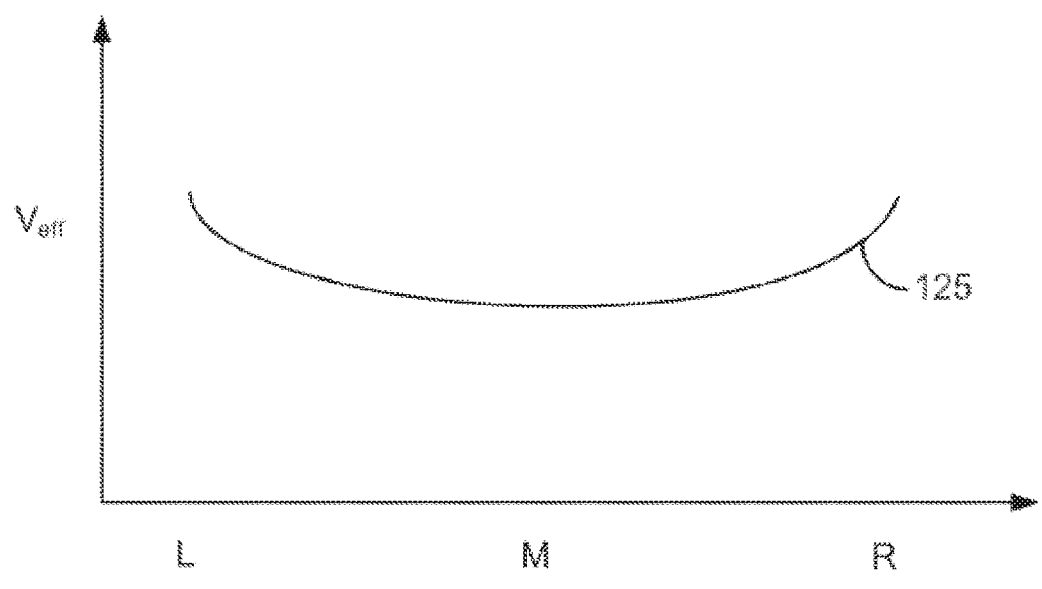
FIG. 1C is a simplified plot of $V_{eff}$ as a function of position across the electrochromic device.

FIG. 1C is a graph showing a curve of $V_{eff}$ values across the electrochromic device between first and second conductive layers 110 and 120 of electrochromic lite 100. As explained, the effective voltage, $V_{eff}$ is the local voltage difference between the first conductive layer 110 and the second conductive layer 120. Regions of an electrochromic device subjected to higher effective voltages transition between optical states faster than regions subjected to lower effective voltages. As shown, the effective voltage is the lowest at the center of electrochromic lite 100 (e.g., "M" location) and highest at the edges of electrochromic lite 100, closer to the bus bars. The voltage drop across the device is due to ohmic losses as current passes through the device. The device current is a sum of the electronic current and ionic current in the layers capable of undergoing redox reactions in the electrochromic device. The voltage drop across large area electrochromic device in a window can be alleviated by including additional bus bars within the viewing area of the window, in effect dividing one large area electrochromic device into multiple smaller electrochromic devices which can be driven in series or parallel. However, this approach may not be aesthetically appealing due to the contrast between the viewable area and the bus bar(s) in the viewable area. That is, it may be much more pleasing to the eye to have a monolithic electrochromic device without any distraction from bus bars within the viewable area.

As described above, as a window size increases, the electronic resistance to current flowing across the thin faces of the transparent conductive layers (TCL) layers, such as first conductive layer 110 and the second conductive layer 120 also increases. This resistance may be measured between the points closest to the bus bar and in the points farthest away from the bus bars (referred to as the centroid of the device in the following description). When current passes through a TCL, the voltage drops across the TCL face, reducing the effective voltage at the center of the device. This effect is exacerbated by the fact that typically as window area increases, the leakage current density for the window stays constant but the total leakage current increases due to increased area. Both of these may cause the effective voltage at the center of the electrochromic window to fall substantially, which can cause a noticeable reduction in the performance observed of electrochromic windows, especially for windows that are larger than, for example, about 30 inches across. This issue can be addressed by using a higher $V_{app}$ such that the center of the device reaches a suitable effective voltage.

Typically the range of $V_{eff}$ allowable for safe operation (i.e., operation with reduced risk of damage or degradation of device) of solid state electrochromic devices is between about 0.5V and 4V, or more typically between about 1V and about 3V, e.g., between 1.1V and 1.8V. These are local values of $V_{eff}$. In one embodiment, an electrochromic device controller or control algorithm provides a driving profile where $V_{eff}$ is always below 3V, in another embodiment, the controller controls $V_{eff}$ so that it is always below 2.5V, in another embodiment, the controller controls $V_{eff}$ so that it is always below 1.8V. These recited voltage values refer to a time averaged voltage (where the averaging time is of the order of time required for small optical response, e.g., a few seconds to few minutes).

An added complexity of operation of an electrochromic window is that the current drawn through the electrochromic device is not fixed over the duration of the optical transition (i.e., the transition period). Instead, during the initial part of the transition, the current through the device is substantially larger (up to 30× larger) than in the ending optical state when the optical transition is complete or nearly complete. The problem of poor coloration at the center of the device is particularly noticeable during this initial part of the transition period, as the value of $V_{eff}$ at the center is significantly lower than what it will be at the end of the transition period.

For a rectangular electrochromic device with planar bus bars (i.e., bus bars in a planar configuration such as those shown in FIG. 1A and FIG. 4), $V_{eff}$ across the electrochromic device can be described generally by the following:

$$\Delta V(0) = V_{app} - RJL^2/2 \quad \text{(Equation 1a)}$$

$$\Delta V(L) = V_{app} RJL^2/2 \quad \text{(Equation 1b)}$$

$$\Delta V(L/2) = V_{app} 3RJL^2/4 \quad \text{(Equation 1c)}$$

where:
$V_{app}$ is voltage difference applied to bus bars driving electrochromic device;
$\Delta V(0)$ is $V_{eff}$ at bus bar connected to first transparent conducting layer;
$\Delta V(L)$ is $V_{eff}$ at bus bar connected to second transparent conducting layer;
$\Delta V(L/2)$ is $V_{eff}$ at center of the device, midway between the two planar bus bars;
R=transparent conducting layer sheet resistance;
J=instantaneous current density; and
L=distance between the two planar bus bars of the electrochromic device.

The transparent conducting layers are assumed to have substantially similar, if not the same, sheet resistance for the calculation. However those of ordinary skill in the art will appreciate that the applicable physics of the ohmic voltage drop and local effective voltage still apply even if the transparent conducting layers have dissimilar sheet resistances (e.g. one TCL is a metal oxide, while the other TCL is a transparent metal layer).

Certain embodiments described herein pertain to controllers and control algorithms for driving optical transitions in optically switchable devices (e.g., electrochromic devices) having planar bus bars. In such devices, substantially linear bus bars of opposite polarity may be disposed at opposing sides of a rectangular or other polygon shaped electrochromic devices. Some embodiments described herein pertain to controllers and control algorithms for driving optical transitions in optically switchable devices employing non-planar bus bars. Such devices may employ, for example, angled bus bars disposed at vertices of the device. In such devices, the bus bar effective separation distance, L, is determined based on the geometry of the device and bus bars. A discussion of bus bar geometries and separation distances may be found in U.S. patent application Ser. No. 13/452,032, titled "Angled Bus Bar", and filed Apr. 20, 2012, which is incorporated herein by reference in its entirety.

As R, J or L increase, $V_{eff}$ across the device decreases, thereby slowing or reducing the device coloration during transition and/or reducing device coloration in the final optical state. Referring to Equations 1a-1c, the $V_{eff}$ across the window is at least $RJL^2/2$ lower than $V_{app}$. It has been found that as the resistive voltage drop increases (due to increase in the window size, current draw etc.) some of the loss can be negated by increasing $V_{app}$. However, $V_{app}$ should remain sufficiently low to ensure that $V_{eff}$ at the edges of the device is maintained below a threshold value where reliability degradation could occur.

In summary, it has been recognized that both transparent conducting layers experience ohmic drop, and that this drop increases with distance from the associated bus bar, and therefore $V_{TCL}$ decreases with distance from the bus bar for both transparent conductive layers. As a consequence, $V_{eff}$ decreases in locations removed from both bus bars.

To speed along optical transitions, the applied voltage can be initially provided at a magnitude greater than that required to hold the device at a particular optical state in equilibrium. This approach is illustrated in FIGS. 2 and 3.

Figure 2:
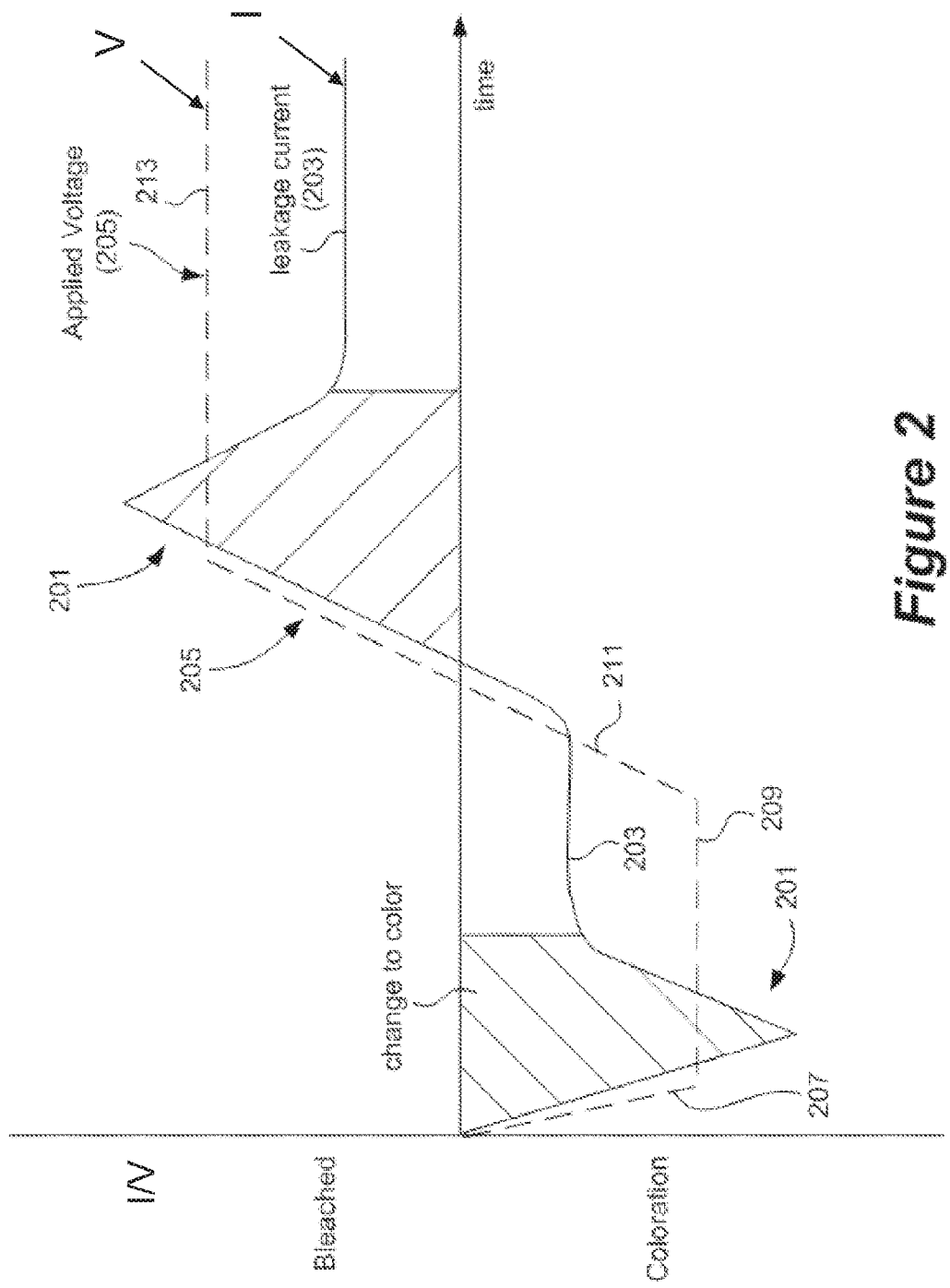
FIG. 2 is a graph depicting voltage and current profiles associated with driving an electrochromic device from bleached to colored and from colored to bleached.

FIG. 2 shows a current/voltage profile for an electrochromic device in accordance with certain embodiments. FIG. 2 shows current profile and voltage profile for an electrochromic device employing a simple voltage control algorithm to cause an optical state transition cycle (coloration followed by bleaching) of the electrochromic device. In the illustrated graph, total current density (I) is represented as a function of time. As mentioned, the total current density is a combination of the ionic current density associated with an electrochromic transition and electronic leakage current between the electrochemically active electrodes. Many different types of electrochromic devices will have the depicted current profile. In one example, a cathodic electrochromic material such as tungsten oxide is used in conjunction with an anodic electrochromic material such as nickel tungsten oxide in the counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 201 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 203) represent electronic leakage current while the device is in the new optical state; that is, current leakage across the ion conductor layer or region due to it being imperfectly electrically insulating.

In the figure, a voltage profile 205 is superimposed on the current curve. The voltage profile follows the sequence: negative ramp (207), negative hold (209), positive ramp (211), and positive hold (213). Note that the voltage remains constant after reaching its maximum magnitude and during the length of time that the device remains in its defined optical state. Voltage ramp 207 drives the device to its new the colored state and voltage hold 209 maintains the device in the colored state until voltage ramp 211 in the opposite direction drives the transition from colored to bleached states. In some switching algorithms, a current cap is imposed. That is, the current is not permitted to exceed a defined level in order to prevent damaging the device (e.g., driving ion movement through the material layers too quickly can physically damage the material layers). The coloration speed is a function of not only the applied voltage, but also the temperature and the voltage ramping rate.

FIG. 3 illustrates a current/voltage profile for an electrochromic device in accordance with certain embodiments. In the depicted embodiment, a current/voltage control profile for the electrochromic device employs a voltage control algorithm to drive the transition from a bleached optical state to a colored optical state (or to an intermediate state). To drive the electrochromic device in the reverse direction, from a colored state to a bleached state (or from a more colored to less colored state), a similar but inverted profile is used. In some embodiments, the voltage control profile for going from colored to bleached is a mirror image of the one depicted in FIG. 3.

The voltage values depicted in FIG. 3 represent the applied voltage ($V_{app}$) values. The applied voltage profile is shown by the dashed line. For contrast, the current density in the device is shown by the solid line. In the depicted profile, $V_{app}$ includes four components: a ramp to drive component 303, which initiates the transition, a $V_{drive}$ component 313, which continues to drive the transition, a ramp to hold component 315, and a $V_{hold}$ component 317. The ramp components are implemented as variations in $V_{app}$ and the $V_{drive}$ and $V_{hold}$ components provide constant or substantially constant $V_{app}$ magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of $V_{hold}$ is typically governed by the length of time that the device is held in the colored state (or conversely in the bleached state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. Larger devices may also require higher values of $V_{hold}$. U.S. patent application Ser. No. 13/449,251, titled "CONTROLLER FOR OPTICALLY-SWITCHABLE WINDOWS," filed Apr. 17, 2012, and incorporated herein by reference in its entirety, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the value of each component of the applied voltage profile is set for a particular electrochromic device (having its own bus bar separation, resistivity, etc.) and does not vary based on current conditions. In other words, in such embodiments, the voltage profile does not take into account feedback such as temperature, current density, and the like.

As indicated, all voltage values shown in the voltage transition profile of FIG. 3 correspond to the $V_{app}$ values described above. They do not correspond to the $V_{eff}$ values described above. In other words, the voltage values depicted in FIG. 3 are representative of the voltage difference between the bus bars of opposite polarity on the electrochromic device.

In certain embodiments, the ramp to drive component of the voltage profile is chosen to safely but rapidly induce ionic current flow between the electrochromic layer and the counter electrode. As shown in FIG. 3, the current in the device follows the profile of the ramp to drive voltage component until the ramp to drive portion of the profile ends and the $V_{drive}$ portion begins. See current component 301 in FIG. 3. Safe levels of current and voltage can be determined empirically or based on other feedback. U.S. Pat. No.

8,254,013, filed Mar. 16, 2011, issued Aug. 28, 2012 and incorporated herein by reference in its entirety, presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that $V_{drive}$ remains in place. In some embodiments, the duration of $V_{drive}$ is set to a specified time period. In another embodiment, the duration of $V_{drive}$ is set to correspond to a desired amount of ionic charge being passed. As shown, the current ramps down during $V_{drive}$. See current segment 307.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 3, the device current transitions in a segment 305 during the ramp to hold component. The current settles to a stable leakage current 309 during $V_{hold}$.

Techniques for Equalizing $V_{eff}$ Across Optically Switchable Devices

Optically switchable devices should operate such that coloration or other optical property is as uniform as possible across the entire face of the device after transition. In other words, device ending optical states should exhibit relatively uniform coloration or other optical property. Further, such devices should transition between optical states smoothly without creating hotspots. A hotspot can refer to a region on the device where the effective voltage is sufficiently high to possibly damage or decrease the reliability of the device at the hotspot.

Figure 4:
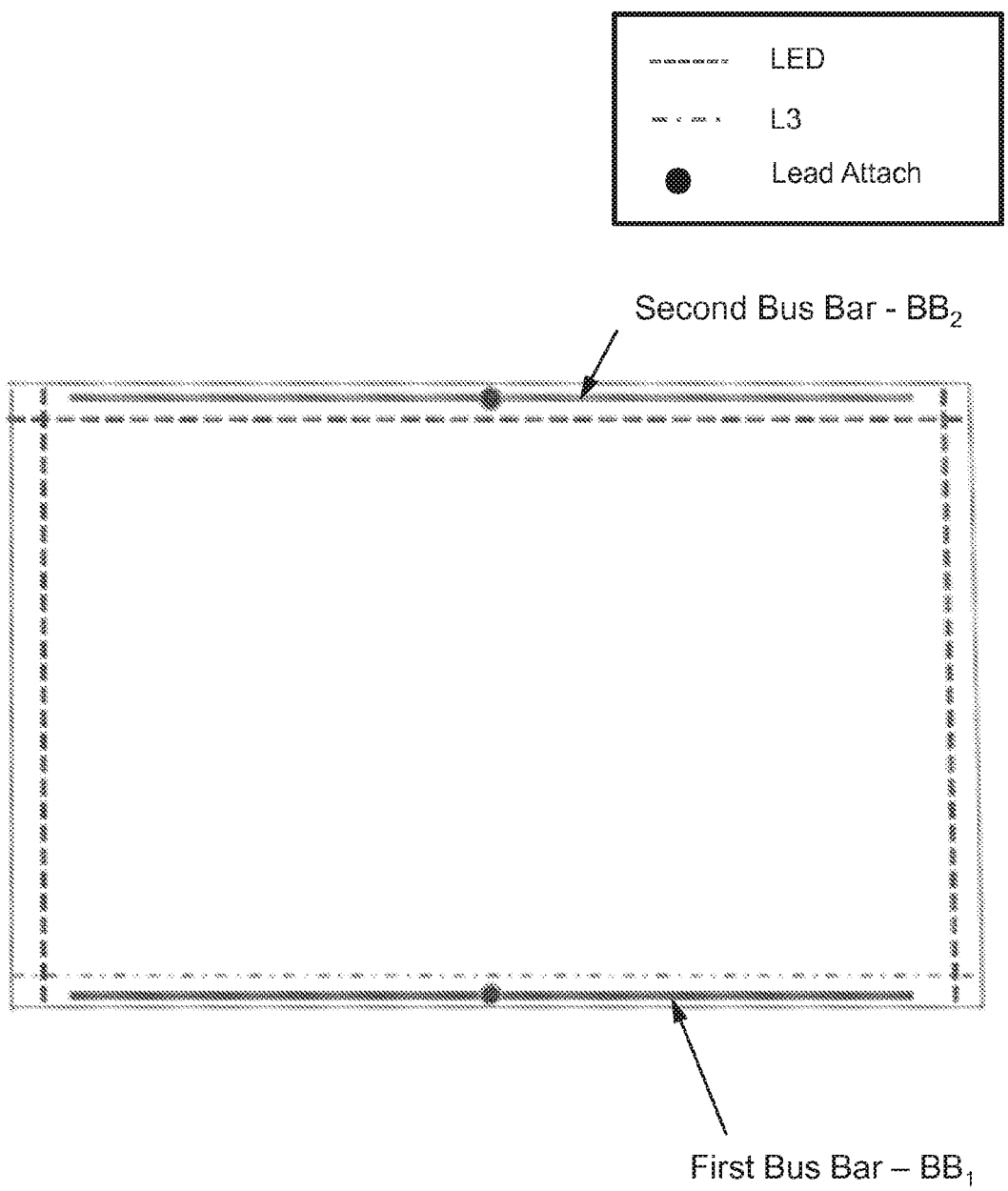
FIG. 4 is a schematic diagram of a top view of a rectangular electrochromic device with a planar bus bar arrangement.

These goals can be realized by bus bar configurations that deliver electrical potential to the device in a manner that equalizes, to the extent possible, the effective voltage over the entire face of the device. This equalization of the effective voltage, $V_{eff}$ is particularly important for the ending optical states of the device. However, it is also important during optical transitions of the device. For devices having rectangular shapes, equalization of the effective voltage, $V_{eff}$ can be accomplished relatively easily. As described elsewhere herein, one approach is to employ a planar bus bar configuration in a rectangular device. In a planar configuration, a first bus bar is placed at the edge of the longest side and a second bus bar is placed at the edge of the side opposite the longest side. FIG. 1A and FIG. 4 show rectangular devices having planar bus bar configurations. Since the longer opposing sides of a rectangle are parallel by definition, bus bars along these parallel sides can deliver electrical potential to the device that at least substantially equalizes effective voltage across the face of the rectangular device. For devices having non-rectangular shapes, equalizing the effective voltage to realize these goals can be more challenging. Triangles, trapezoids, shapes having curved sides (e.g., arch shape, semicircular, quarter circular, etc.), and the like are among some of the more challenging shapes.

Figure 5:
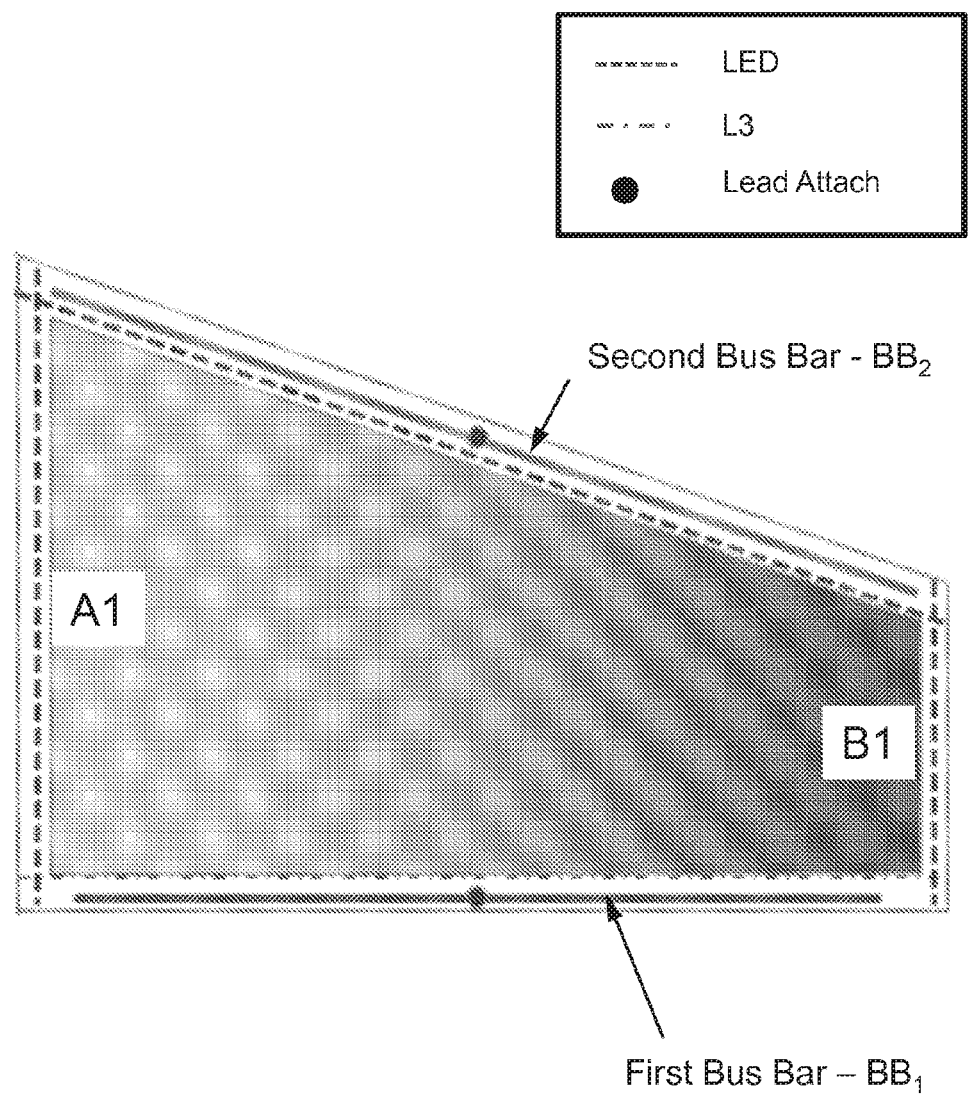
FIG. 5 is a schematic diagram of a top view of a right trapezoid shaped electrochromic device with a planar bus bar arrangement, according to an embodiment.

FIG. 5 is a top down view of a right trapezoidal shaped electrochromic device. In this illustration, a planar bus bar configuration typically used for rectangular devices is applied to a trapezoid-shaped electrochromic device. That is, a first bus bar $BB_1$ is applied to the edge of the longest side and a second bus bar $BB_2$ is applied to the edge of the opposing side. Since these sides are not parallel, the bus bars along these sides are not parallel and the distance between the bus bars varies from side "A1" to side "B1" (the sides without bus bars). Side "A1" is longer than side "B1." At side "A1," the distance between the bus bars is 50 inches and at side "B1" the distance between the bus bars is 25 inches. This non-uniformity in the distance between the bus bars can provide non-uniform effective voltage, $V_{eff}$, across the device, which can lead to non-uniform coloration of the device. This aspect is demonstrated in FIG. 5. As shown, the coloration of the device is darkest (optical transition more progressed) proximal side "B1" where the distance between the bus bars is shortest and the $V_{eff}$ is highest. The coloration of the device is lightest (optical transition less progressed) proximal side "A1" where the distance between bus bars is at a maximum and the $V_{eff}$ is at a minimum. In some cases, the $V_{app}$ applied to the bus bars could be increased to raise the $V_{eff}$ near "A1" to a level high enough to provide uniform coloration across the device. However, raising the $V_{app}$ could create an undesirable hotspot in areas closer to the shorter side "B1," which may increase the risk of damaging the device. These adjustments to try to equalize the $V_{eff}$ in the non-rectangular device with a planar bus bar configuration can potentially lead to over-driving the shorter side "B1" and/or under-driving the longer side "A1." Although certain dimensions are shown in the devices of the illustrated embodiments, other dimensions apply.

This application describes solutions for placement and lengthwise sizing of bus bars to meet the goals of uniform ending optical states and smooth and speedy optical transitions while minimizing or eliminating hotspots. In some embodiments, this is accomplished by configuring the bus bars so that the distance to both bus bars is equalized, to the extent possible, across the device surface while maintaining a high ratio of the total bus bar length to the device perimeter. Various techniques for accomplishing this result will be described herein. These solutions can be applied to non-rectangular (e.g., triangular, trapezoidal, arch-shaped, circular, quarter circular, etc.) shaped optically switchable devices. Some techniques employ a multi-step method that applies to different shape types (e.g., triangles, trapezoids, arches, etc.). Other techniques provide design constraints for particular types of shapes. Such constraints may define the general locations and lengths of bus bars on a particular shaped device.

One technique is to apply a perspective transformation method on the non-rectangular shape. This method linearly transforms the non-rectangular shape into an effective rectangular shape. A planar bus bar configuration can then be designed for the effective rectangular shape. The method then applies an inverse transformation on the effective rectangular shape with the associated planar bus bars to determine a bus bar layout for the non-rectangular shape. The transformation and inverse transformation steps may be applied multiple times if desired. One type of transformation that can be used is an affine transformation, which may preserve straight lines. If an affine transformation exists for non-rectangular shape to a rectangular shape, then this technique can be applied to determine critical distance of the device. In some cases, the affine transformation preserves length information as well.

Other methods accomplish effectively the same result using symmetry of the non-rectangular shape to determine bus bar configurations. Some methods determine a bus bar configuration that reduces or minimizes the shortest distance from the bus bars to the weakest coloration point (or "weakest point") on the face of the device. This distance can be referred to as the critical bus bar distance. The weakest point is typically the centroid of the shape. Likewise the strongest coloring point (or "strongest point") of the device is the shortest distance between opposing bus bars. Bus bar distance is defined by the sum of the distances between a point and each of the two bus bars.

Figure 6:
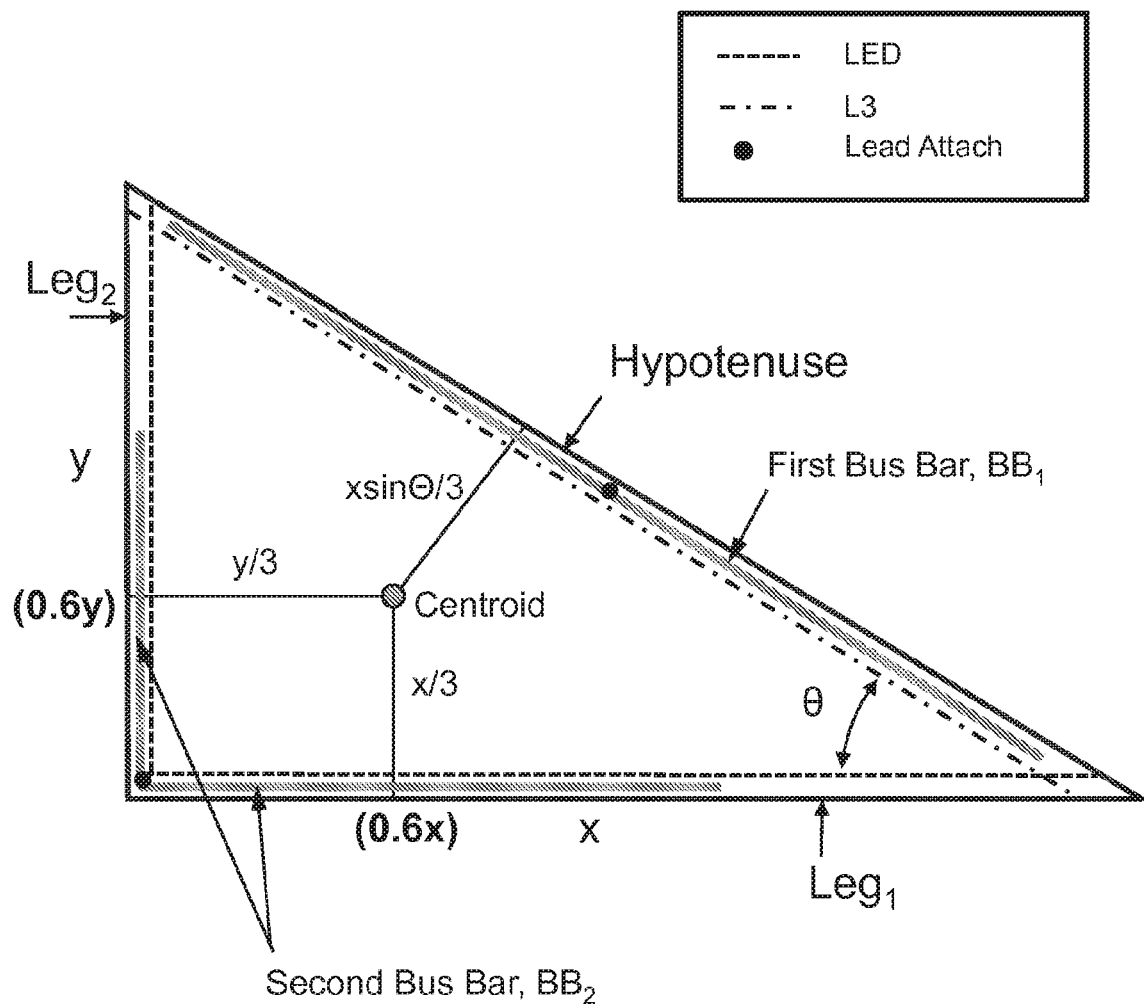
FIG. 6 is a schematic diagram of a top view of a right triangle shaped device with a bus bar configuration, according to embodiments.

FIG. 6 is a schematic diagram of a top view of a right triangle shaped optically switchable device with a bus bar configuration designed to equalize, to the extent possible, the effective voltage across the face of the device, according to embodiments. In some cases, this configuration may be based on minimizing the difference between the critical bus bar distance and the shortest distance between opposing bus bars. In FIG. 6, a first bus bar, $BB_1$, is located along the hypotenuse of the right triangle and a second bus bar, $BB_2$, is located along the two legs (leg 1 and leg 2) at the right angle opposite the hypotenuse. The length of leg 1 is x and the length of leg 2 is y. The centroid of the right triangle is at (x/3, y/3). The hypotenuse forms an angle, $\theta$, with leg 1. The length of the hypotenuse=$\sqrt{x^2+y^2}$. The critical bus bar distance is $(\min(x,y)+x \sin \theta)/3$. The lengths of the bus bars can be adjusted to reduce or minimize the critical bus bar distance. In the illustration, the $BB_1$ runs to the LED region and the vertical portion of $BB_2$ along leg 2 is 0.6y and the horizontal portion of $BB_2$ along leg 1 is 0.6x. In other embodiments, other lengths may be used. In one embodiment, the length of $BB_1$ may be in the range of $0.5\sqrt{x^2+y^2}$ to $1.0\sqrt{x^2+y^2}$. In one embodiment, the length of $BB_1$ may be in the range of $0.8\sqrt{x^2+y^2}$ to $0.9\sqrt{x^2+y^2}$. In one embodiment, the length of the portion of $BB_2$ along leg 2 may be in the range of 0.4y to 1.0y. In one embodiment, the length of the portion of $BB_2$ along leg 1 may be in the range of 0.4x to 1.0x. In one embodiment, the length of the portion of $BB_2$ along leg 2 may be in the range of 0.4y to 0.80y. In one embodiment, the length of the portion of $BB_2$ along leg 1 may be in the range of 0.4x to 0.80x. In one embodiment, the length of the portion of $BB_2$ along leg 2 may be in the range of 0.5y to 0.7y. In one embodiment, the length of the portion of $BB_2$ along leg 1 may be in the range of 0.5x to 0.7x. These lengths and others may be determined from methods described herein, such as the method described with reference to FIG. 11. In some embodiments, the bus bar lengths may be chosen to avoid overlapping the edge scribes.

Figure 7:
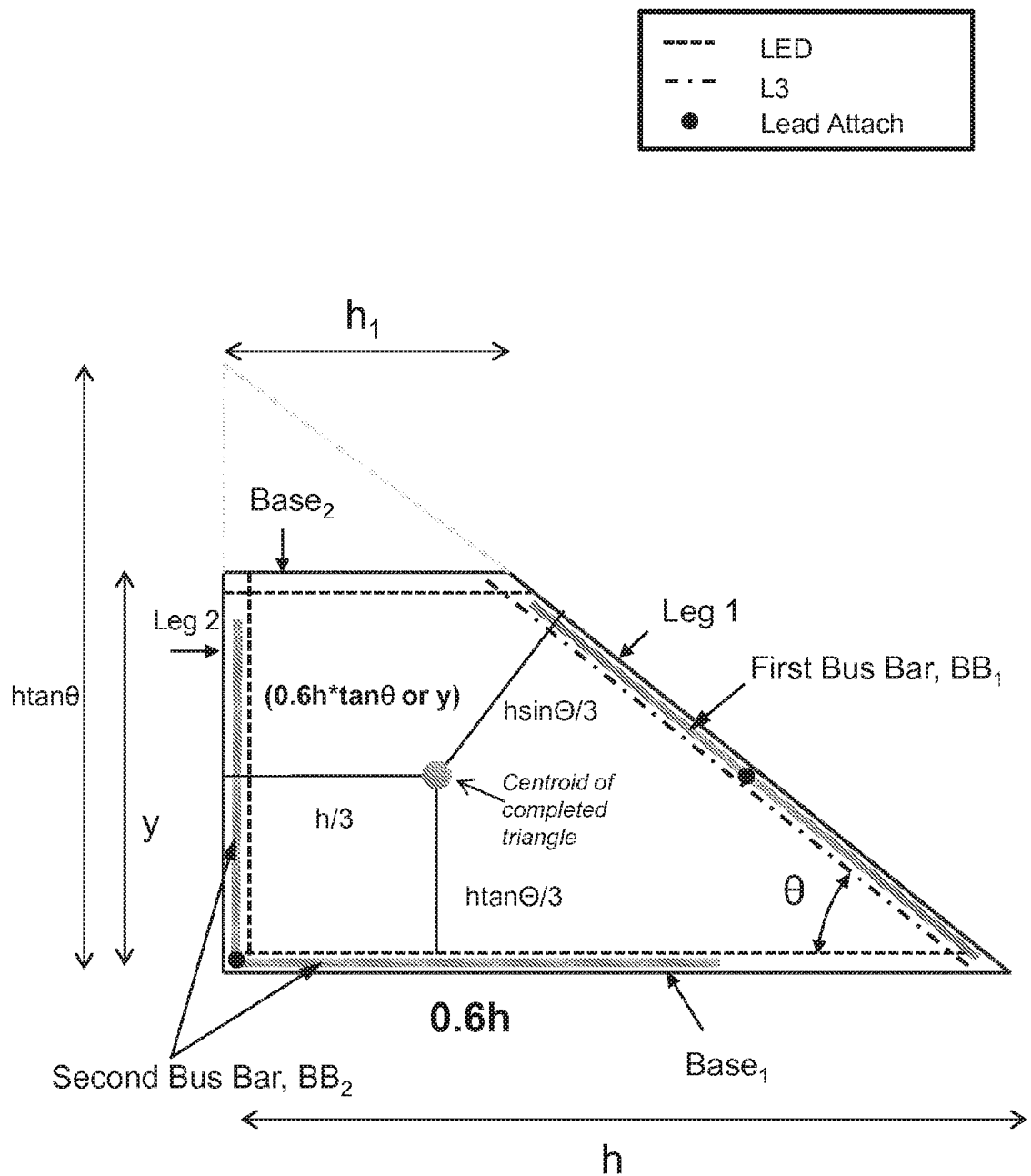
FIG. 7 is a schematic diagram of a top view of a right trapezoid shaped device with bus bars in a first configuration along the right angle and the opposing leg, according to embodiments.

FIG. 7 is a drawing of a top view of a right trapezoid shaped device with bus bars in a first configuration (Configuration 1). In FIG. 7, the right trapezoid includes two parallel sides, Base 1 and Base 2, and two other sides, Leg 1 and Leg 2. A first bus bar, $BB_1$, is located along the leg 1 and a second bus bar, $BB_2$, is located along both base 1 and leg 2 at the right angle of the right trapezoid. The length of base 1 is h, the length of leg 2 is y, and the length of base 2 is $h_1$. Leg 1 forms an angle, $\theta$, with Base 1. The centroid of the right trapezoid is at (h/3, (h tan $\theta$)/3). This bus bar configuration of FIG. 7 is similar in certain ways to the configuration for the right triangle shaped device shown in FIG. 6. For example, the bus bar configurations in both FIG. 6 and FIG. 7 include a bus bar located along a right angle portion and another bus bar located at an opposing side.

In FIG. 7, the bus bars are designed to equalize, to the extent possible, the effective voltage over the face of the device, according to embodiments. In some cases, this configuration may be based on minimizing the difference between the critical bus bar distance and the shortest distance between opposing bus bars. For the trapezoid described in FIG. 7, the critical bus bar distance=$(\min(h_1 \tan \theta, y)+(h \sin \theta))/3$. To reduce or minimize the critical bus bar distance, if y<0.6 h tan $\theta$, then the portion of $BB_2$ along leg 2 will be equal to length y, otherwise, this portion has a length of 0.6 h tan $\theta$. This is a general guideline, and other rules may apply. In the illustrated embodiment, the portion of $BB_2$ along base 1 has a length of about 0.6 h and $BB_1$ along leg 1 has a length from between 0.8-1.0 times the length of Leg 1. In other embodiments, other lengths may be used. In one embodiment, the length of $BB_1$ may be in the range of 0.4-0.8 times the length of Leg 1. In one embodiment, the length of $BB_1$ may be in the range of 0.5-0.7 times the length of Leg 1. In one embodiment, the portion of $BB_2$ along Base 1 may have a length in the range of 0.4 h-1.0 h. In one embodiment, the portion of $BB_2$ along Base 1 may have a length in the range of 0.6 h-0.8 h. These lengths may be determined from methods described herein, such as the method described with reference to FIG. 11.

Figure 8:
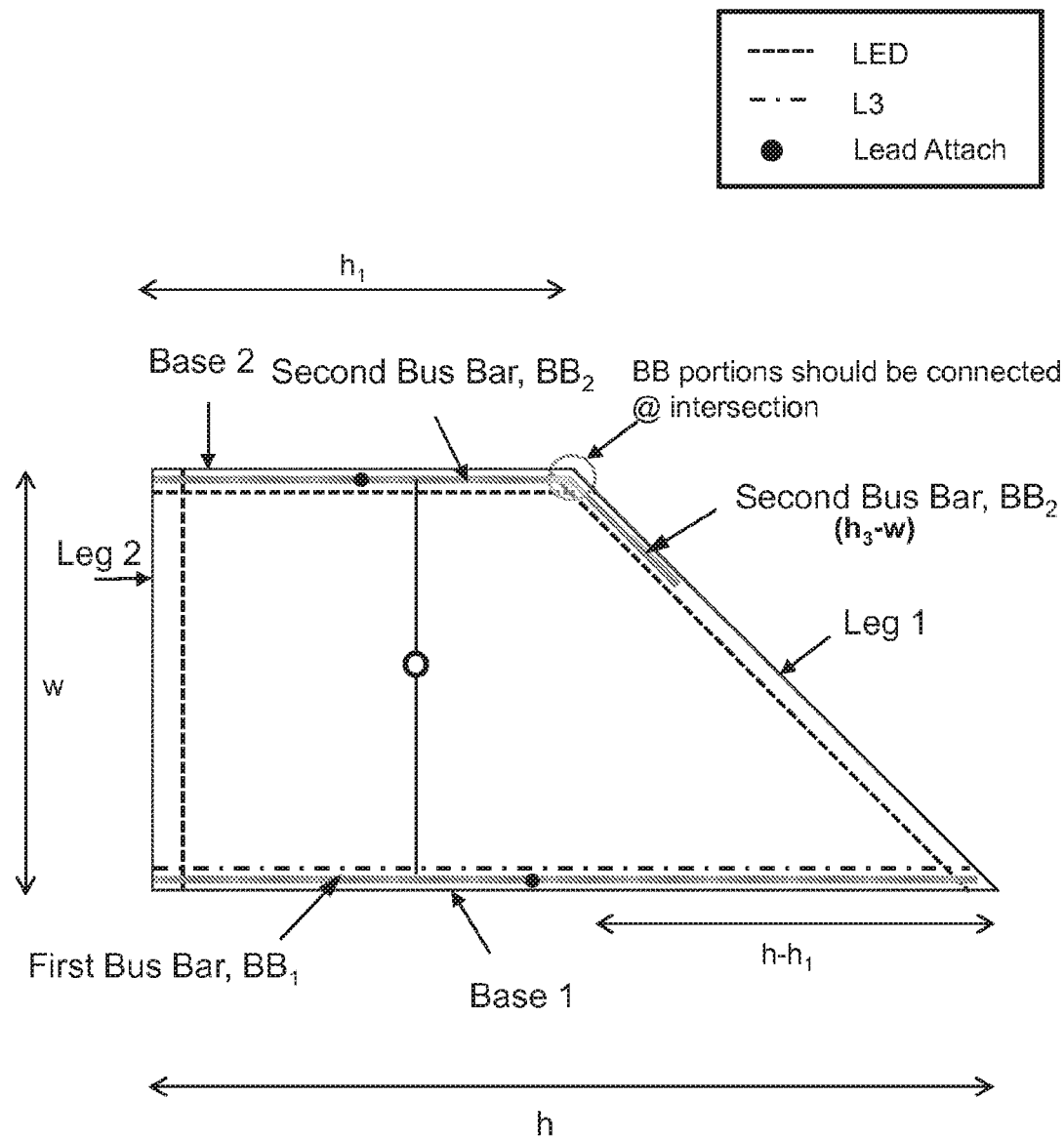
FIG. 8 is a schematic diagram of a top view of a right trapezoid shaped device with bus bars in a second configuration having a first bus bar along a first base and a second bus bar along a second base and adjacent leg, according to embodiments.

FIG. 8 is a drawing of a top view of a right trapezoid shaped device with bus bars in a second configuration (Configuration 2). The right trapezoid includes two parallel opposing sides, base 1 and base 2, and two non-parallel opposing sides, leg 1 and leg 2. A first bus bar, $BB_1$, is located along base 1 and a second bus bar, $BB_2$, is located along leg 1 and base 2. This bus bar configuration (Configuration 2) is similar to the planar bus bar configuration used for rectangular devices illustrated in FIGS. 4 and 1A, in that a bus bar is located along the longest side and a bus bar is located opposing the first bus bar. The length of base 1 is h, the length of leg 2 is w, the length of base 2 is $h_1$, and the length of leg 1 is $h_3$. In FIG. 8, $h_3$=sqrt[$(h-h_1)^2+w^2$]. In FIG. 8, the critical bus bar distance is w. In some cases, the length of the portion of $BB_1$ extending along Leg 1 ranges from about 0 inches to 15 inches. In one embodiment, the length of the portion of $BB_1$ extending along Leg 1 is in the range of about 0.03-0.40 times the length of Leg 1. In one embodiment, if $(h_3-w)<(-0.06$ w+5.48$)$, then $BB_1$ does not include a portion along Leg 1. In the illustrated embodiment, the length of the portion of $BB_2$ extending along Leg 1 may be about $h_3-w$. In one case, $BB_1$ may along the entire length of Base 1 and $BB_2$ may extend along the entire length of Base 2. These lengths may be determined from methods described herein, such as the method described with reference to FIG. 11.

Figure 9:
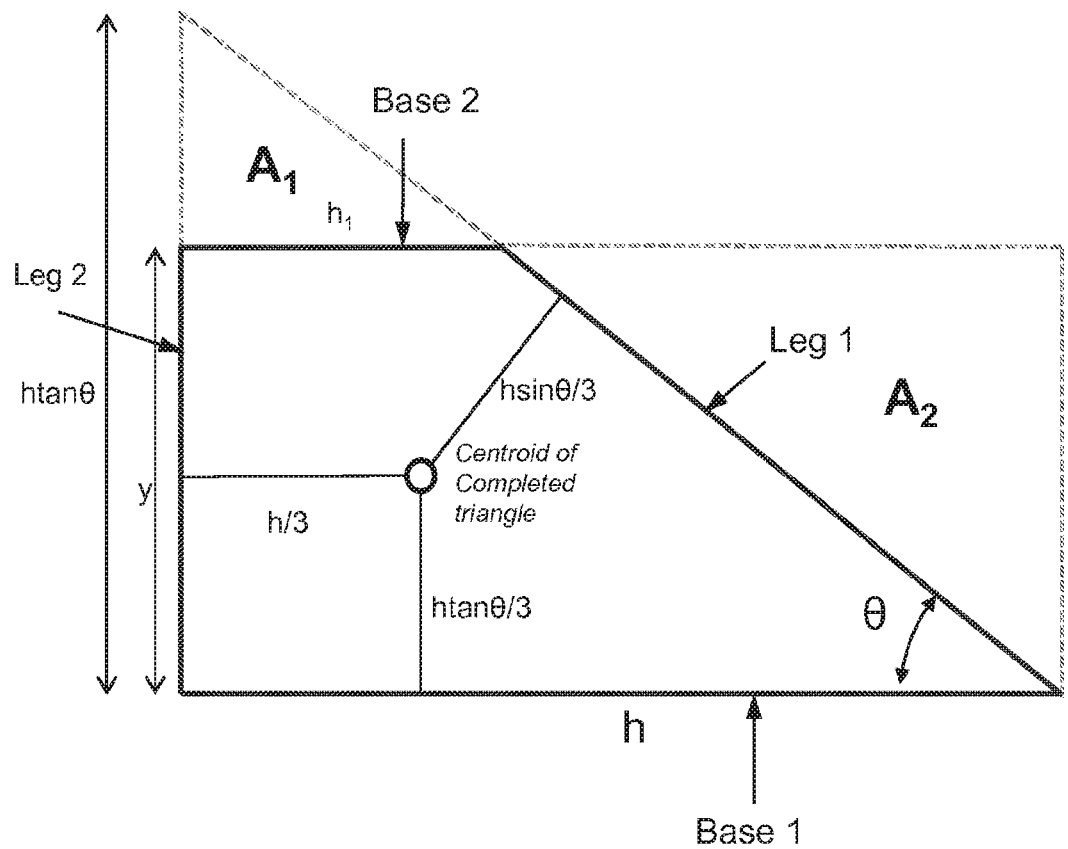
FIG. 9 is a schematic diagram depicting a first method for selecting a bus bar configuration for a right trapezoid shaped device, according to embodiments.
Figure 10:
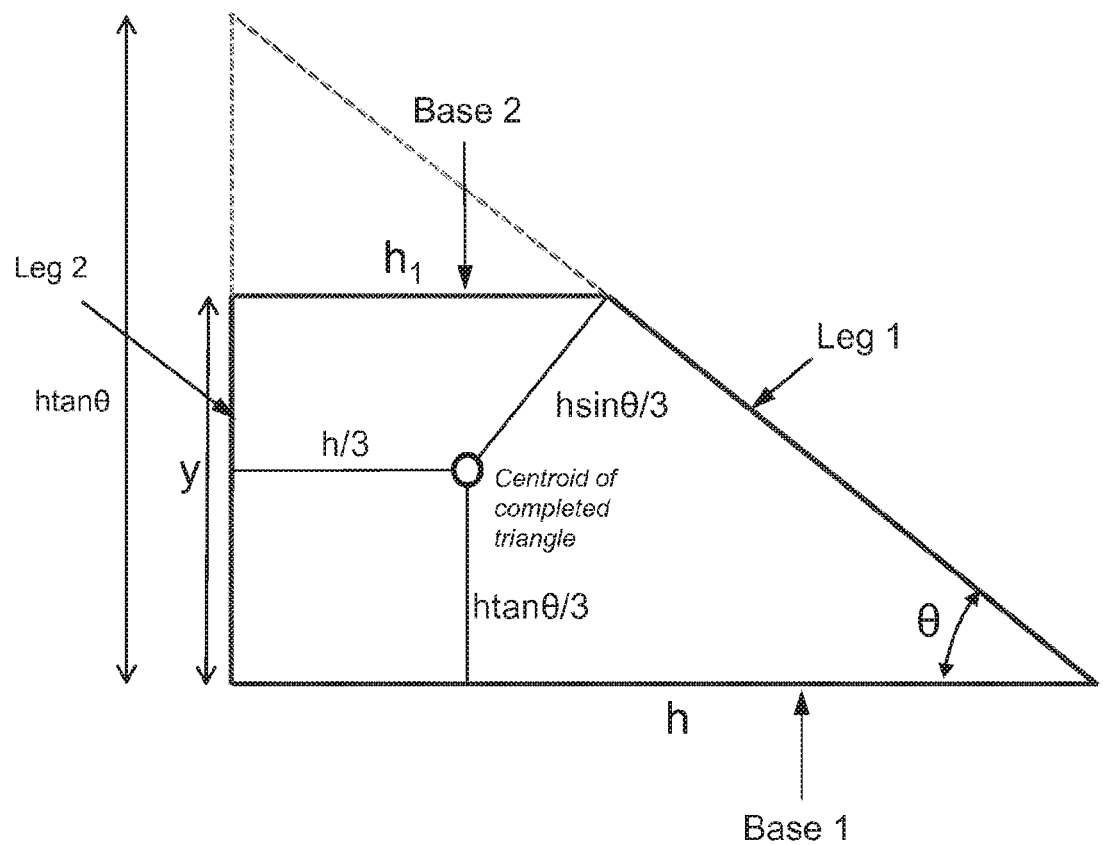
FIG. 10 is a schematic diagram depicting a second method for selecting a bus bar configuration for a right trapezoid shaped device, according to embodiments.

Certain embodiments include methods of determining whether to treat a right trapezoid (and other shapes) shaped device as a variant of a right triangle or as a variant of a rectangle. A first method is schematically depicted in the diagram shown in FIG. 9. With this method, it is determined whether the area ($A_1$) required to turn the right trapezoid into a right triangle is less than or greater than or equal to the area ($A_2$) required to turn the trapezoid into a rectangle. If $A_1 < A_2$, then the bus bar configuration 1 is used as shown in FIG. 7. If $A_1 \geq A_2$, then configuration 2 from FIG. 8 is used. A second method for selecting a right trapezoidal bus bar configuration is schematically depicted in the diagram shown in FIG. 10. This second method adjusts the bus bars to reduce or minimize critical bus bar distance. This second method determines whether to use a particular bus bar configuration based on the dimensions of the shape. If $y \geq (\min(h \tan \theta, h) + (h_1 \sin \theta))/3$ and $h_1 < (\min(h \tan \theta, h) + (h \sin \theta))/3$, then the bus bar configuration in FIG. 7 (Configuration 1) is used, otherwise the bus bar configuration in FIG. 8 (Configuration 1) is used. This method minimizes the maximum critical BB distance. There may be a reliability advantage with this method since lower voltage would be used to power device. These methods may provide more reliable devices since the applied voltage needed to uniformly transition the device to ending optical states may be reduced.

Figure 11:
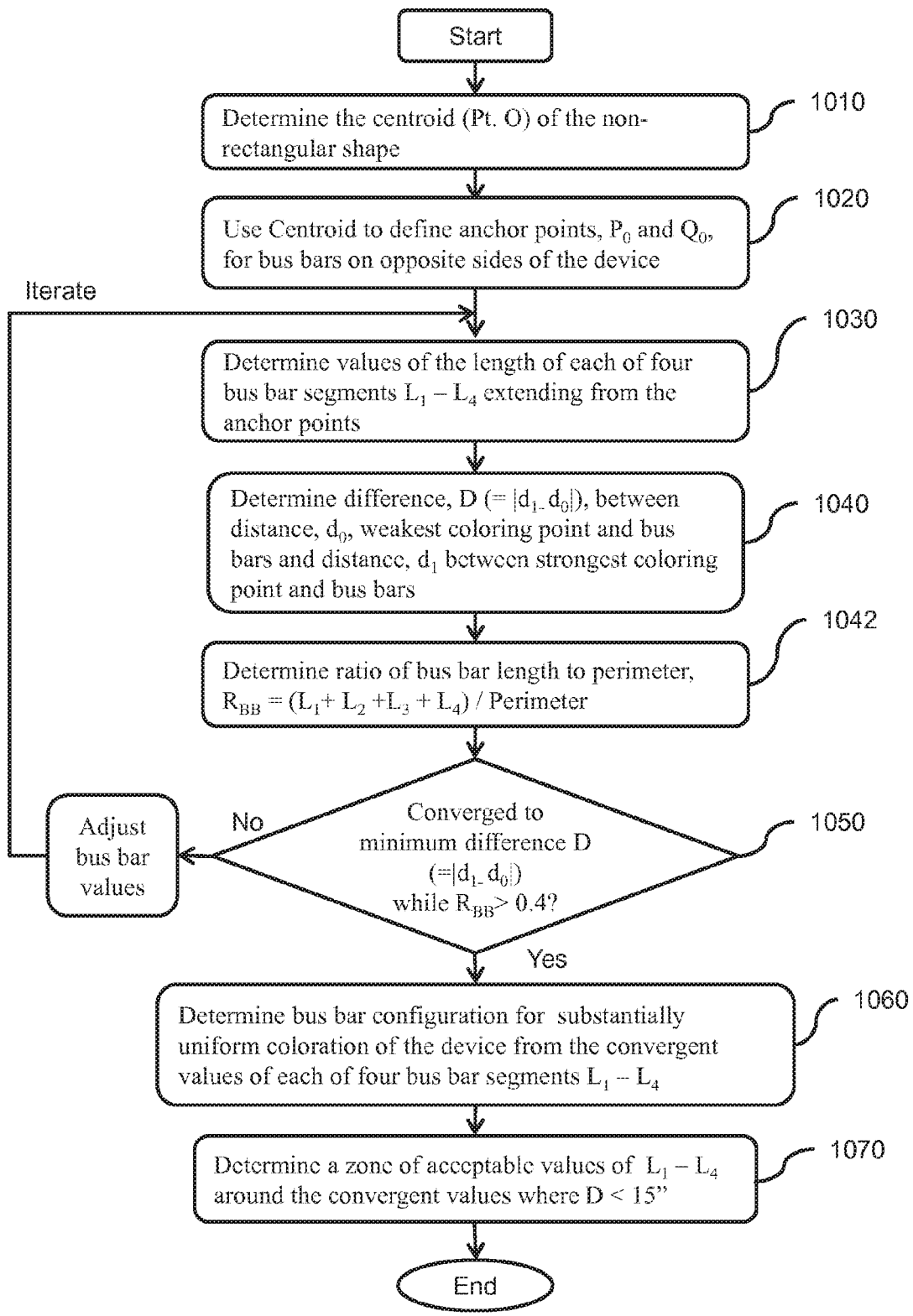
FIG. 11 is a flowchart depicting a second method for determining lengths of bus bars, according to embodiments.
Figure 12:
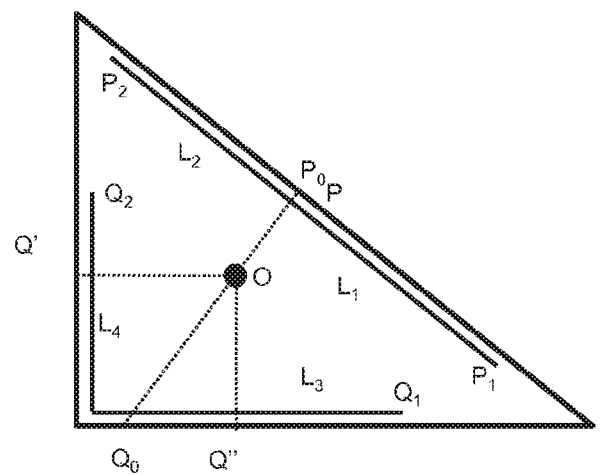
FIG. 12 is a schematic diagram showing the application of a method of determining a bus bar configuration to a right triangle and two right trapezoids, according to embodiments.
Figure 12:
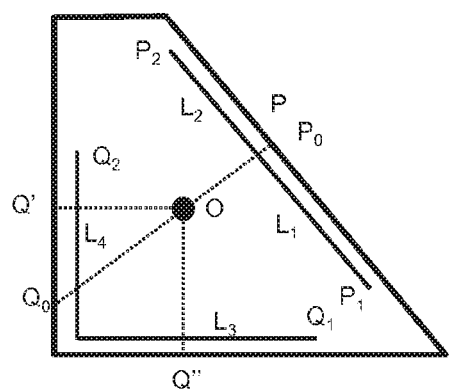
Figure 12:
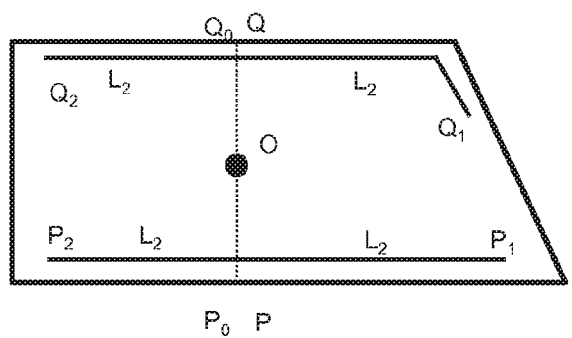

Certain embodiments include a method for determining bus bar placement and lengthwise sizing involve using symmetry of the non-rectangular shape to determine the location of the bus bars. A flow chart depicting this method is shown in FIG. 11. FIG. 12 is a diagram showing the application of this method to a right triangle and two right trapezoids. This method determines the lengths of each four bus bar segments, $L_1$-$L_4$, extending from two anchor points, $P_0$ and $Q_0$. This method determines lengths that reduce or minimize the difference between the bus bar distance at the weakest coloring point (presumed to be at the centroid) of the device and the bus bar distance at the strongest coloring point of the device. In certain embodiments, the lengths of each of the four bus bar segments are convergent lengths, that is, the lengths are calculated each to a convergent length, where the difference between the bus bar distance at the weakest and at the strongest point is reduced or minimized. These lengths can be used to determine an optical bus bar layout. Coloring strength is defined by the sum of the distances between a point and each of the two bus bars.

At step 1010, this method determines the centroid (i.e., geometrical center) of the shape designated as point O in some illustrated examples. In most cases, the centroid is assumed to be the weakest coloring point on the colorable area of the device.

At step 1020, the method uses the centroid to define anchor points ($P_0$ and $Q_0$) for bus bars on opposite sides (boundaries) of the device. First, a line is dropped from the centroid to the longest side of the shape to define $P_0$. Next, intersect the perpendicular line with the opposite side of the device to define $Q_0$. The intersections of the line with the opposing sides of the device define the anchor points, $P_0$ and $Q_0$, for the bus bars. This line is represented by $P_0$-$Q_0$). The anchor points determine the starting sides for the bus bars.

At step 1030, the method determines values of the length of each of four bus bar segments $L_1$-$L_4$ extending from the anchor points. In the first iteration, the values are initialized. For example, the values may be initialized such that the total bus bar length, $L_1+L_2+L_3+L_4$, is equal to the device perimeter. FIG. 12 shows a diagram defined geometry of the bus bars for three shapes. From point $P_0$, a line is drawn of length $L_1$ parallel to the first starting side to define point $P_1$. Another line is drawn of length $L_2$ in the opposite direction from point $P_0$ to define point $P_2$. If the line reaches a corner before $L_2$ can be drawn, then the line continues past the corner along the new edge. From point $Q_0$, a line is drawn of length $L_3$ parallel to the second starting side to define Point $Q_1$. Another line is drawn of length $L_4$ in the opposite direction from $Q_0$ to define point $Q_2$. If the line reaches a corner before $L_4$ can be drawn, then the line continues past the corner to the new edge. Draw a perpendicular from the centroid at point O to intersect the bus bar line containing Point $P_0$ to define the intersection point as Point P. If the bus bar extends to more than one side, then draw perpendicular lines from the centroid to each of the sides to define points P', P'', P''', etc. Draw a perpendicular from the centroid at point O to intersect the bus bar line containing Point $Q_0$ and define the intersecting point as Point Q. If the bus bar extends to more than one side, then draw perpendicular lines from the centroid to each of the sides to define points Q', Q'', Q''', etc.

At step 1040, the method determines the difference, D, between the distance $d_0$ between the weakest coloring point and the bus bars and the distance $d_1$ between the strongest coloring point and the bus bars. That is, $D = |d_1 - d_0|$ is determined. To determine the bus bar distance at the weakest coloring point, a minimum distance D0_P from the centroid to the bus bar at the side containing P/P'/P''/P''', etc. is determined and a minimum distance D0_Q from the bus bar at the side containing Q/Q'/Q''/Q''' is determined. The maximum distance D0_P is the maximum distance between the following pairs of points: a) O-P, b) O-P', c) O-P'', and d) O-P''', etc. The minimum distance D0_Q is the maximum distance between the following pairs of points: a) O-Q, b) O-Q', c) O-Q'', and d) O-Q''', etc. The bus bar distance at the weakest coloring point, d0=D0_Q+D0_P. The bus bar distance at the strongest coloring point, d1, is the reduced or minimum distance between the opposite bus bars anchored by points P, Q.

At step 1042, the method also determines the ratio of the total bus bar length to the perimeter $R_{BB}$ which is the sum of the lengths of the individual BB segments ($L_1$, $L_2$, $L_3$, and $L_4$) divided by the perimeter of the part (e.g. the active area of the device coating or the perimeter of the substrate).

At step 1050, the method determines whether the method converged to a reduced or minimum difference $D = |d_1 - d_0|$ while maintaining $R_{BB} > 0.4$. If the method has not converged, the bus bar values are adjusted to new values and a new iteration begins by returning to step 1030. If the method has converged, the method determines a bus bar configuration for substantially uniform coloration of the device from the current values at that iteration for the values of each of four bus bar segments $L_1$-$L_4$ (step 1060). These may be termed the "convergent values" of each of the bus bar segments.

In an optional step 1070, the method determines a zone of acceptable values for $L_1$-$L_4$ around the convergent values determined at step 1060. These values provide a broader range of bus bar dimensions that provide substantially uniform coloration. In some cases, the user can select one or more sets of acceptable values in the zone that may be most advantageous for various reasons such as, for example, easier to produce, improved aesthetics, etc. In optional step 1070, the zone can be defined around the solution determined in step 1040. The zone can be defined as one or more sets of values for $L_1$-$L_4$ within a predefined D value (e.g., D<15 inches, D<20 inches, etc.) from the solution determined in step 1040. In one example, the method may determine a zone of sets of acceptable $L_1$-$L_4$ values around lengths of $L_1$-$L_4$ where D<15 inches.

In one embodiment, the method may adjust the values of the lengths from the convergent values by small increments and calculate the difference D based on the adjusted values. If the calculated D is within the predefined maximum D value, the adjusted values of the lengths are within the zone of acceptable values. The method may continue to adjust the values of the lengths further from the convergent values until a certain number of sets of acceptable values are determined. In some cases, the user may provide additional input to determine whether certain sets of values are acceptable. For example, the user may set a minimum length to be a certain value (e.g., 0.50 inches). In this example, the user may set this minimum based on the difficulty in manufacturing a bus bar segment less than the minimum.

Figure 13A:
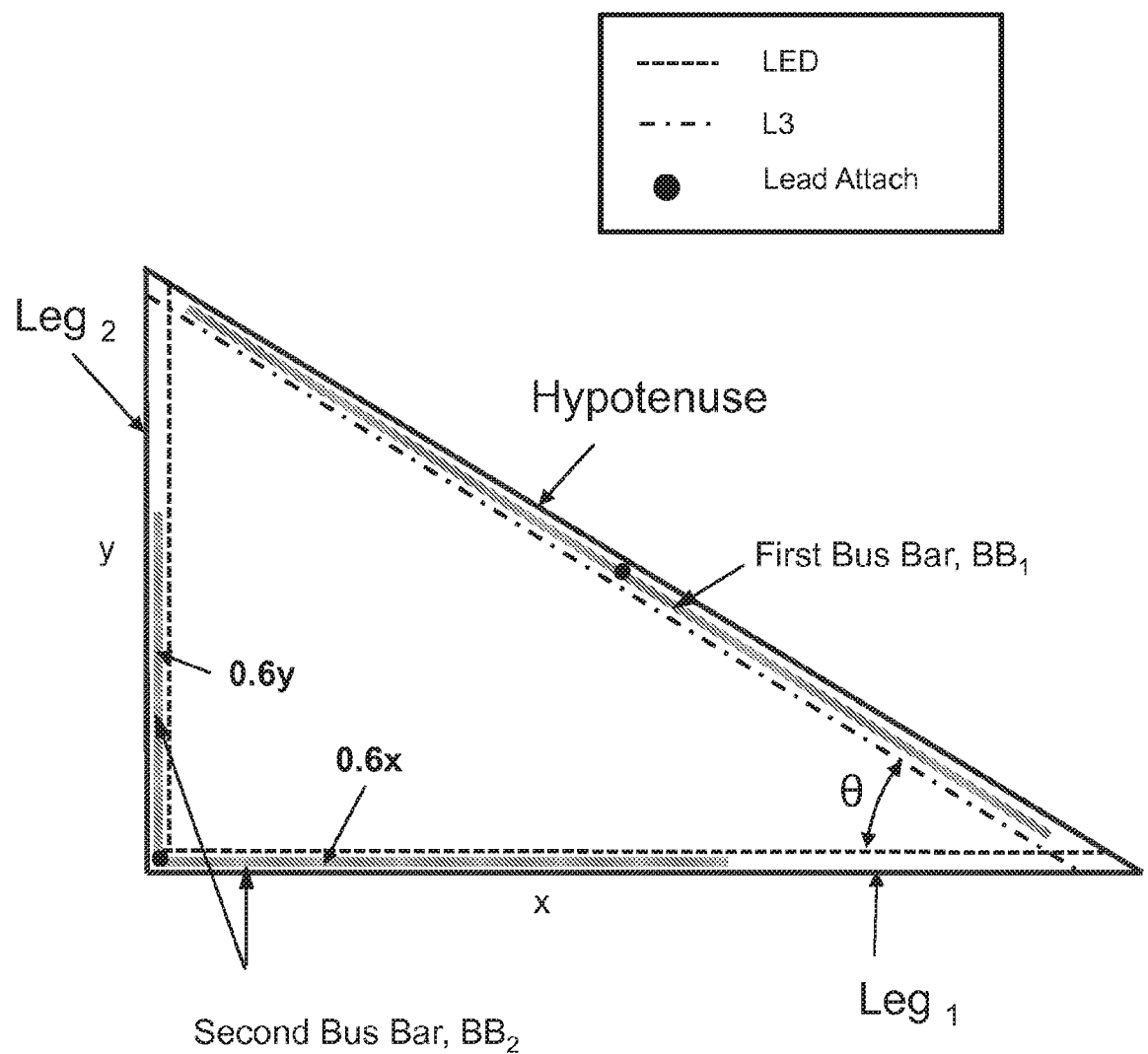
FIGS. 13A-13C are schematic diagrams showing solutions for acceptable bus bar layouts for a right triangle and two right trapezoids, according to embodiments.
Figure 13B:
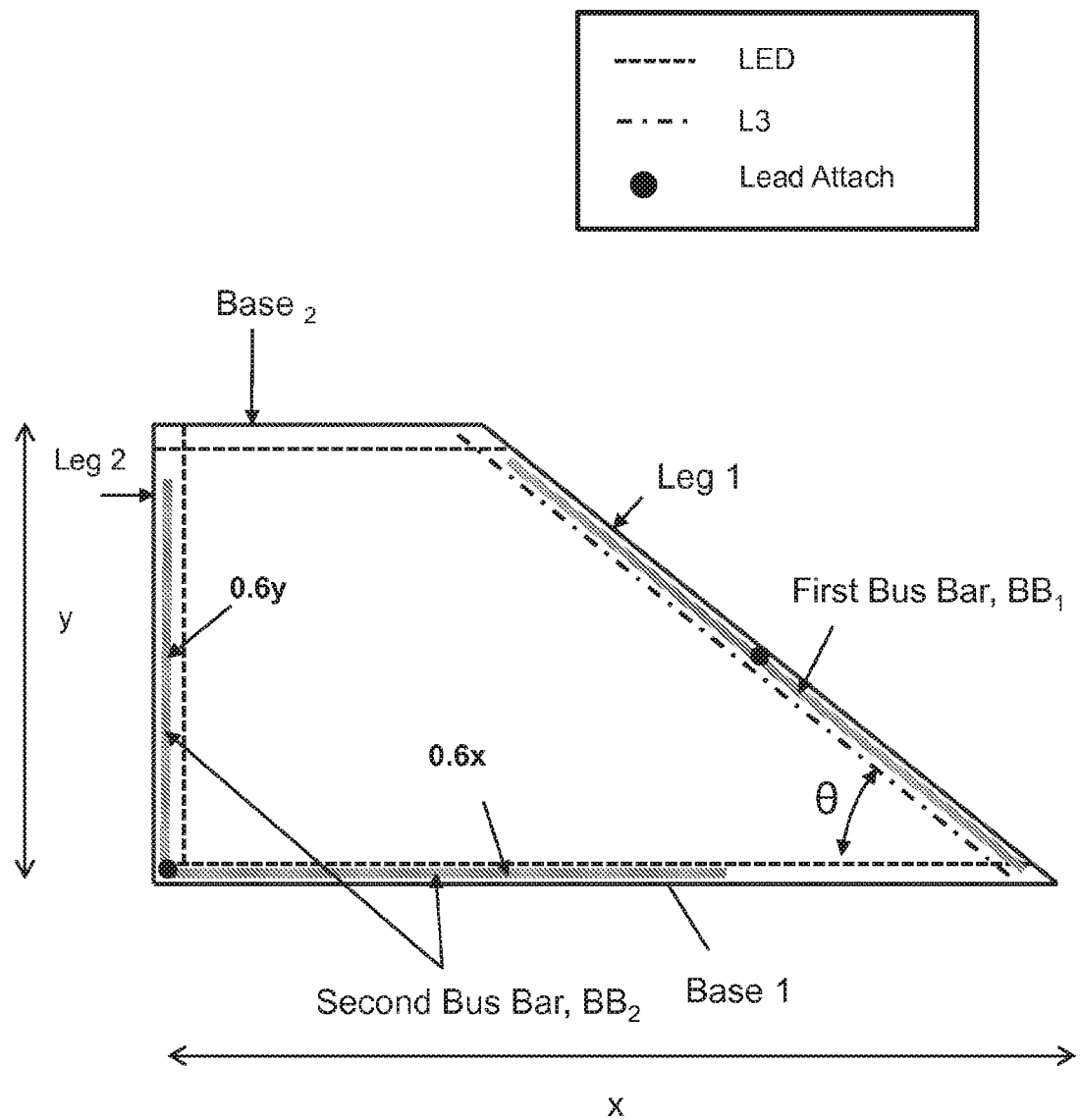
Figure 13C:
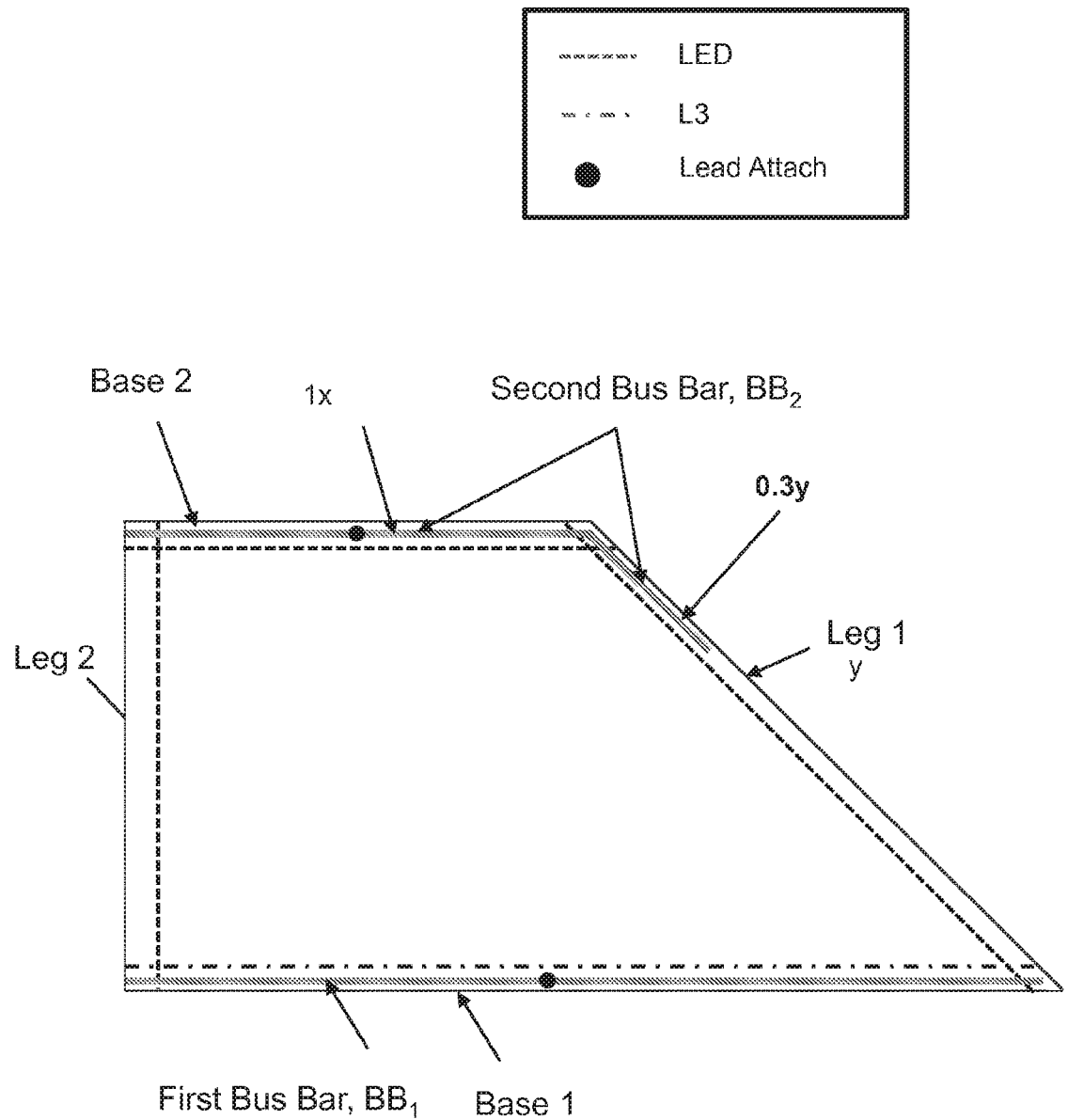

In certain embodiments, the method described with reference to FIG. 11 can be used to determine a generic solution for a particular shape type that can be applied to any shape of that type. The solution can be based on the convergent value or an acceptable value. Some examples of generic solutions of bus bar layouts are shown in FIGS. 13A-13C for a right triangle and two right trapezoids. Other generic solutions are described herein. Using these generic solutions, bus bar layouts for uniform coloration can be determined from calculations based on the shape dimensions. For example, the solution shown in FIG. 13A provides a bus bar along the right angle with a length of 0.6 times the length of leg 1 and length of 0.6 times the length of leg 2. In this particular triangle shaped device, leg 1 is 90" and leg 2 is 45", and the $BB_2$ is 54" along leg 1 and 27" along leg 2.

In some cases, it may be advantageous from an operations stand-point to have the bus bar connected to the lower layer located along a continuous side, which can drive the location of the edges where the bus bars will be configured. For example, FIG. 13C has $BB_1$ connected to the lower layer and is located on the continuous edge along base 1. $BB_2$ is then located on the opposing non-continuous edges along Base 2 and Leg 1.

Figure 14A:
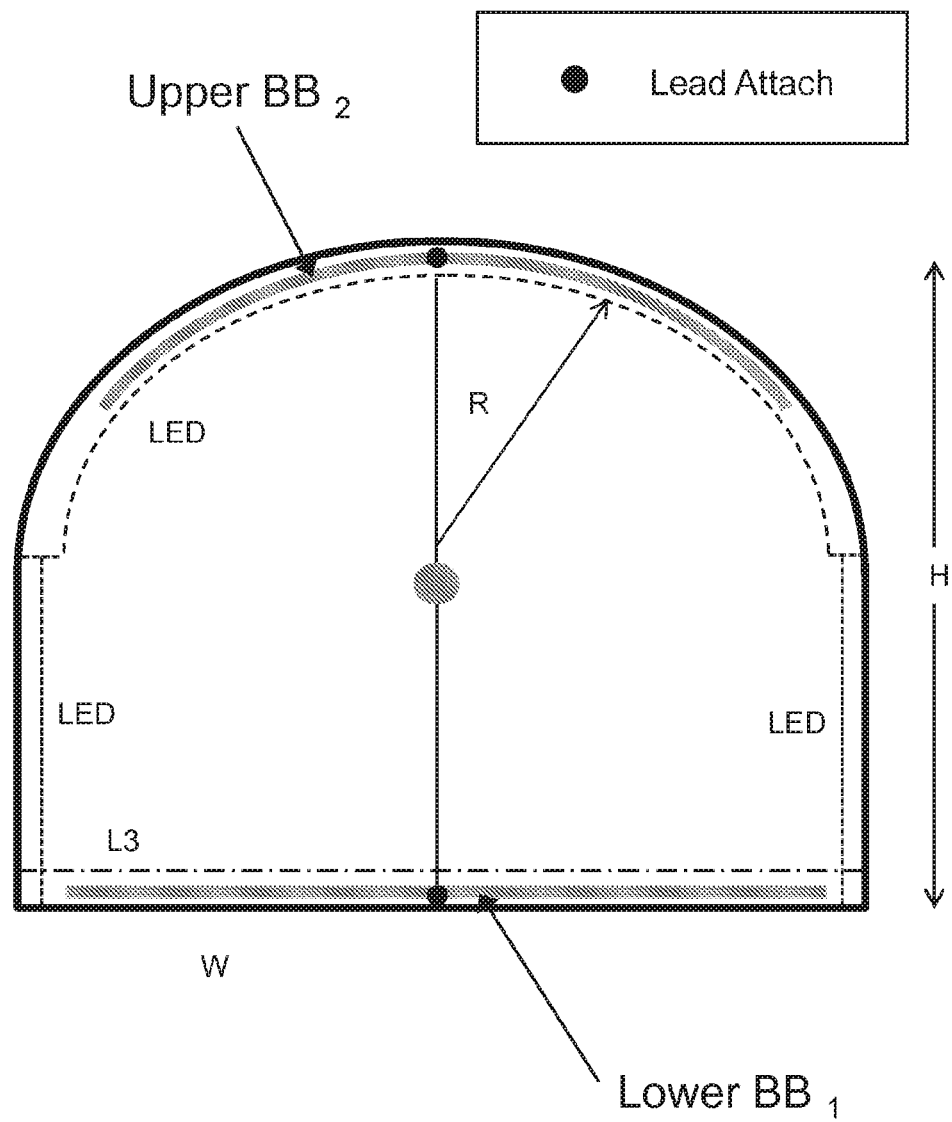
FIGS. 14A, 14B, 15, 16, 17, and 18 are examples of bus bar layouts designed with technique(s) described herein according to embodiments.
Figure 14B:
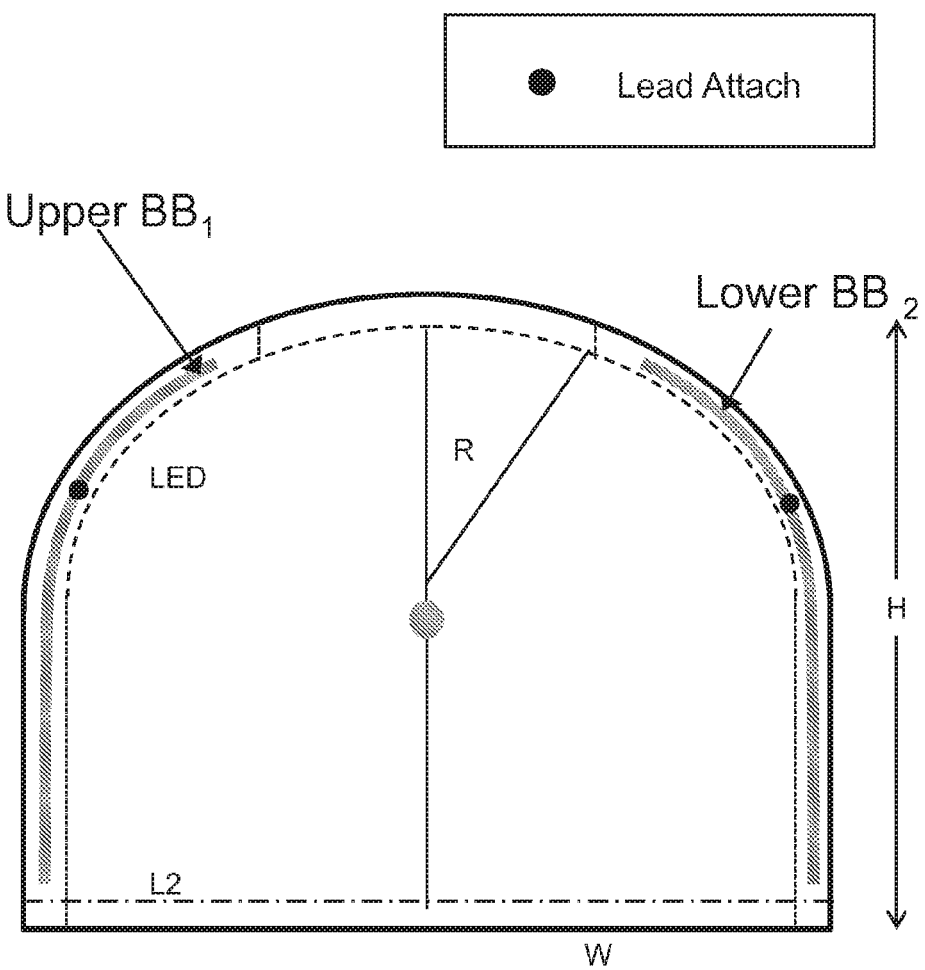
Figure 15:
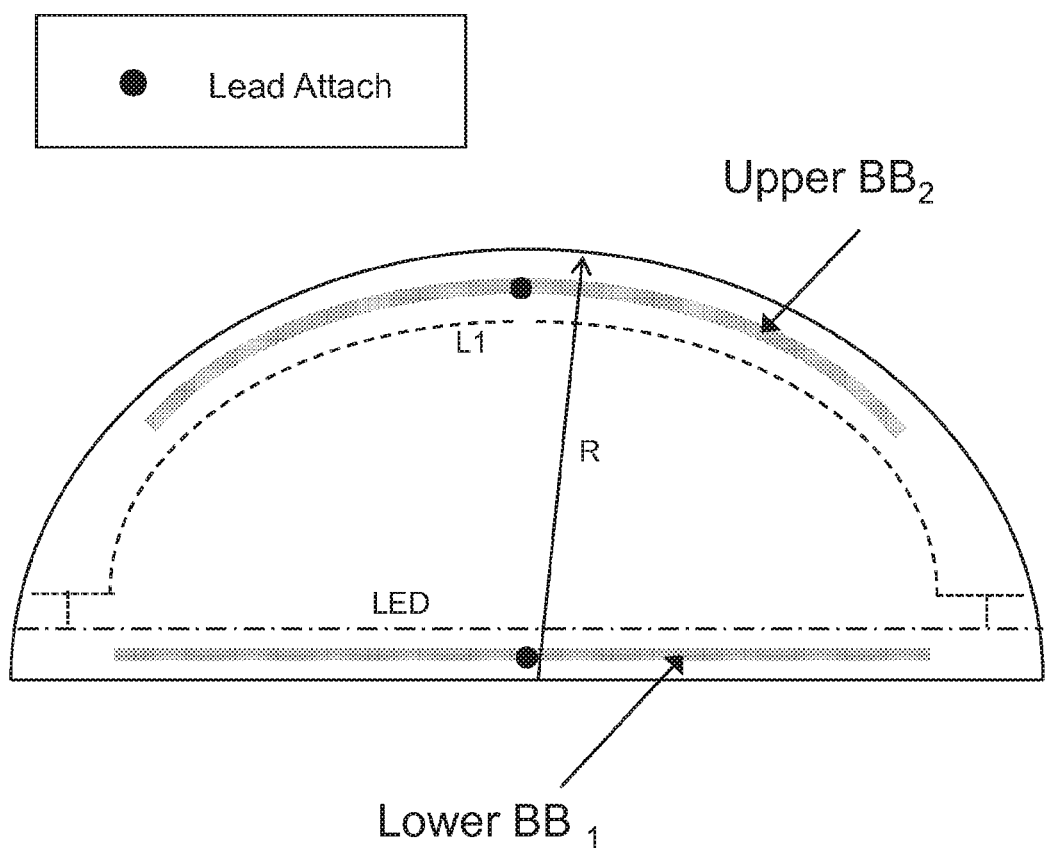
Figure 16:
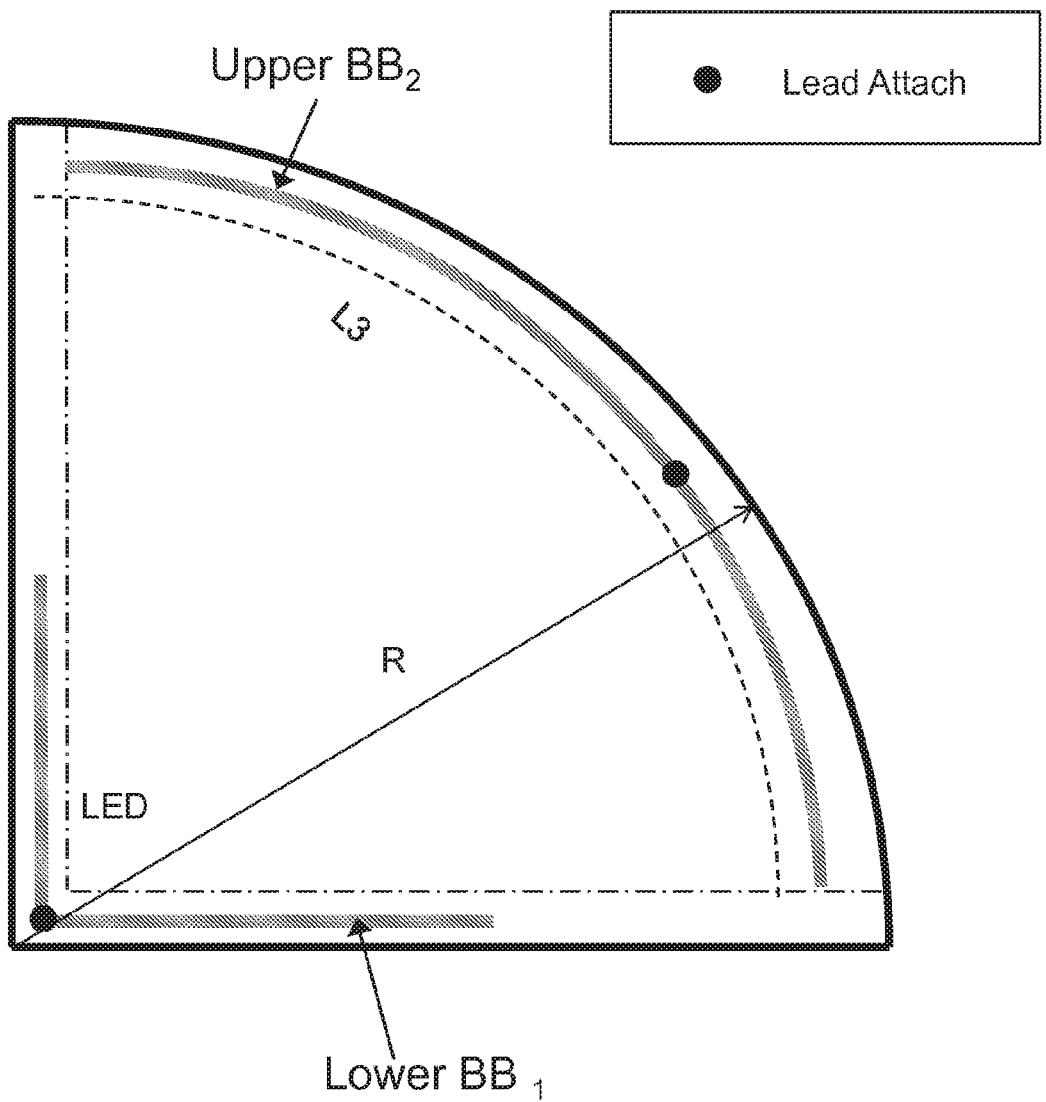
Figure 17:
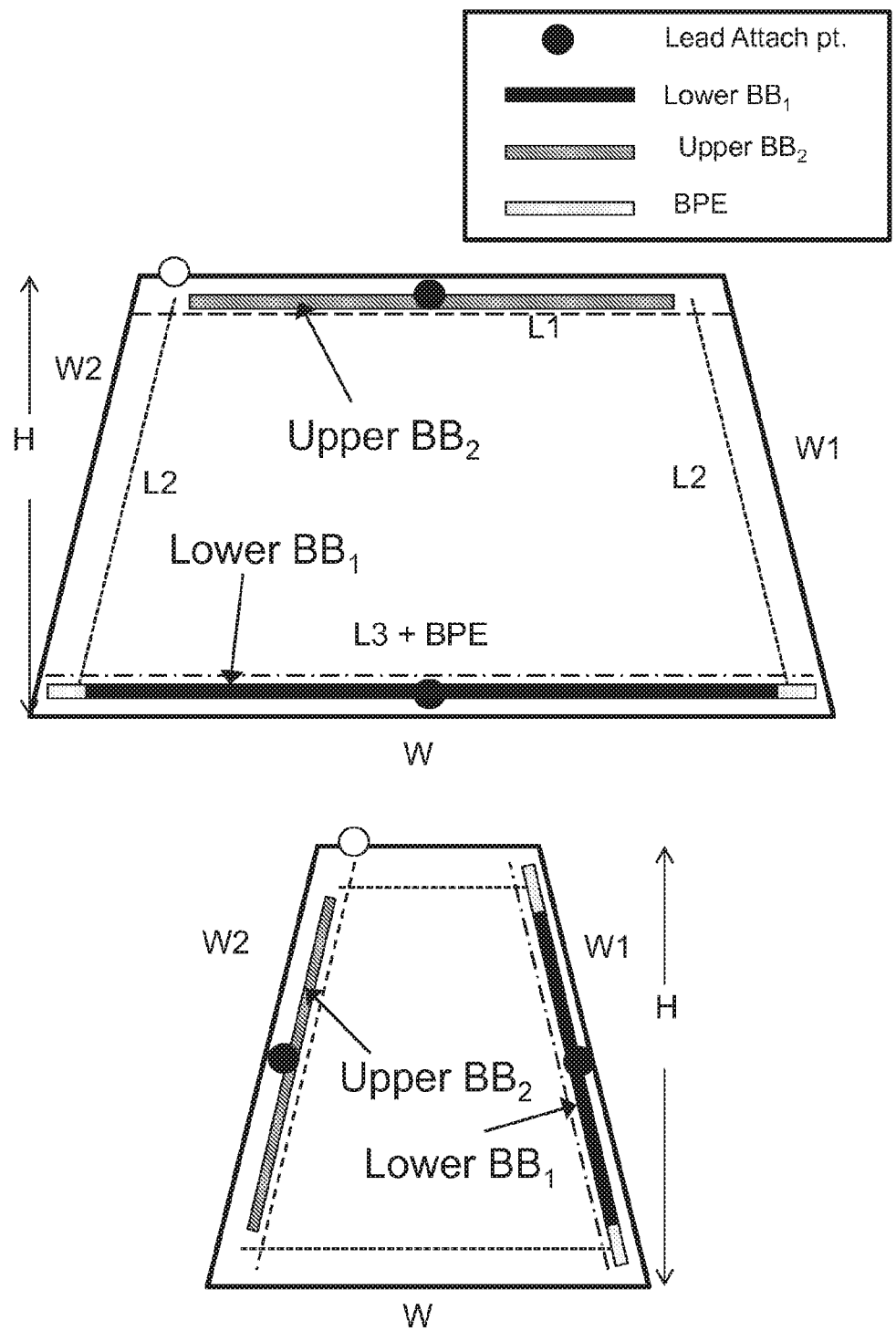

Although the bus bar layouts for right trapezoids and/or right triangles are described with reference to certain embodiments, bus bar configurations for other shapes (e.g., parallelogram, semicircle, quarter circle, etc.) can be designed using the techniques described herein. Some examples of bus bar configurations designed with techniques described herein are shown in FIGS. 14A, 14B, 15, 16, 17, and 18. FIG. 14A depicts an example of a first bus bar configuration for an arch shaped device. FIG. 14B depicts an example of a second bus bar configuration for an arch shaped device. FIG. 15 depicts an example of a bus bar configuration for a semicircle device. FIG. 16 is an example of a bus bar configuration for a quarter circle device. FIG. 17 depicts examples of bus bar configurations for trapezoidal shaped devices.

Figure 18:
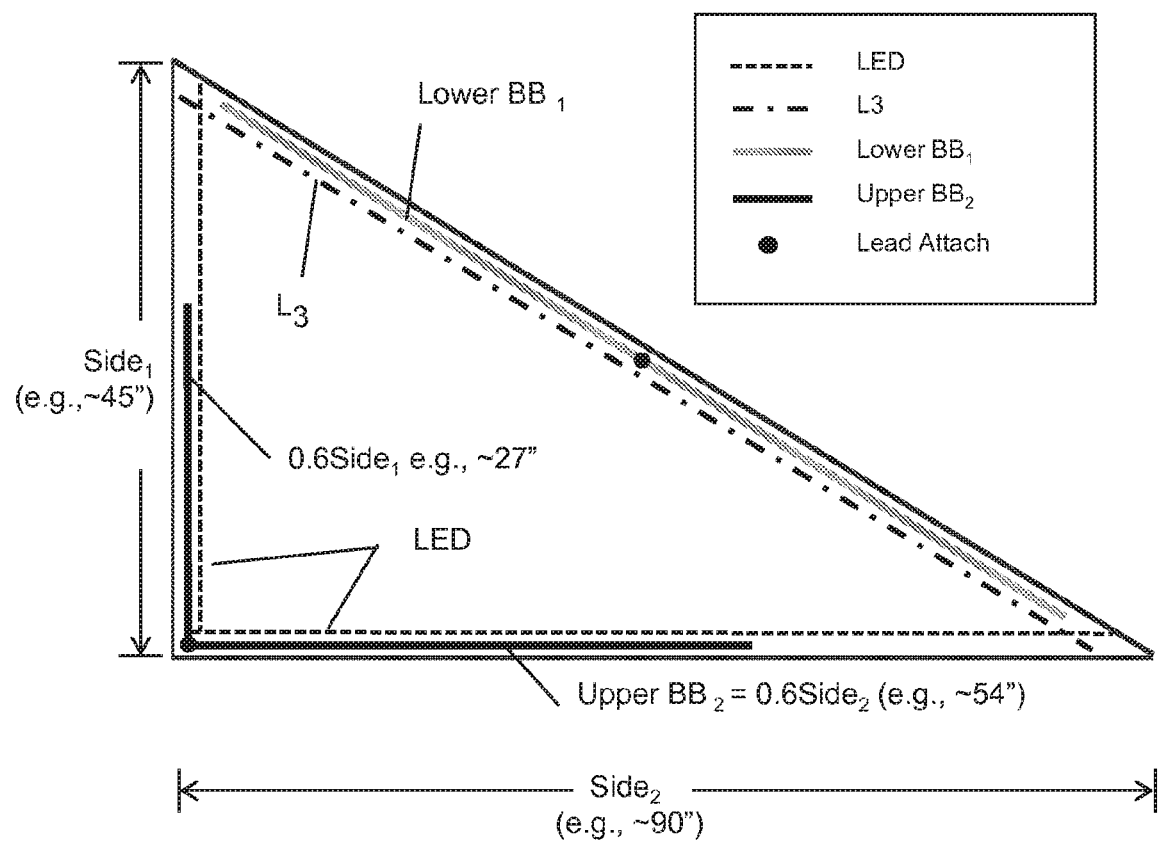
Figure 20:
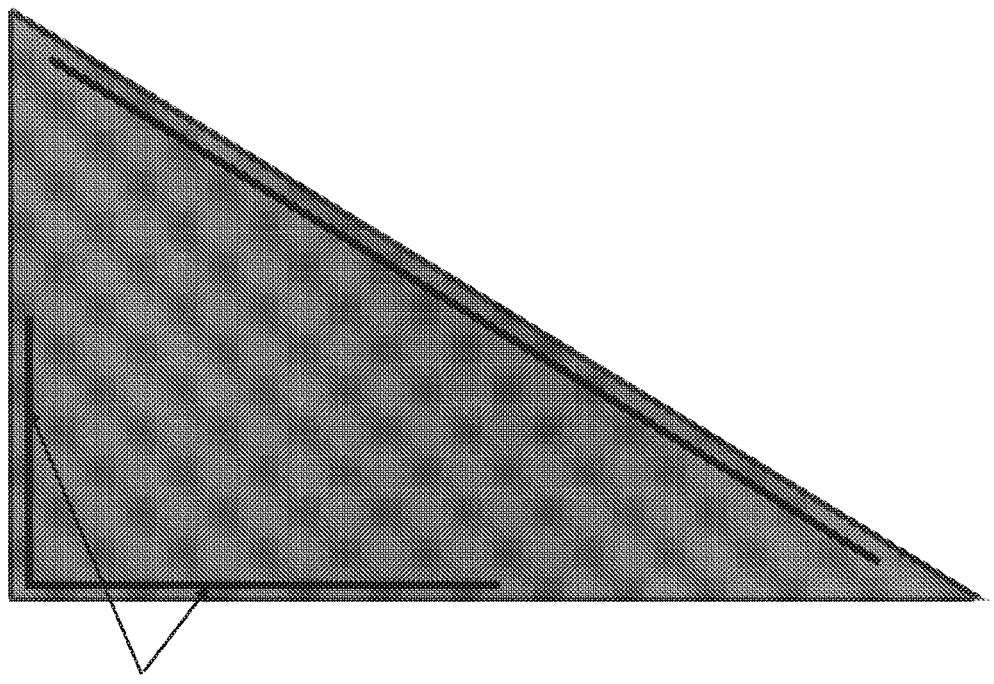
Figure 21:
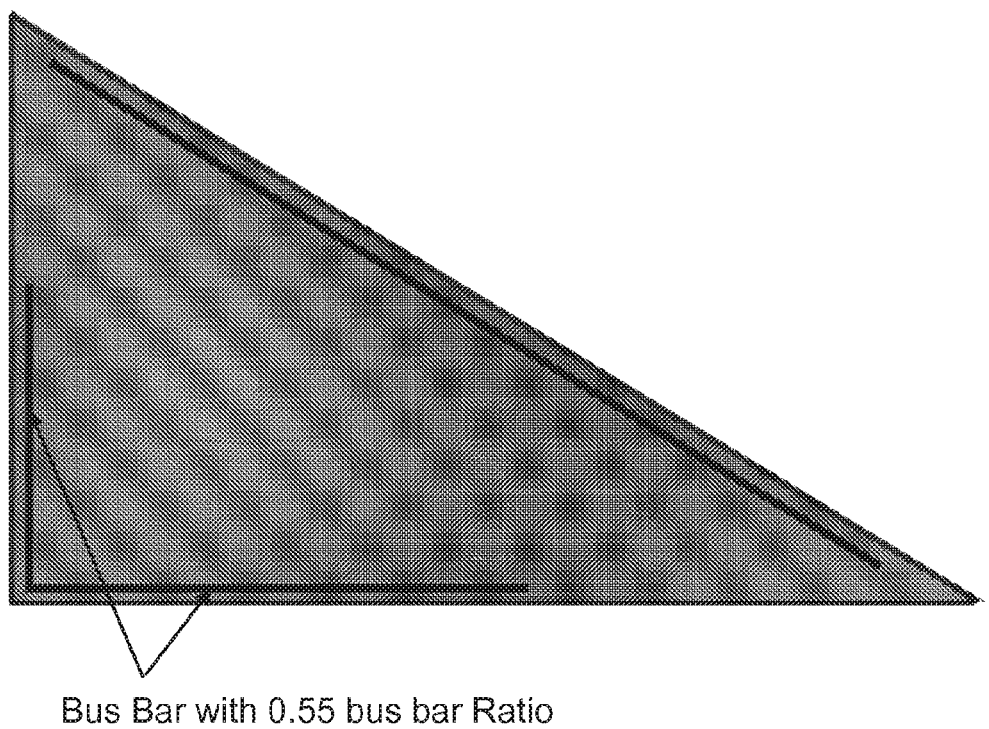
Figure 22:
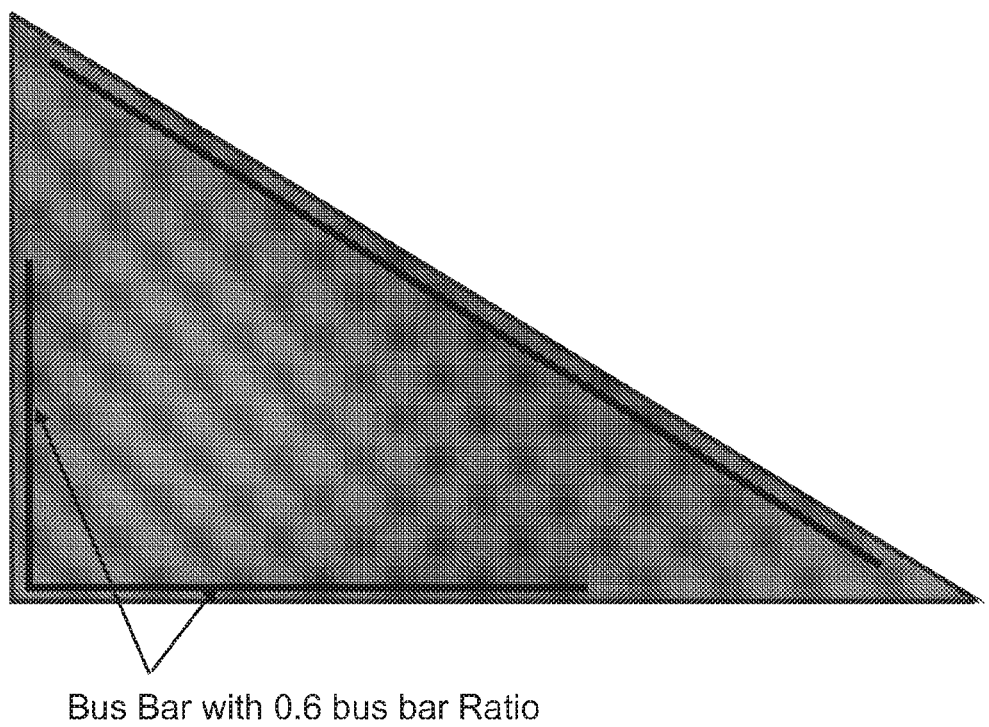
Figure 23:
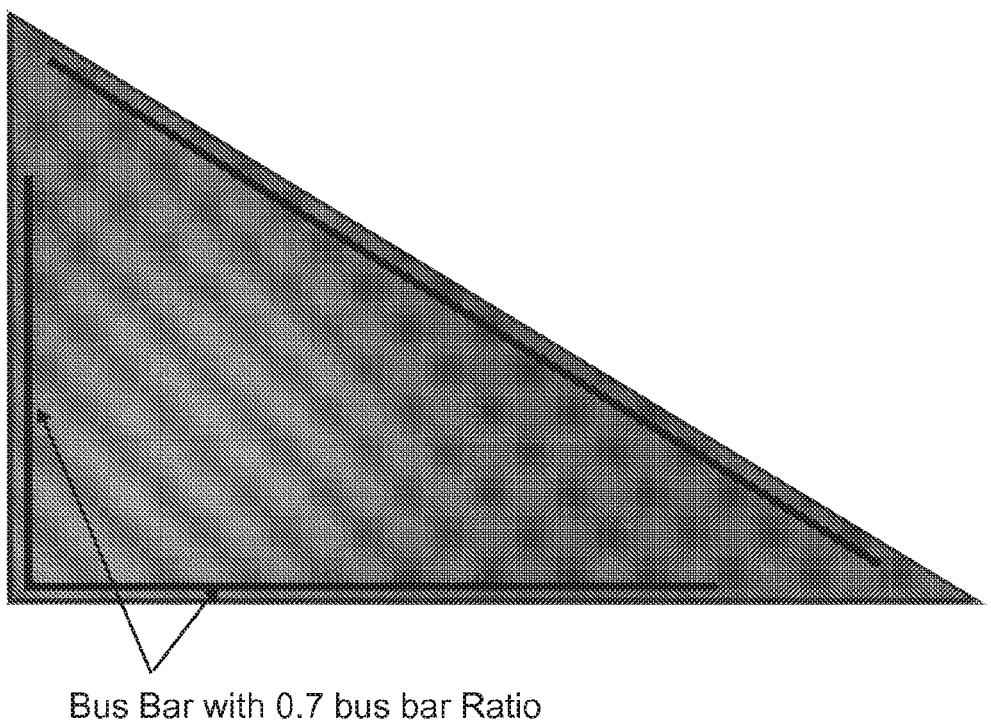

FIG. 18 depicts an example of a first bus bar configuration for a triangular shaped device. Results from using different bus bar ratios for this configuration are shown in FIGS. 19-23. The bus bar ratio of 0.60 for each side of the Bus Bar 2 may have the best balance of transient uniformity while coloring the 30 degree corner well. FIG. 19-23 are datasets showing coloration in triangle shaped electrochromic devices having different bus bar ratios ranging from 0.50 to 0.70. A bus bar ratio can refer to the ratio of the length of the bus bar to the length of the side (of the device) having the bus bar. FIG. 20 depicts a bus bar configuration with 0.50 bus bar ratio for bus bar 2. FIG. 21 depicts a bus bar configuration with 0.55 bus bar ratio for bus bar 2. FIG. 22 depicts a bus bar configuration with 0.60 bus bar ratio for bus bar 2. FIG. 23 depicts a bus bar configuration with 0.70 bus bar ratio for bus bar 2.

Figure 19:
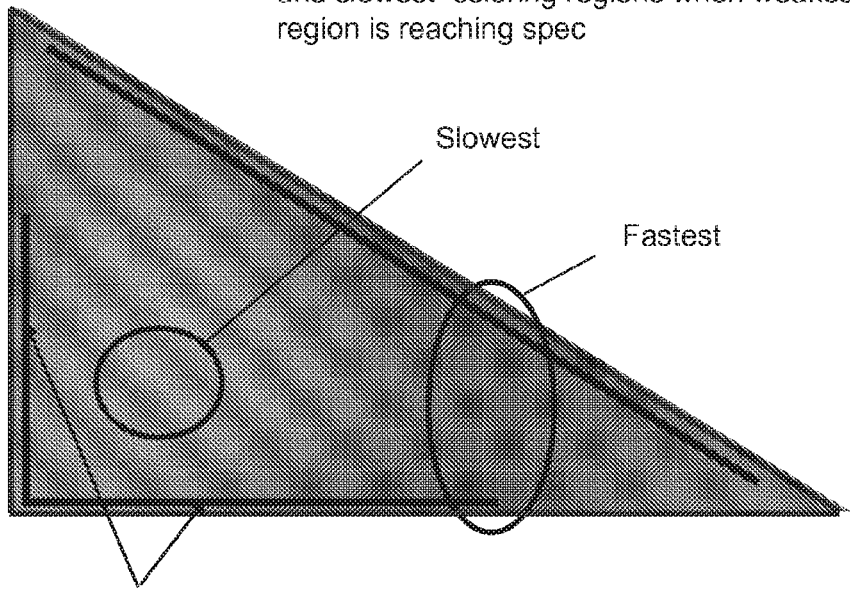
FIG. 19-23 are plots of $V_{eff}$ and coloration in triangular-shaped electrochromic devices having different bus bar ratios, according to embodiments.
Figure 19:
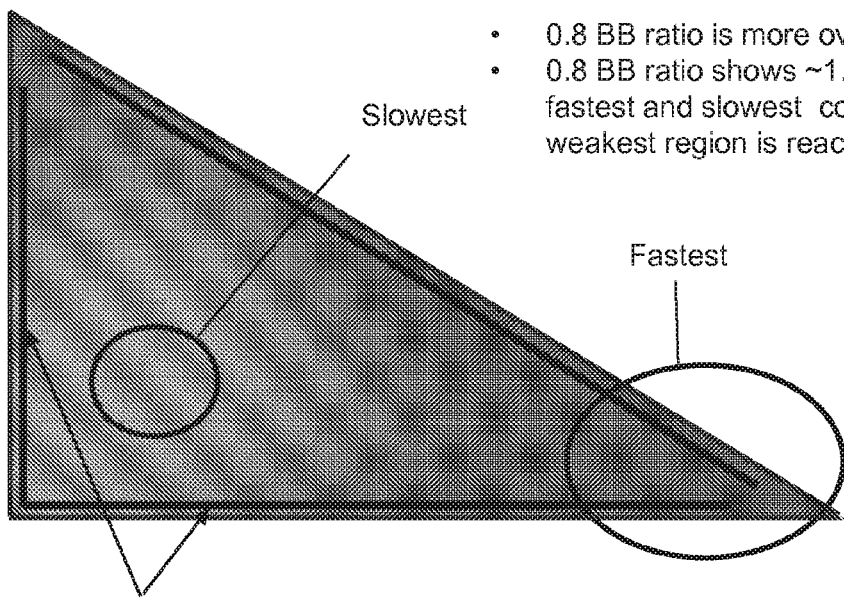

FIG. 19 shows plots comparing coloration for a 0.60 bus bar ratio (i.e., bus bar length=0.60 times the length of the side) with the 0.80 bus bar ratio (i.e., bus bar length=0.80 times the length of the side). Top plot has bus bar 2 with a 0.60 bus bar ratio. Bottom plot has bus bar 2 with a 0.80 bus bar ratio. In the top plot, a 0.60 bus bar ratio shows a difference of about 0.60 between the fastest and the slowest coloring regions when the weakest region is reaching the ending optical state. As shown in the bottom plot, a 0.80 bus bar ratio shows a difference of about 1.10 between the fastest and the slowest coloring regions when the weakest region is reaching the ending optical state. The circled values are the areas having the maximum effective voltage. Comparing the plots, there is a location shift of the potentially overdriven locations on the device. In the 0.80 bus bar ratio configuration, the area with maximum effective voltage is in the 30° corner and in the 0.60 bus bar ratio configuration, the area with maximum effective voltage is closer to the middle of the triangle. FIG. 19 results show that the 0.60 bus bar ration configuration is less overdriven overall than the 0.80 bus bar configuration.

After formation of an electrochromic device, edge deletion and/or laser scribing may be performed in certain embodiments. SCANLAB AG of Munich, Germany provides scanners that may be used in accordance with the disclosed embodiments. Generally, these processes remove some or all of the device around a perimeter region of the device. Edge deletion can refer to a process that removes material from the perimeter of the electrochromic device. Edge deletion may remove the upper layer and electrochromic layer or may remove the upper layer, electrochromic layer(s), and the lower layer of an electrochromic device. Laser scribing can be used to isolate portions of the device, for example, portions damaged during an edge deletion process. In some illustrated examples, an optional isolation scribe is illustrated as a "L3" scribe. The L3 scribe passes through the upper transparent conducting layer and may penetrate one or more device layers below the TCL, including the electrochromic layer, but does not penetrate the lower transparent conducting layer. In some illustrated embodiments, the edge deletion may be referred to as "LED." Although "L3" and/or "LED" areas may be shown in some illustrated examples, one or both of these features are optional and one or both may be omitted. Some examples of edge deletion and laser scribing can be found in U.S. patent application Ser. No. 12/645,111, titled "FABRICATION OF LOW DEFECTIVITY ELECTROCHROMIC DEVICES," filed on Dec. 22, 2009, U.S. patent application Ser. No. 13/456,056, titled "ELECTROCHROMIC WINDOW FABRICATION METHODS," filed on Apr. 25, 2012, and PCT Patent application No. PCT/US2012/068817, titled "THIN-FILM DEVICES AND FABRICATION," filed on Dec. 10, 2012, which are hereby incorporated by reference in their entirety.

Figure 24A:
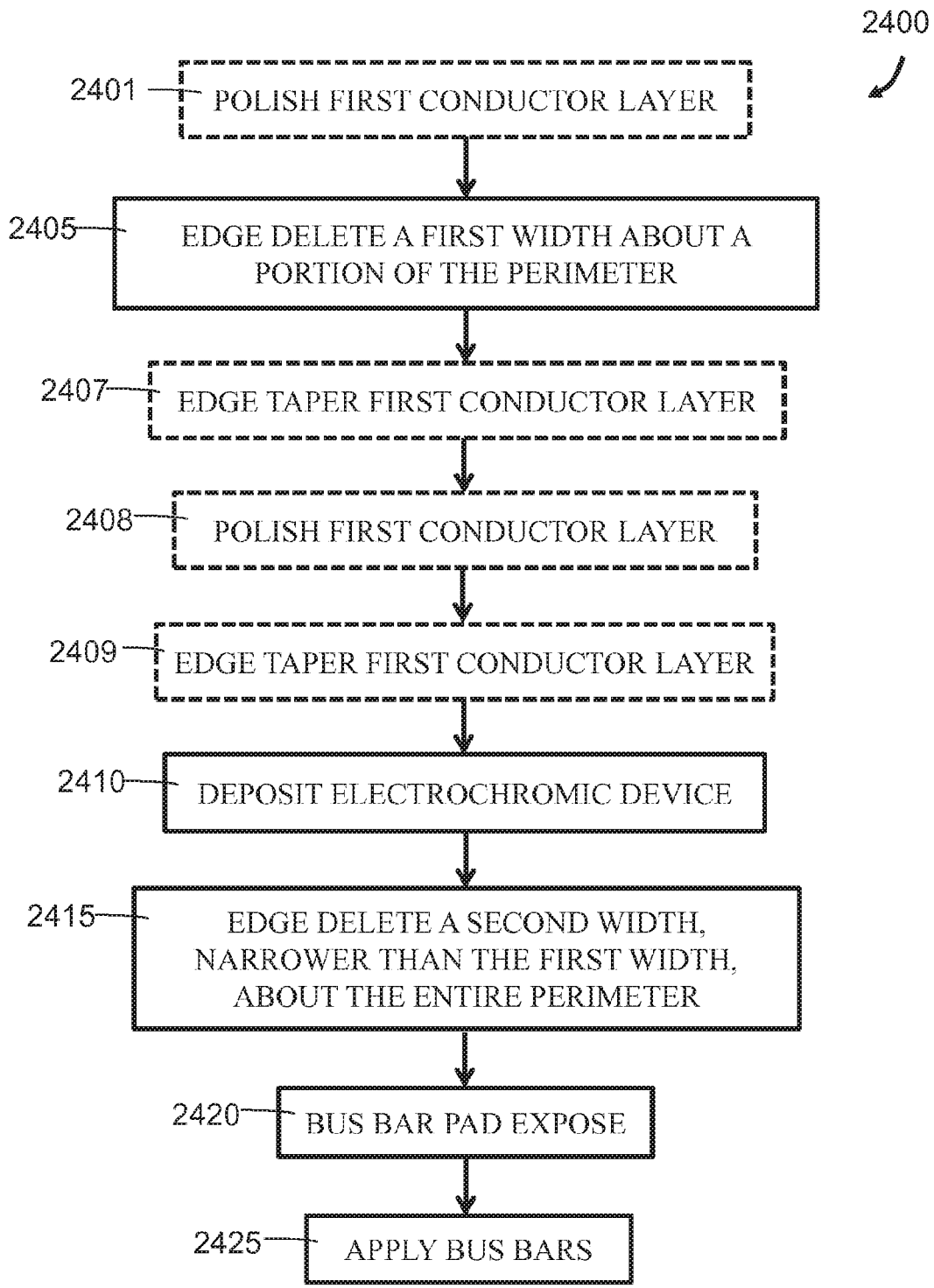
FIG. 24A is a flowchart of a process flow describing aspects of a method of fabricating an electrochromic device, according to certain embodiments.
Figure 24B:
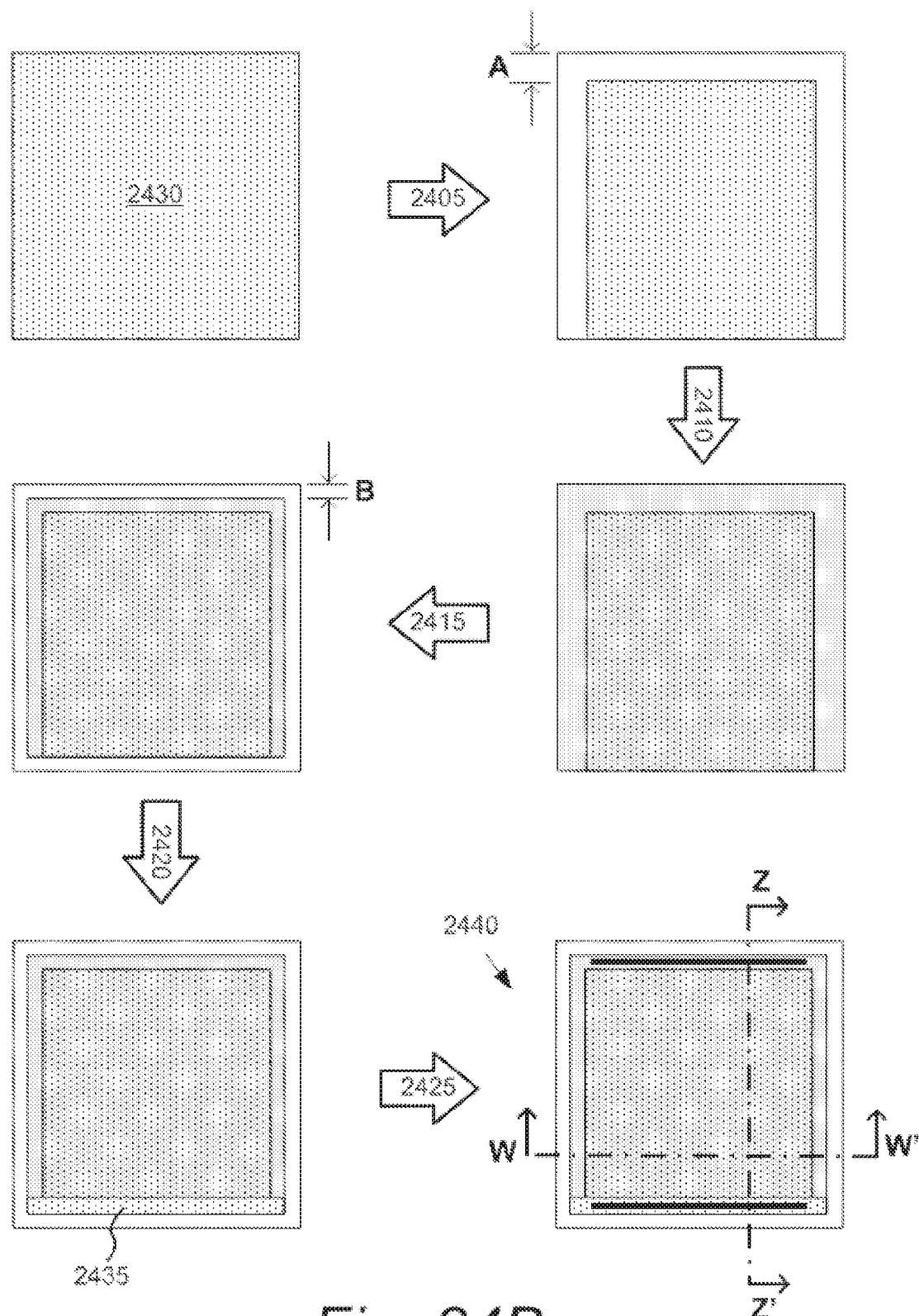
FIG. 24B depicts top views illustrating steps in the process flow described in relation to FIG. 24A.
Figure 24C:
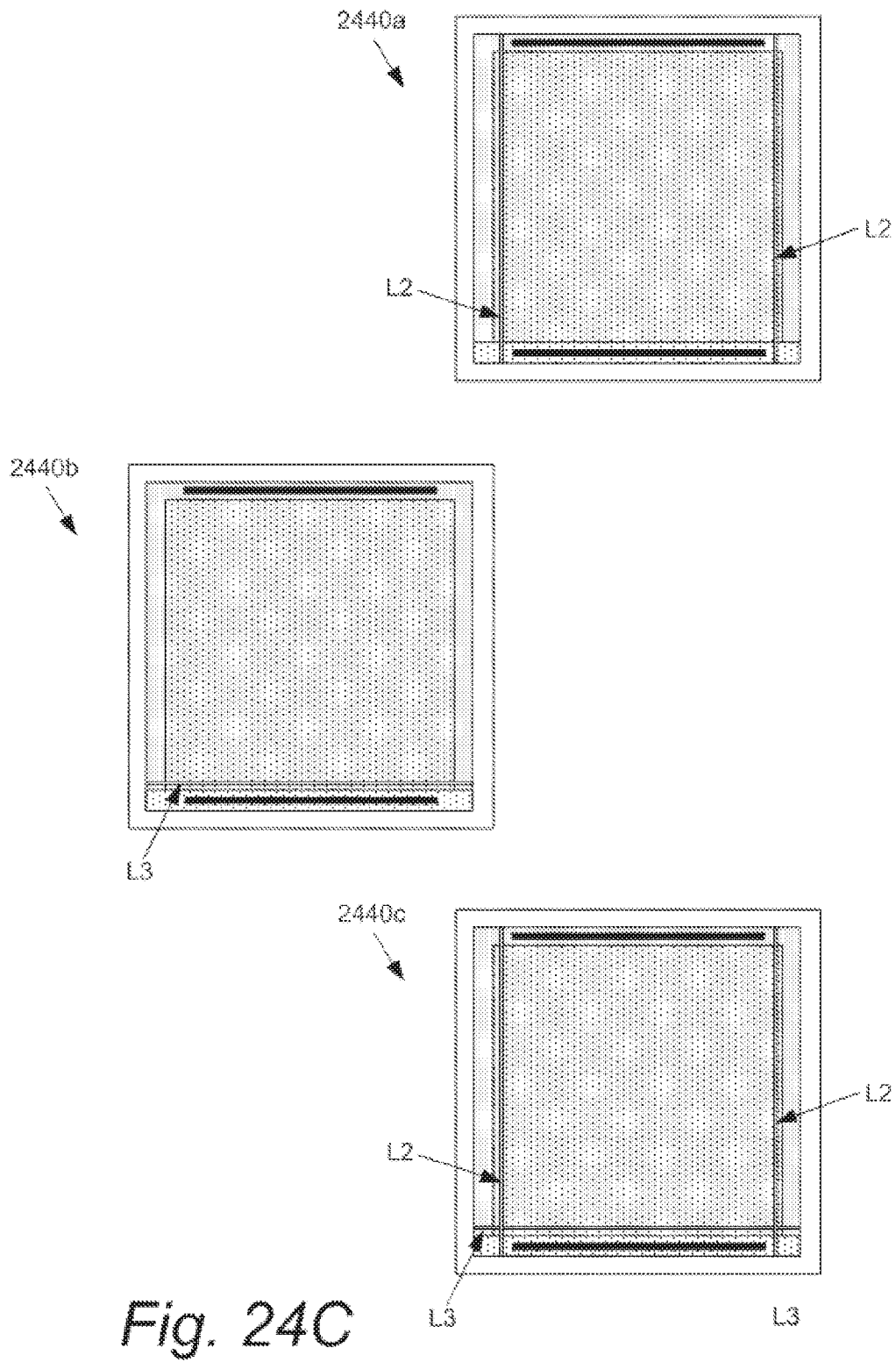
FIG. 24C depicts top views of devices similar to that described in relation to FIG. 24B.
Figure 24D:
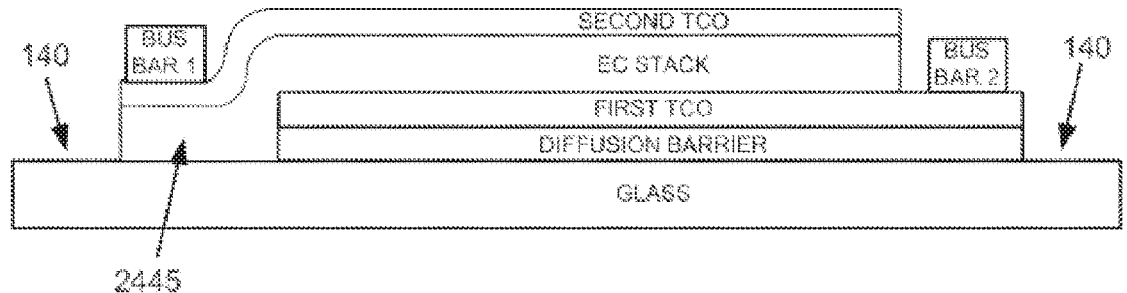
FIG. 24D illustrates cross-sections of the electrochromic lite described in relation to FIG. 24B.
Figure 24D:
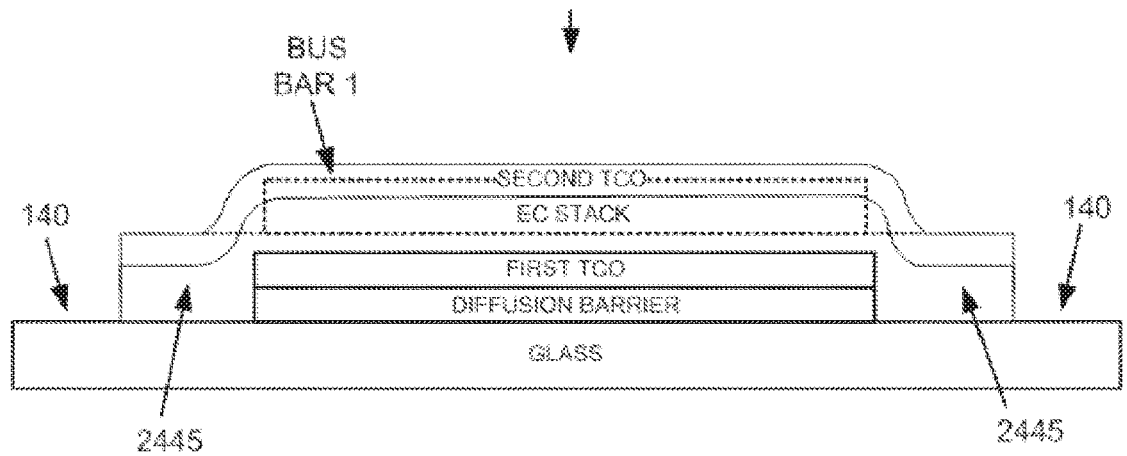

FIG. 24A is a process flow, 2400, describing aspects of a method of fabricating an electrochromic device or other optical device having opposing bus bars, each applied to one of the conductive layers of the optical device. The dotted lines denote optional steps in the process flow. An exemplary device, 2440, as described in relation to FIGS. 24B-C, is used to illustrate the process flow. FIG. 24B provides top views depicting the fabrication of device 2440 including numerical indicators of process flow 2400 as described in relation to FIG. 24A. FIG. 24D shows cross-sections of the lite including device 2440 described in relation to FIG. 24B. Device 2440 is a rectangular device, but process flow 2400 applies to any shape of optical device having opposing bus bars, each on one of the conductor layers. This aspect is described in more detail below in relation to FIG. 24E, which illustrates process flow 2400 as it relates to fabrication of a round electrochromic device.

Referring to FIGS. 24A and 24B, after receiving a substrate with a first conductor layer thereon, process flow 2400 begins with an optional polishing of the first conductor layer (e.g., lower transparent conductor layer), see 2401. In certain embodiments, polishing a lower conductor layer has been found to enhance the optical properties of, and performance of, EC devices fabricated thereon. Polishing of transparent conducting layers prior to electrochromic device fabrication thereon is described in patent application, PCT/US12/57606, titled, "Optical Device Fabrication," filed on Sep. 27, 2012, which is hereby incorporated by reference in its entirety. Polishing, if performed, may be done prior to an edge deletion, see 2405, or after an edge deletion in the process flow. In certain embodiments, the lower conductor layer may be polished both before and after edge deletion. Typically, the lower conductor layer is polished only once.

Referring again to FIG. 24A, if polishing 2401 is not performed, process 2400 begins with edge deleting a first width about a portion of the perimeter of the substrate, see 2405. In certain embodiments, the deleted portion includes portions adjacent to all but one edge of the substrate. In another embodiment, the deleted portion is along a single edge of substrate (e.g., an ITO bus bar edge). The edge deletion may remove only the first conductor layer or may also remove a diffusion barrier, if present. In one embodiment, the substrate is glass and includes a sodium diffusion barrier and a transparent conducting layer thereon, e.g., a tin-oxide based transparent metal oxide conducting layer. In the depicted embodiment, the substrate is rectangular (e.g., the square substrate depicted in see FIG. 24B). In the embodiments of interest, it is typically a more complex shape. The dotted fill area in FIG. 24B denotes the first conductor layer. Thus, after edge deletion according to process 2405, transparent conductor of a width A is removed from three sides of the perimeter of substrate 2430. This width is typically, but not necessarily, a uniform width. A second width, B, is described below. Where width A and/or width B are not uniform, their relative magnitudes with respect to each other are in terms of their average width.

As a result of the removal of the first width A at 2405, there is a newly exposed edge of the lower conductor layer. In certain embodiments, at least a portion of this edge of the first conductive layer may be optionally tapered, see 2407 and 2409. The underlying diffusion barrier layer may also be tapered. The inventors have found that tapering the edge of one or more device layers, prior to fabricating subsequent layers thereon, has unexpected advantages in device structure and performance.

In certain embodiments, the lower conductor layer is optionally polished after edge tapering, see 2408. It has been found, that with certain device materials, it may be advantageous to polish the lower conductor layer after the edge taper, as polishing can have unexpected beneficial effects on the edge taper as well as the bulk conductor surface which may improve device performance (as described above). In certain embodiments, the edge taper is performed after polish 2408, see 2409. Although edge tapering is shown at both 2407 and 2409 in FIG. 24A, if performed, edge tapering would typically be performed once (e.g., at 2407 or 2409).

After removal of the first width A, and optional polishing and/or optional edge tapering as described above, the EC device is deposited over the surface of substrate 2430, see 2410. This deposition includes one or more material layers of the optical device and the second conducting layer, e.g., a transparent conducting layer such as indium tin oxide (ITO). The depicted coverage is the entire substrate, but there could be some masking due to a carrier that must hold the glass in place. In one embodiment, the entire area of the remaining portion of the first conductor layer is covered including overlapping the first conductor about the first width A previously removed. This allows for overlapping regions in the final device architecture.

In particular embodiments, electromagnetic radiation is used to perform edge deletion and provide a peripheral region of the substrate, e.g., to remove transparent conductor layer or more layers (up to and including the top conductor layer and any vapor barrier applied thereto), depending upon the process step. In one embodiment, the edge deletion is performed at least to remove material including the transparent conductor layer on the substrate, and optionally also removing a diffusion barrier if present. In certain embodiments, edge deletion is used to remove a surface portion of the substrate, e.g., float glass, and may go to a depth not to exceed the thickness of the compression zone, if tempered. Edge deletion may be performed, e.g., to create a good surface for sealing by at least a portion of the primary seal and the secondary seal of the spacer of an IGU. For example, a transparent conductor layer can sometimes lose adhesion when the conductor layer spans the entire area of the substrate and thus has an exposed edge, despite the presence of a secondary seal. Also, it is believed that when metal oxide and other functional layers have such exposed edges, they can serve as a pathway for moisture to enter the bulk device and thus compromise the primary and secondary seals.

Exemplary electromagnetic radiation includes UV, lasers, and the like. For example, material may be removed with directed and focused energy at or near one of the wavelengths 248 nm, 355 nm (i.e. UV), 1030 nm (i.e. IR, e.g., disk laser), 1064 nm (e.g., Nd:YAG laser), and 532 nm (e.g., green laser), though these examples are non-limiting. In another embodiment, the laser emits over a wider range of wavelengths. For example, the laser may be a full spectrum laser. In other cases, the laser may emit over a narrow band of wavelengths. Laser irradiation is delivered to the substrate using, e.g., optical fiber or open beam path. The ablation can be performed from either the substrate side or the EC film side depending on the choice of the substrate handling equipment and configuration parameters. The energy density required to ablate the film thickness is achieved by passing the laser beam through an optical lens. The lens focuses the laser beam to the desired shape and size. In one embodiment, a "top hat" beam configuration is used, e.g., having a focus area of between about 0.005 $mm^2$ to about 2 $mm^2$. In one embodiment, the focusing level of the beam is used to achieve the required energy density to ablate the EC film stack. In one embodiment, the energy density used in the ablation is between about 2 $J/cm^2$ and about 6 $J/cm^2$.

During certain laser edge delete processes, a laser spot is scanned over the surface of the EC device, along the periphery. In one embodiment, the laser spot is scanned using a scanning F theta lens. Homogeneous removal of the EC film is achieved, e.g., by overlapping the spots' area during scanning. In one embodiment, the overlap is between about 5% and about 100%, in another embodiment between about 10% and about 90%, in yet another embodiment between about 10% and about 80%. Appropriate apparatus for undertaking LED/BPE and scribing processes is described in U.S. patent application Ser. No. 13/436,387, filed Mar. 30, 2012, titled "COAXIAL DISTANCE MEASUREMENT VIA FOLDING OF TRIANGULATION SENSOR OPTICS PATH," which is herein incorporated by reference in its entirety.

Various scanning patterns may be used, e.g., scanning in straight lines, curved lines, etc. With these scanning patterns, various shaped sections may be scanned, such as, e.g., rectangular, round, oval, polygonal, irregular, etc. or other shaped sections that can, collectively, create the peripheral edge deletion area. In one embodiment, the scanning lines (or "pens," i.e., lines created by adjacent or overlapping laser spots, e.g., square, round, etc.) are overlapped at the levels described above for spot overlap. That is, the area of the ablated material defined by the path of the line previously scanned is overlapped with later scan lines so that there is overlap. That is, a pattern area ablated by overlapping or adjacent laser spots is overlapped with the area of a subsequent ablation pattern. For embodiments where overlapping is used, spots, lines or patterns, a higher frequency laser, e.g., in the range of between about 5 KHz and about 500 KHz, may be used. In certain embodiments, the frequency is between about 8-15 kHz, for example, between about 10-12 kHz. In some other cases, the frequency may be in the low MHz range. In order to minimize heat related damage to the EC device at the exposed edge (i.e. a heat affected zone or "HAZ"), shorter pulse duration lasers are used. In one example, the pulse duration is between about 100 fs (femtosecond) and about 100 ns (nanosecond). In another embodiment, the pulse duration is between about 1 ps (picosecond) and about 50 ns. In yet another embodiment, the pulse duration is between about 20 ps and about 30 ns. Pulse duration of other ranges can be used in other embodiments.

Referring again to FIGS. 24A and 24B, process flow 2400 continues with removing a second width, B, narrower than the first width A, about substantially the entire perimeter of the substrate, see 2415. This may include removing material down to the substrate (e.g., glass) or to a diffusion barrier, if present. After process flow 2400 is complete up to 2415, e.g., on a rectangular substrate as depicted in FIG. 24B, there is a perimeter area, with width B, where there is none of the first transparent conductor, the one or more material layers of the device, or the second conducting layer so that removing width B has exposed diffusion barrier or substrate. In certain cases, however, there may be a small amount of conductor left after this operation. Where the amount of conductor remaining is thin enough, it does not present coloration issues. Within this perimeter area is the device stack, including the first transparent conductor surrounded on three sides by overlapping one or more material layers and the second conductor layer. On the remaining side (e.g., the bottom side in FIG. 24B) there is no overlapping portion of the one or more material layers and the second conductor layer. Instead, it is proximate this remaining side (e.g., bottom side in FIG. 24B) that the one or more material layers and the second conductor layer are removed in order to expose a portion (bus bar pad expose, or "BPE"), 2435, of the first conductor layer, see 2420. The BPE 2435 need not run the entire length of that side, it need only be long enough to accommodate the bus bar and leave some space between the bus bar and the second conductor layer so as not to short on the second conductor layer. In one embodiment, the BPE 2435 spans the length of the first conductor layer on that side. In some embodiments, a scribe line parallel to the BPE is created through the second conductor layer but not through the first conductor layer. This scribe is sometimes referred to as an L3 isolation scribe. In some embodiments, this scribe is performed in lieu of operation 2415, the removing second width B around the entire perimeter of the substrate. In another embodiment, post-deposition LED is performed on a substrate without any pre-scribing or removal of the transparent electronic conductor on non-busbar edges.

As described above, in various embodiments, a BPE is where a portion of the material layers are removed down to the lower electrode (e.g., a transparent conducting oxide (TCO) layer) or other conductive layer, in order to create a surface for a bus bar to be applied and thus make electrical contact with the conductive layer. The bus bar applied can be a soldered bus bar, ink bus bar, and the like. A BPE typically has a rectangular area, but this is not necessary; the BPE may be any geometrical shape or an irregular shape. For example, depending upon the need, a BPE may be circular, triangular, oval, trapezoidal, and other polygonal shapes. The BPE shape may be dependent on the configuration of the EC device, the substrate bearing the EC device (e.g., an irregular shaped window), or even the efficiency of the laser pattern used to ablate the surface. In one embodiment, the BPE spans at least about 50% of the length of one side of an EC device. In one embodiment, the BPE spans at least about 80% of the length of one side of an EC device. Typically, but not necessarily, the BPE is wide enough to accommodate the bus bar. In certain cases, the BPE is wide enough to allow for some space at least between the active EC device stack and the bus bar. In certain embodiments, the BPE is substantially rectangular, having a length approximating one side of the EC device. In one of these embodiments, the width of the rectangular BPE between about 1 mm and about 15 mm. In another embodiment, the width of the rectangular BPE is between about 1 mm and about 5 mm, for example, between about 1 mm and about 3 mm. In another embodiment, the width of the rectangular BPE is between about 5 mm and about 10 mm, for example, between about 7 mm and about 9 mm. As mentioned, a bus bar may be between about 1 mm and about 5 mm wide, typically about 3 mm wide or about 2 mm wide.

As mentioned, in certain cases, the BPE is fabricated wide enough to accommodate the bus bar's width and also leave space between the bus bar and the EC device (as the bus bar should only contact the lower conductive layer). The bus bar width may exceed that of the BPE (e.g., where bus bar material is touching both the lower conductor and glass (and/or diffusion barrier) on area 140), as long as there is space between the bus bar and the EC device or the bus bar only contacts a deactivated portion of the EC device e.g., in embodiments where there is an L3 isolation scribe. In embodiments where the bus bar width is fully accommodated by the BPE, that is, the bus bar is entirely atop the lower conductor, the outer edge along the length of the bus bar may be aligned with the outer edge of the BPE, or inset by, for example, between about 1 mm and about 3 mm. Likewise, the space between the bus bar and the EC device is in one embodiment between about 1 mm and about 3 mm, in another embodiment between about 1 mm and 2 mm, and in another embodiment about 1.5 mm. Formation of BPEs is described in more detail below, with respect to an EC device having a lower electrode that is a TCO layer. This is for convenience only, the lower electrode could be any suitable electrode for an optical device, transparent or not.

To make a BPE, an area of the lower (first) electrode (e.g., bottom TCO) is cleared of deposited material so that a bus bar can be fabricated on the lower electrode. In one embodiment, this is achieved by laser processing which selectively removes the deposited film layers while leaving the lower electrode exposed in a defined area at a defined location. In one embodiment, the relative absorption characteristics of the bottom electrode and the deposited layers are exploited in order to achieve selectivity during laser ablation. That is, so that the EC materials on the lower electrode (e.g., TCO), for example, can be selectively removed while leaving the lower electrode material intact. In certain embodiments, an upper portion of the lower electrode layer is also removed in order to ensure good electrical contact with the bus bar, e.g., by removing any mixture of lower electrode and EC materials that might have occurred during deposition. In certain embodiments, when the BPE edges are laser machined so as to minimize damage at these edges, the need for an L3 isolation scribe line to limit leakage currents can be avoided—this may eliminate a process step, while still achieving the desired device performance.

In certain embodiments, the electromagnetic radiation used to fabricate a BPE is the same as described above for performing edge deletion. The (laser) radiation is delivered using either optical fiber or the open beam path. The ablation can be performed from either glass side or the film side depending on the choice of the electromagnetic radiation wavelength. The energy density required to ablate the material is achieved by passing the laser beam through an optical lens. The lens focuses the laser beam to the desired shape and size, e.g., a "top hat" having the dimensions described above, in one embodiment, having an energy density of between about 0.5 J/cm$^2$ and about 4 J/cm$^2$. In one embodiment, laser scan overlapping for fabricating a BPE can be accomplished in a similar fashion as is described above for laser edge deletion. In certain embodiments, variable depth ablation is used for BPE fabrication, which is described in more detail below.

In certain embodiments, e.g., due to the selective nature of the relative absorption properties of material layers in an EC device, the laser processing at the focal plane results in some amount (between about 10 nm and about 100 nm) of residual material, e.g., tungsten oxide, remaining on the exposed area of the lower conductor. Since many EC materials are not as conductive as the underlying conductor layer, the bus bar fabricated on this residual material may not make full electrical contact with the underlying conductor, which can result in a voltage drop across the bus bar to lower conductor interface. This voltage drop may impact coloration of the EC device as well as impact the adhesion of the bus bar to the lower conductor. One way to overcome this problem is to increase the amount of laser energy used in material removal, however, this approach may result in forming a trench at the spot overlap, which can unacceptably deplete the lower conductor. To overcome this problem, the laser ablation can be performed above the focal plane, i.e., the laser beam can be defocused in certain embodiments. In one embodiment, for example, the defocused profile of the laser beam can be a modified top hat, or "quasi top hat." By using a defocused laser profile, the fluence delivered to the surface can be increased without damaging the underlying TCO at the spot overlap region. This method minimizes the amount of residual material left in on the exposed lower conductor layer and thus allows for better electrical contact of the bus bar with the lower conductor layer.

In some embodiments, one or more laser isolation scribes may be needed, depending upon design tolerances, material choice, and the like. FIG. 24C depicts top-views of three devices, 2440a, 2440b and 2440c, each of which are variations on device 2440 as depicted in FIGS. 24B and 24D. Device 2440a is similar to device 2440, but includes L2 scribes that isolate first portions of the EC device along the sides orthogonal to the sides with the bus bars. Where such L2 scribes are used, the pre-deposition removal of the lower conductor (e.g., TCO) layer may be eliminated on the L2 edges. In a particular embodiment, an L3 isolation scribe is performed on these edges in combination with pre-deposition removal of the lower conductor layer. Device 2440b is similar to device 2440, but includes an L3 scribe isolating and deactivating a second portion of the device between the bus bar on the first (lower) conductor layer and the active region of the EC device. Device 2440c is similar to device 2440, but includes both the L2 scribes and the L3 scribe. Although the scribe line variations in FIG. 24C are described in reference to devices 2440a, 2440b and 2440c, these variations can be used for any of the optical devices and lites of embodiments described herein. For example, one embodiment is a device analogous to device 2440c, but where the edge deletion does not span three sides, but rather only the side bearing the bus bar on the top conductor (e.g., TCO) layer (or a portion long enough to accommodate the bus bar). In this embodiment, since there are no edge delete portions on the two sides orthogonal to the bus bars (the right and left side of 2440c as depicted), the L2 scribes may be closer to these edges in order to maximize viewable area. Depending upon device materials, process conditions, aberrant defects found after fabrication, etc., one or more of these scribes may be added to ensure proper electrical isolation of the lower and upper conductor layers (electrodes) and therefore EC device function. Any of these devices may have a vapor barrier applied prior to, or after, one or all of these scribes. If applied after, the vapor barrier is not substantially electrically conductive; otherwise it would short out the device's electrodes when filling the laser scribe trenches. The above-described edge tapering may obviate the need for such laser isolation scribes.

Referring again to FIGS. 24A and 24B, after forming the BPE, bus bars are applied to the device, a bus bar 2 on exposed area (BPE) 2435 of the first (lower) conductor layer (e.g., first TCO) and a bus bar 1 on the opposite side of the device, on the second (upper) conductor layer (e.g., second TCO), on a portion of the second conductor layer that does not have a first conductor layer below it, see 2445. This placement of the bus bar 1 on the second conductor layer avoids coloration under the bus bar 1 and other associated issues with having a functional device under this bus bar 1. In this example, laser isolation scribes may not be necessary in fabrication of the device.

FIG. 24B indicates cross-section cuts Z-Z' and W-W' of device 2440. The cross-sectional views of device 2440 at Z-Z' and W-W' are shown in FIG. 24D. The depicted layers and dimensions are not to scale, but are meant to represent functionally the configuration. In this example, the diffusion barrier was removed when width A and width B were fabricated. Specifically, perimeter area 140 is free of first conductor layer and diffusion barrier; although in one embodiment the diffusion barrier is left intact to the edge of the substrate about the perimeter on one or more sides. In another embodiment, the diffusion barrier is co-extensive with the one or more material layers and the second conductor layer (thus width A is fabricated at a depth to the diffusion barrier, and width B is fabricated to a depth sufficient to remove the diffusion barrier). In this example, there is an overlapping portion, 2445, of the one or more material layers about three sides of the functional device. On one of these overlapping portions, on the second conductor layer (e.g., second TCO), bus bar 1 is fabricated. In one embodiment, a vapor barrier layer is fabricated co-extensive with the second conductor layer. A vapor barrier is typically highly transparent, e.g., aluminum zinc oxide, a tin oxide, silicon dioxide and mixtures thereof, amorphous, crystalline or mixed amorphous-crystalline. In this embodiment, a portion of the vapor barrier is removed in order to expose the second conductor layer for bus bar 1. This exposed portion is analogous to the BPE area 2435, for bus bar 2. In certain embodiments, the vapor barrier layer is also electrically conductive, and exposure of the second conductor layer need not be performed, i.e., the bus bar 1 may be fabricated on the vapor barrier layer. For example, the vapor barrier layer may be ITO, e.g., amorphous ITO, and thus be sufficiently electrically conductive for this purpose. The amorphous morphology of the vapor barrier may provide greater hermeticity than a crystalline morphology.

FIG. 24D depicts the EC device layers overlying the first conductor (e.g., TCO) layer, particularly the overlapping portion, 2445. Although not to scale, cross section Z-Z', for example, depicts the conformal nature of the layers of the EC stack and the second conductor (e.g., TCO) layer following the shape and contour of the first conductor layer including the overlapping portion 2445.

In various embodiments, the operations described above may be performed in a different order, and certain operations may be excluded or performed on fewer or different sides than mentioned. In a particular embodiment, a process flow is as follows: perform post-deposition LED on 3 edges of the electrochromic lite; perform a BPE operation; perform L3 isolation scribe operation; and perform transparent electrical conductor (TEC) bus bar post-deposition LED operation.

The above-described fabrication methods are described in terms of rectangular optical devices, e.g., rectangular EC devices. This is not necessary, as they also apply to other shapes, regular or irregular. Also, the arrangement of overlapping device layers as well as BPE and other features may be along one or more sides of the device, depending upon the need. Alternate design/configuration of these features are described in more detail in U.S. patent application Ser. No. 13/452,032, filed Apr. 20, 2012, titled "ANGLED BUS BAR," which is incorporated by reference herein in its entirety. As described in relation to FIGS. 24A and 24B, the fabrications described below may also include other features such as polish of the lower conductor layer, edge taper, multi-depth ablated BPE, etc. For the sake of brevity, description of these features is not repeated, but one embodiment is any of the device configurations described below with one or more of the features described in relation to FIGS. 24A and 24B.

Figure 24E:
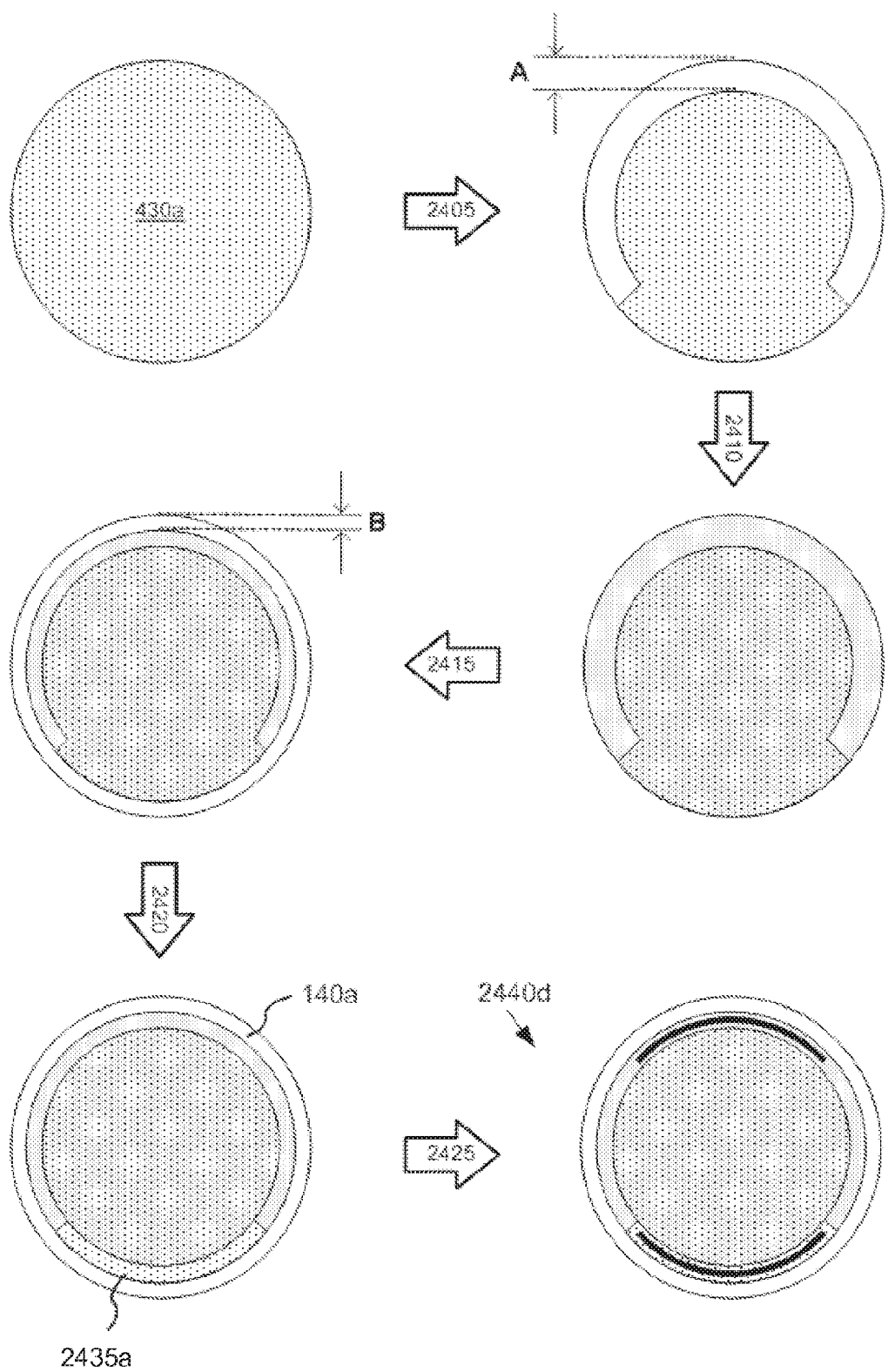
FIG. 24E depicts top views illustrating steps in the fabrication of a round electrochromic device.

FIG. 24E is a top view schematic drawing depicting fabrication steps analogous to those described in relation to the rectangular substrate shown in FIG. 24B, but on a round substrate, according to an embodiment. The substrate could also be oval or have another curved edge. Thus as described previously, a first width A is removed, see 2405. The one or more material layers and second conductor layer (and optionally a vapor barrier) are applied over the substrate, see 2410. A second width B is removed from the entire perimeter of the substrate, see 2415 (140*a* is analogous to 140). A BPE, 2435*a*, is fabricated as described herein, see 2420. Bus bars are applied, see 2425, to make device 2440*d* (thus, for example, in accord with methods described above, the at least one second bus bar is applied to the second conducting layer proximate the side of the optical device opposite the at least one exposed portion of the first conducting layer).

In conventional laser edge delete processes for rectangular-shaped electrochromic devices, rectangular (e.g., square) laser patterns may be used to delete material from a rectangular substrate. In this type of process, the laser moves linearly, forming lines back and forth over the surface of the device, with some uniform degree of overlap between the formed lines. The laser lines are typically parallel or perpendicular to the local periphery of the device. Notably, where a rectangular pattern is used, it is not possible to efficiently perform edge deletion on edges that are curved, or on edges that are oriented at a non-right angle to the other edges.

Various elements are relevant when implementing a laser pattern. First, a distinction may be drawn between a laser tool and a scanner. A scanner is typically part of a laser tool. The scanner can shine and direct a laser beam according to the pattern provided to the scanner. The scanner itself is not aware of its position at a given time relative to the workpiece. A programming code is typically used to provide instructions that direct the laser tool to position the scanner relative to the workpiece. In various embodiments, this code is used to reposition the scanner after a pattern has been executed and to direct the scanner to undertake the next pattern, thereby ensuring that the scanner performs the next pattern at the correct portion of the workpiece. The scanner receives instructions (typically in the form of a programming code) defining a pattern or patterns that the scanner will use to shine and direct the laser beam according to the pattern or patterns. The laser tool receives instructions detailing where to position the scanner relative to the workpiece. These instructions may contain information regarding the timing and positioning of various processes/components.

Figure 25A:
FIG. 25A shows a portion of an electrochromic device where a single rectangular laser pattern was used to remove material from the surface of the device.
Figure 25B:
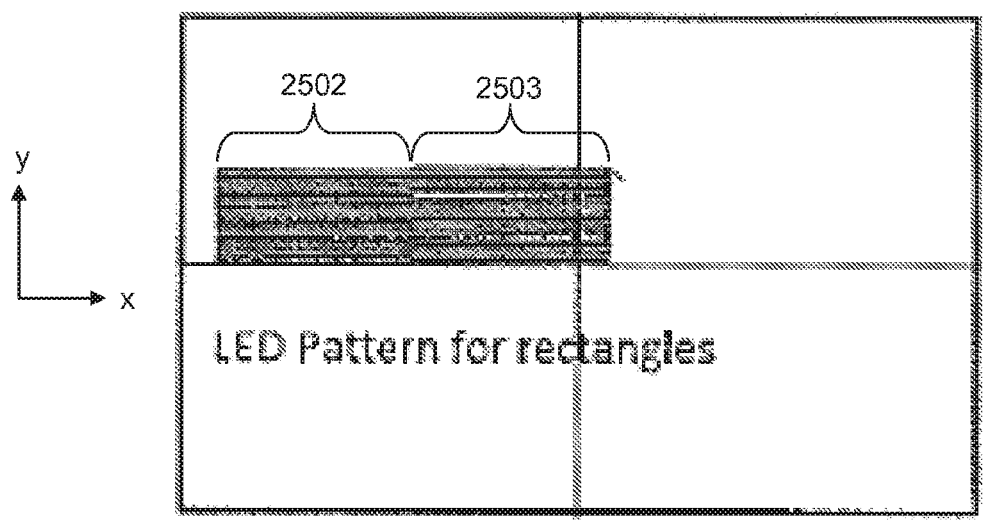
FIG. 25B shows two adjacent rectangular patterns that may be used to remove material from the surface of an electrochromic device.

FIG. 25A shows an area of an EC device where a single rectangular laser pattern has removed material from the surface of the device. The light area 2501 is where material has been removed. The generally linear orientation of the dots in the figure indicate the linear path of the laser spots over the device surface. When using a rectangular pattern, the laser can effectively perform LED/BPE in either the x-direction or the y-direction, parallel to a rectangular edge of a substrate, but not as easily along a diagonal edge. FIG. 25B shows a larger area of an EC device where a laser pattern was repeated. Here, a rectangular pattern was performed twice, once over area 2502 and once over area 2503. In some cases, the patterns may be repeated due to the limited optical range of the laser being used. Either or both the laser and workpiece may be reoriented between subsequent pattern iterations, in certain embodiments. This type of pattern may be repeated along the periphery of the device, as described herein. In some embodiments, the pattern followed by the laser may change between different edges of the device. That is, different patterns can be used for different edges. For example, where the device is rectangular-shaped, a first laser pattern on a first edge may resemble the rectangle pattern shown in FIGS. 25A and 25B. In one embodiment, a first rectangular laser pattern is used on two opposing edges that results in removal of material over an area of approximately 14 mm wide by about 50 mm long. A second laser pattern may be used on adjacent edges, for example, a pattern resulting in removal over an area approximately 50 mm wide by 14 mm long (such that the dimensions are inverted with respect to the first pattern).

Figure 26:
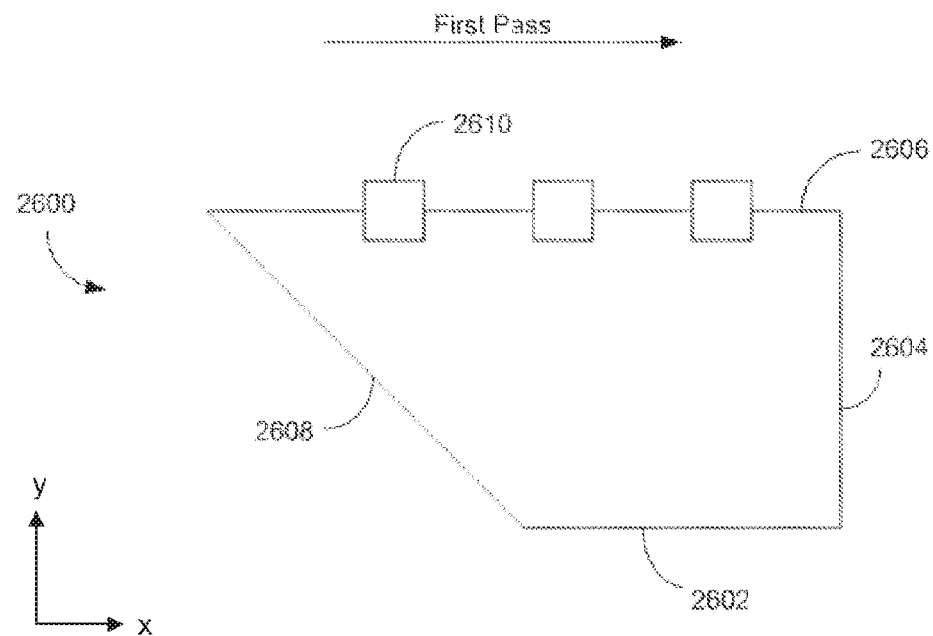
FIG. 26 illustrates a trapezoid shaped lite and its orientation through a laser tool on its first and second passes through the tool.
Figure 26:
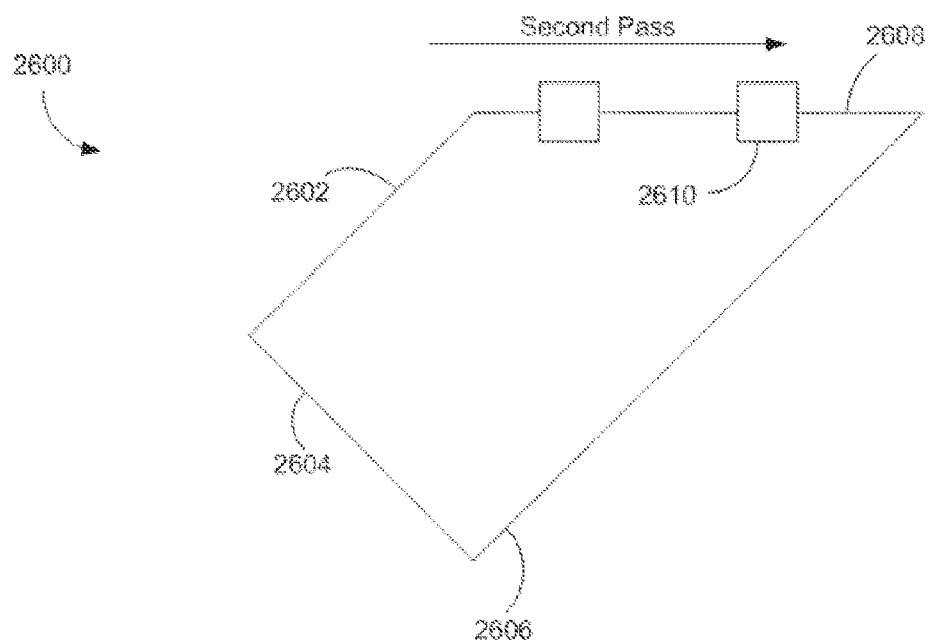

This configuration and pairing of patterns works well for rectangular-shaped devices. However, due to limitations inherent in a rectangular laser pattern, this method is much less effective for non-rectangular shaped devices. For example, FIG. 26A illustrates an embodiment where the device 2600 is shaped like a trapezoid and the laser pattern is rectangular. In this case, two passes through the laser tool are required to remove all the material necessary. In a first pass through the tool, LED is performed on edges 2602, 2604 and 2606. As the LED is performed on edge 2606, the grippers 2610 individually open and draw back as needed to expose the surface to the laser. After the laser completes LED of a relevant edge portion, the grippers may individually re-grip the device to provide stability. The edge 2608, which is angled in the orientation of the device 2600 in the first pass, cannot undergo LED during the first pass because the rectangular pattern is oriented in a direction making it unable to follow this angled edge. Instead, the device 2600 must be reoriented and undergo a second pass through the laser tool. During the second pass, material is removed from edge 2608.

This reorientation of the device may be undesirable. For example, re-orienting the device may cause misalignment of the device where even slight misalignments can result in products which fall outside allowable tolerances. One factor which may contribute to misalignment is that it is difficult to push a device through the laser tool in a precisely uniform direction. Generally, the device is pushed through the laser tool by applying a force to/near the portion of the device which enters the tool last (e.g., the corner between edges 2606 and 2608 during the first pass, and the corner between edges 2602 and 2604 during the second pass). Where this portion is flat (e.g., for a rectangular device), it may be relatively much easier to push the device through in a uniform, linear manner. However, where this portion is a corner or some other non-flat or protruding shape, it may be difficult to achieve linear movement of the device through the tool. For example, where the force is applied near a protruding corner, the device may rotate to some degree. Any rotation will cause material to be removed in a non-uniform fashion, which may lead to device failure. Further, re-orienting devices may introduce additional processing errors which arise when the grippers do not grip the lite properly, or when the scanner improperly finds a starting point (e.g., a corner/edge). Reorienting devices may also be undesirable because re-orienting may result in a device which does not physically fit through the laser tool. For example, when lite 2600 is rotated for its second pass through the tool as described above, it may be too tall in the y-direction to fit into the laser tool.

Certain embodiments herein utilize alternative laser patterns to overcome these limitations. For example, circular spots may be used in various laser patterns to remove material in a variety of shapes. In another example, an angled rectangular laser pattern (which may use an angled rectangular spot) may be used to remove material, especially where the device includes an edge that is at a non-right angle with respect to adjacent edges. In other embodiments, the pattern may be another non-rectangular spot pattern such as a polygonal or irregular pattern. In some implementations, these alternative patterns may be used to remove material from specific portions of a lite, for example at a corner area. By using angled/curved/other non-rectangular patterns, LED and BPE processes may be achieved without re-orienting and/or re-gripping for a wide variety of shapes.

Figure 27:
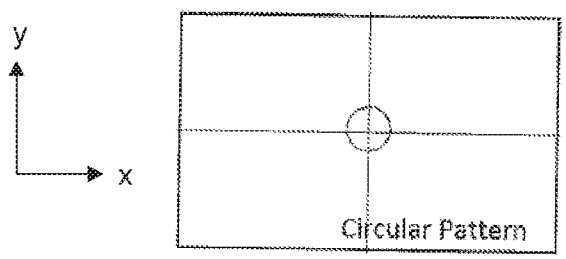
FIG. 27 depicts a single circular pattern that may be utilized in accordance with various embodiments.
Figure 28A:
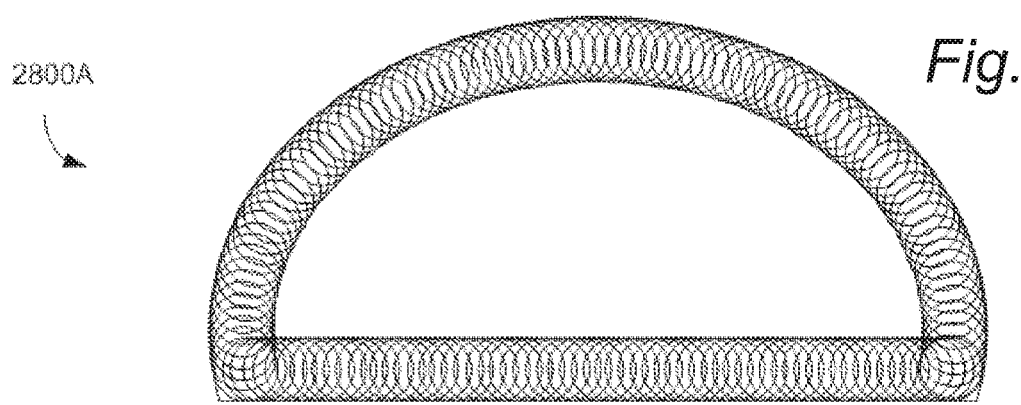
FIGS. 28A and 28B depict a semi-circular lite and two different combinations of patterns that may be used in accordance with certain embodiments.
Figure 28B:
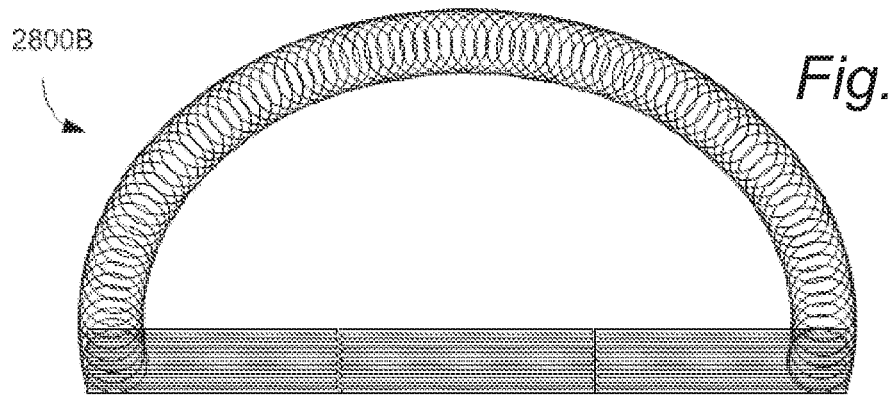

FIG. 27 illustrates a single circular spot of a pattern that can be used for performing LED and BPE operations. For example, this circular spot can be used in an overlapping circular pattern to remove material in nearly any shape. The tangent to the inner edge of the circle (i.e., the edge of the circle facing towards the center of the lite) will define the inner edge of the removal area. FIG. 28A shows an example of an overlapping circle pattern used to remove material from the edges of an arched lite 2800A. This figure is not drawn to scale, and is provided merely for the purpose of broadly illustrating overlapping circular patterns. In certain cases, the circles may overlap more substantially to remove more material as needed. In the illustrated embodiment, the entire laser pattern is made of overlapping circles. FIG. 28B shows another example of an arched lite 2800B. In this illustrated embodiment, both overlapping circular and rectangular patterns are used.

Figure 29:
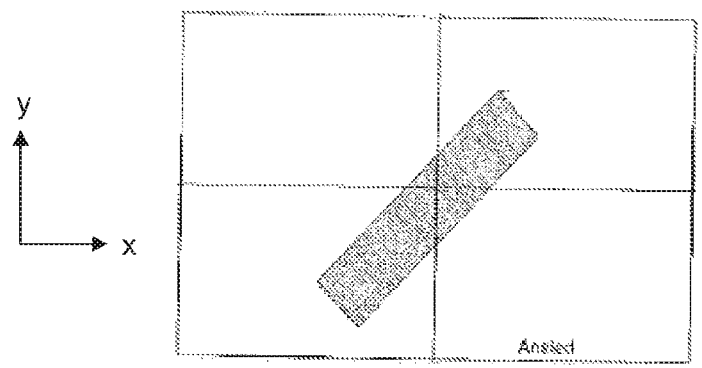
FIG. 29 shows a single angled pattern that may be utilized in accordance with certain embodiments herein.
Figure 30:
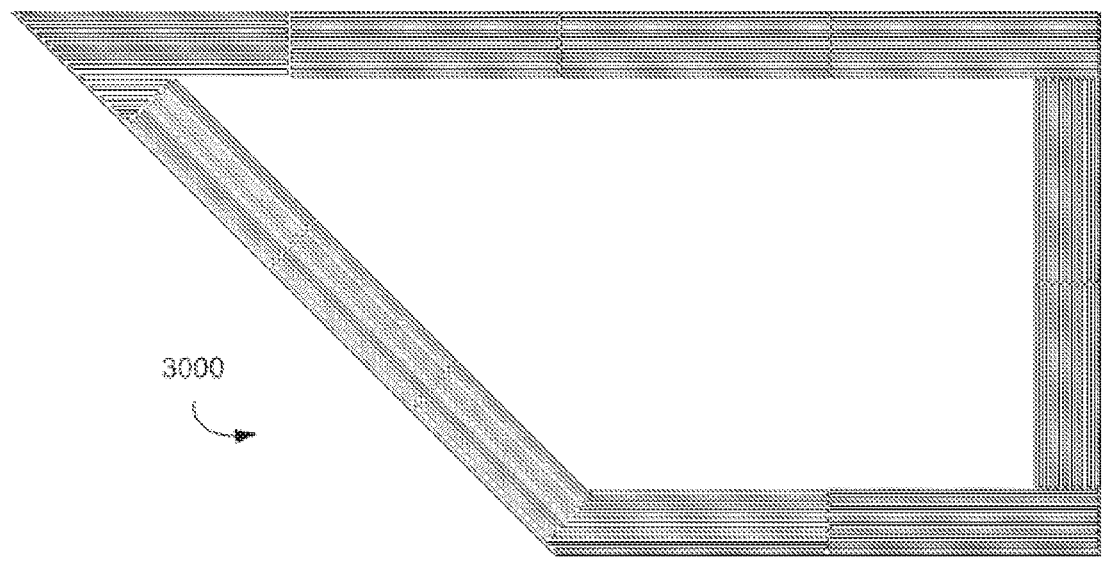
FIG. 30 illustrates a trapezoid shaped lite having angled and non-angled rectangular laser patterns in accordance with various embodiments.

FIG. 29 illustrates an angled rectangular pattern that may be used for LED and BPE operations. With an angled rectangular pattern, the laser is able to move in any linear direction along a defined angle. In other words, the laser is not limited to x- and y-directional movement that is typically used with a conventional laser tool using a non-angled rectangular pattern. In some cases, a rectangular spot is used that is defined along the angle. FIG. 30 depicts an implementation of both angled and non-angled rectangular laser patterns that may be used to remove material from the edges of the trapezoid shaped lite 3000.

Figure 31:
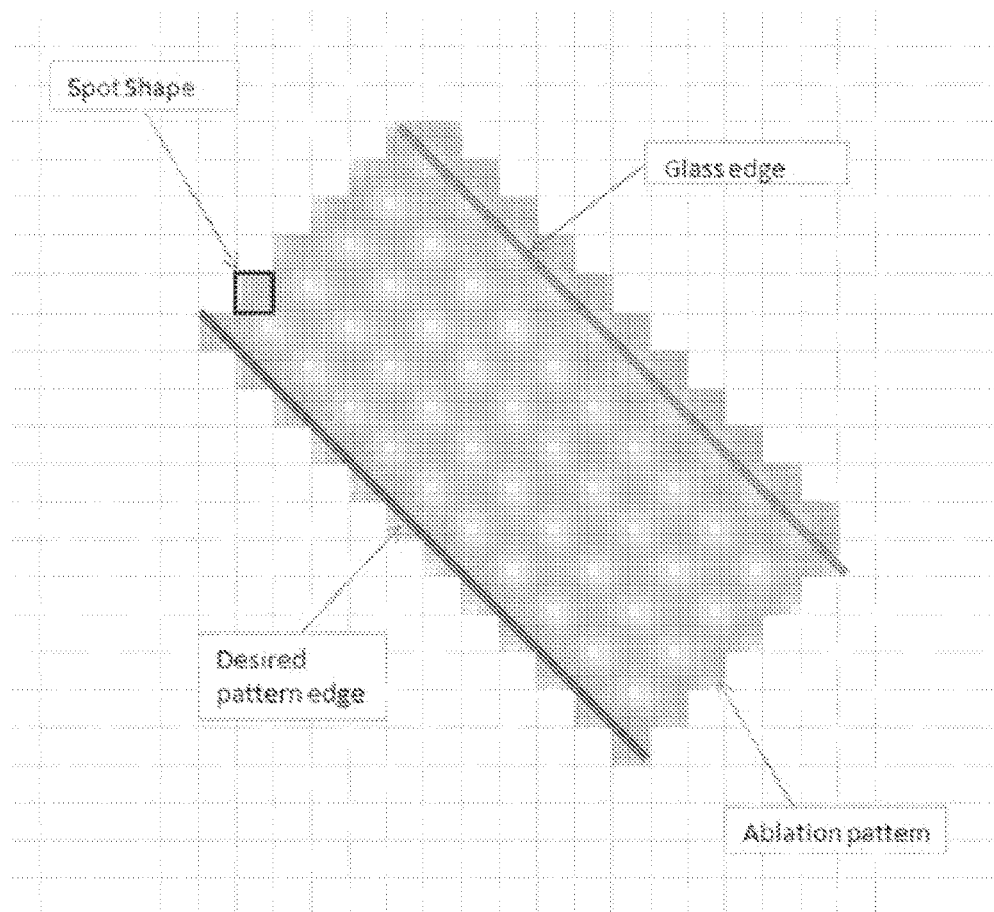
FIG. 31 depicts an ablation pattern having a saw-toothed edge.

The use of non-rectangular spots and patterns and angled laser patterns may be beneficial for several reasons. First, these alternative laser patterns may simplify the production process, as lites do not have to be reoriented during the LED/BPE operations. By avoiding manual reorientation, losses due to such handling are reduced or eliminated. Another advantage to using non-rectangular and/or angled laser patterns may be that they enable LED/BPE operations to be performed on curved shapes such as circles, semi-circles, ovals, etc. and polygonal shapes such as triangles, hexagons, octagons, trapezoids, etc. The techniques described herein permit optical devices of nearly any shape and size to be processed In some cases, the orientation of the spots/spot is controlled by rotating a fiber of the laser tool, and/or by passing the laser beam through rotatable prisms. Where a pattern is rotated but the spots defining the pattern are not rotated, the pattern may have a rough saw-tooth shaped edge, for example, as shown in FIG. 31. Here, the spot shape being used is a square, oriented as shown. The collection of spot shapes at different times define the ablation area. In the illustrated example, both the glass edge and the desired pattern edge are smooth. However, the actual ablation area does not follow the desired glass edge, because the spot shapes are not oriented at the same angle as the pattern. In this case, it is preferable to rotate the spot shape to an orientation that aligns with the pattern orientation, in order to achieve a smooth-edged ablation area.

Figure 32:
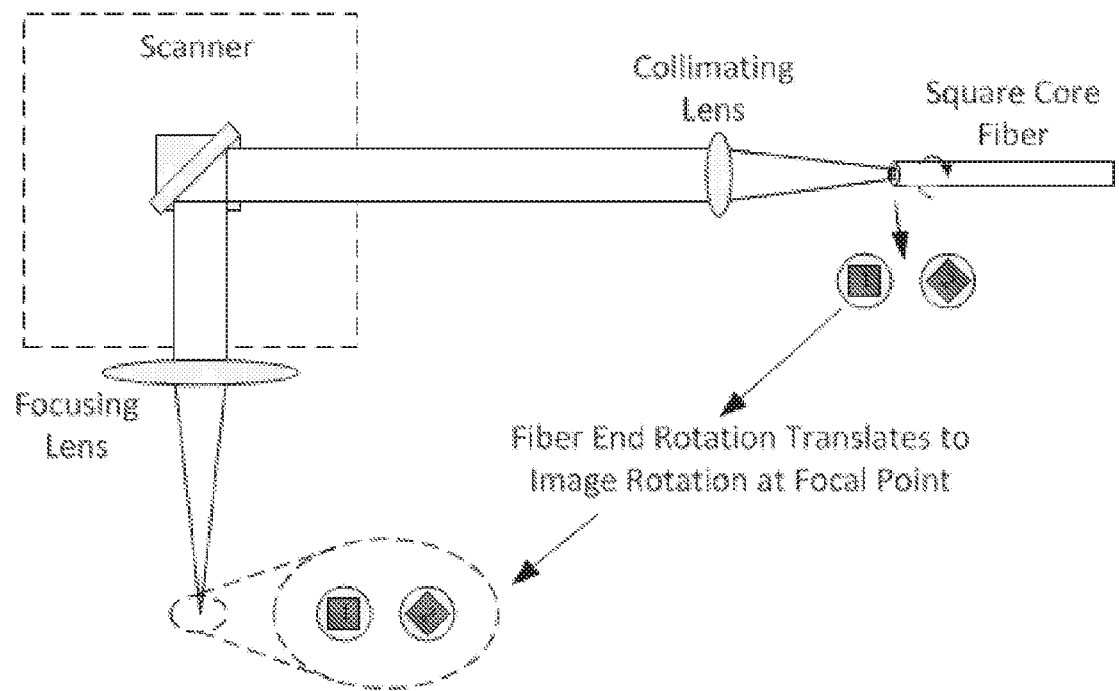
FIG. 32 shows an embodiment where fiber rotation is used to rotate the orientation of a pattern on a substrate.

FIG. 32 shows an embodiment illustrating how fiber rotation may be used to rotate the orientation of a spot on a substrate. In this example, the square spot shape is rotated 45 degrees from a first orientation to a second orientation where it appears as a diamond. The square spot shapes of the two orientations are the same, but they are oriented at different degrees. In the laser tool, a Gaussian beam may be launched into a square core fiber. The square fiber output may be "imaged" to a film surface through a relay lens setup. The scanner may be used to sweep the spot shape in the x- and/or y-direction on the substrate. By rotating the fiber at the input coupling, the square spot shape at a first orientation at the focal plane of the laser tool may be rotated to a second orientation.

Figure 33:
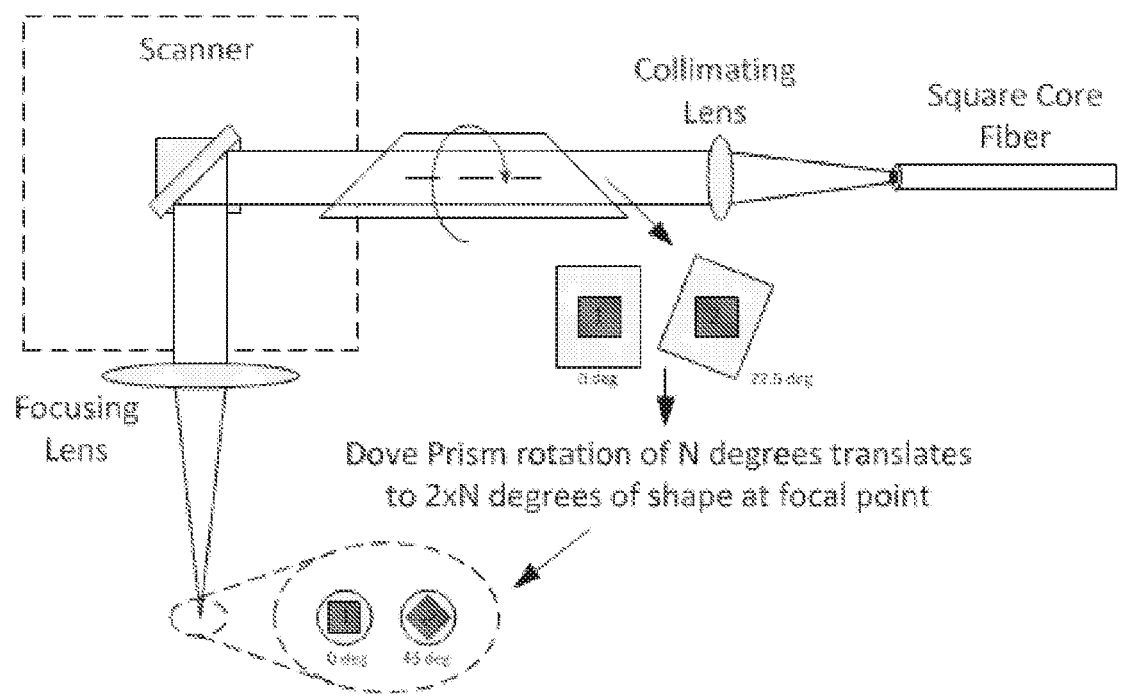
FIG. 33 shows an embodiment where prism rotation is used to rotate the orientation of a pattern on a substrate.

FIG. 33 depicts an embodiment which utilizes a dove prism to rotate the orientation of a spot shape. In this embodiment, a Gaussian beam is launched into a square core fiber. The square fiber output is "imaged" to a film surface through a relay lens setup. A dove prism may be inserted between a collimating lens and a scanner, in the region of the collimated beam. As the prism rotates, the orientation of the spot shape rotates at twice the rate of the prism rotation. In other words, for every N degrees of prism rotation, the spot shape rotates 2N degrees. In the embodiment shown in FIG.

33, for example, the prism rotates 22.5°, while the orientation of the square spot on the substrate rotates 45°.

Figure 34:
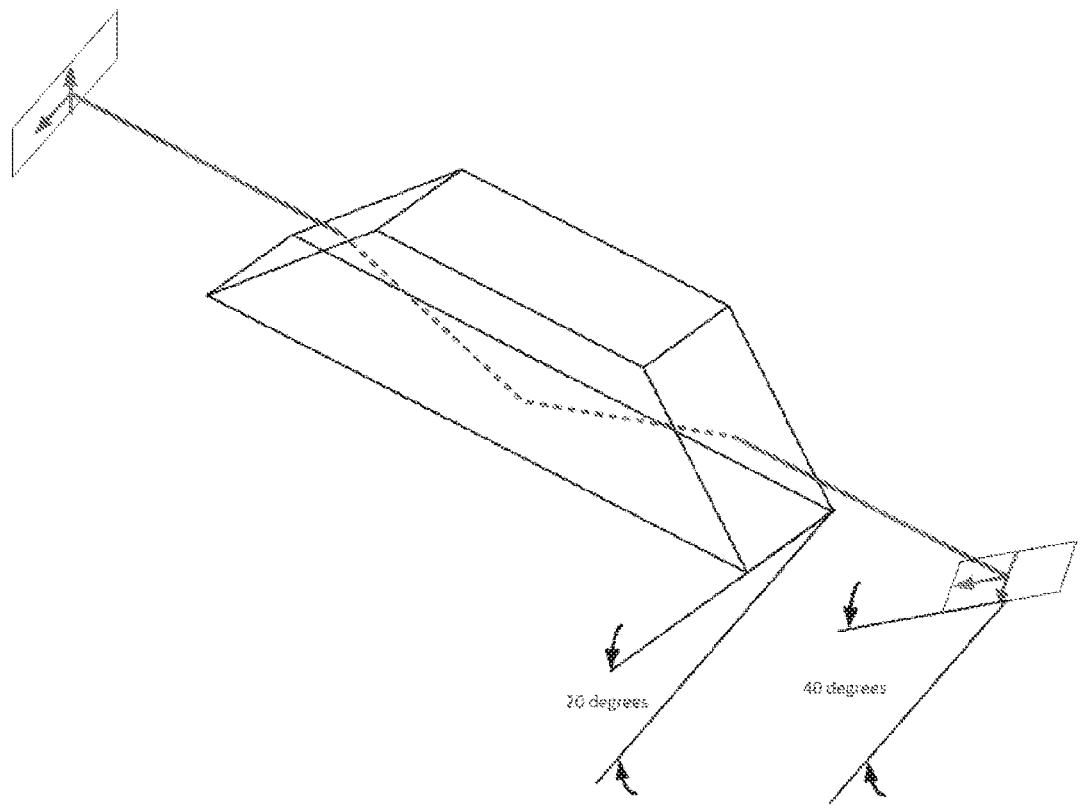
FIG. 34 shows an exemplary dove prism that may be used in accordance with certain embodiments.

FIG. 34 illustrates the function of the dove prism. This type of prism is a reflective prism that may be used to invert an image. Dove prisms are formed as truncated right-angle prisms. A beam of light that enters one of the sloped faces of the prism will undergo total internal reflection along the inside of the longest face of the prism (the bottom face, as shown in FIG. 34). The image emerges from the opposite sloped face, and is vertically flipped but not laterally transposed (as only a single reflection has taken place). When a dove prism is rotated along its longitudinal axis, the transmitted image rotates at twice the rate of prism rotation, as mentioned above. This property allows the dove prism to rotate the image by any desired angle. In the embodiment shown in FIG. 34, the prism is rotated by 20°, and the spot shape orientation is rotated by 40°.

Although described embodiments may have bus bar configurations having one bus bar (e.g., "Upper" bus bar) connected to an upper layer and another bus bar (e.g., "Lower" bus bar) connected to a lower layer, the bus bars may be alternatively connected to the opposite layers in other embodiments. In these other embodiments, the designs for the scribe lines and/or BPE layers and other features may be modified to accommodate this change to the connections to upper and lower layers.

Furthermore, although the devices the illustrated embodiments may have certain dimensions, other dimensions can be used.

Although the foregoing has been described in some detail to facilitate understanding, the described embodiments are to be considered illustrative and not limiting. It will be apparent to one of ordinary skill in the art that certain changes and modifications can be practiced within the scope of the description.

What is claimed is:

1. An optically switchable window comprising:
    a non-rectangular optically switchable device comprising a first side, a second side, opposing the first side, and a third side adjacent the second side;
    a first bus bar spanning a first portion of and along the first side of the non-rectangular optically switchable device; and
    a second bus bar spanning a second portion of and along the second side of the non-rectangular optically switchable device, and spanning a third portion of and along the third side;
    wherein the first bus bar and the second bus bar are configured to apply voltage to the non-rectangular optically switchable device, and
    wherein the second portion and the third portion of the second bus bar meet at a vertex located along a right angle corner of the non-rectangular optically switchable device.

2. The optically switchable window of claim 1, wherein the second portion has a length equal to about 0.60 times the length of the second side, and wherein the third portion has a length equal to about 0.60 times the length of the third side.

3. The optically switchable window of claim 1,
    wherein the second portion has a length that is between 0.40 and 0.80 times the length of the second side, and
    wherein the third portion has a length that is between 0.40 and 0.80 times the length of the third side.

4. The optically switchable window of claim 1,
    wherein the second portion has a length that is between 0.50 and 0.70 times the length of the second side, and
    wherein the third portion has a length that is between 0.50 and 0.70 times the length of the third side.

5. The optically switchable window of claim 1,
    wherein the second portion has a length of about the length of the second side, and
    wherein the third portion has a length that is between 0.03 and 0.40 times the length of the third side.

6. The optically switchable window of claim 1,
    wherein the second portion has a length of about the length of the second side, and
    wherein the third portion has a length of about 0.30 times the length of the third side.

7. The optically switchable window of claim 1,
    wherein the non-rectangular optically switchable device further comprises a fourth side adjacent to the first side, and
    wherein the third portion has a length that is between 1 inch and 10 inches.

8. The optically switchable window of claim 1,
    wherein the non-rectangular optically switchable device further comprises a fourth side adjacent to the first side,
    wherein the second portion has a length of about the length of the second side, and a fourth portion of and along the fourth side of the non-rectangular optically switchable device, and
    wherein the third portion has a length along the third side that is less than the length of the fourth portion.

9. The optically switchable window of claim 1,
    wherein the non-rectangular optically switchable device is an electrochromic device having a first conductive layer, a second conductive layer, and an electrochromic layer between the first and second conductive layers,
    wherein the first bus bar is electrically connected to the first conductive layer, and
    wherein the second bus bar is electrically connected to the second conductive layer.

10. An optically switchable window comprising:
    a non-rectangular optically switchable device comprising a first side, a second side, opposing the first side, and a third side adjacent the second side;
    a first bus bar spanning a first portion of and along the first side of the non-rectangular optically switchable device; and
    a second bus bar spanning a second portion of and along the second side of the non-rectangular optically switchable device, and spanning a third portion of and along the third side;
    wherein the first bus bar and the second bus bar are configured to apply voltage to the non-rectangular optically switchable device;
    wherein the first bus bar and the second bus bar are configured such that a difference between a first distance and a second distance is less than about 15 inches or about 20 inches,
    wherein the first distance is a sum of (i) a maximum distance between the first bus bar and a centroid of the non-rectangular optically switchable device and (ii) a maximum distance between the second bus bar and the centroid of the non-rectangular optically switchable device, and
    wherein the second distance is a minimum distance between the first bus bar and the second bus bar.

11. The optically switchable window of claim 10, wherein the non-rectangular optically switchable device is one of an arch-shaped device, a polygon-shaped device, a circle-shaped device, a semi-circle-shaped device, and an oval-shaped device.

12. The optically switchable window of claim 10, wherein the non-rectangular optically switchable device is one of a triangle-shaped device, a hexagon-shaped device, an octagon-shaped device, and a trapezoid-shaped device.

13. The optically switchable window of claim 10, wherein the first portion of the second side has a length equal to 0.60 times the length of the second side.

14. The optically switchable window of claim 10,
wherein the non-rectangular optically switchable device is an electrochromic device having a first conductive layer, a second conductive layer, and an electrochromic layer between the first and second conductive layers,
wherein the first bus bar is electrically connected to the first conductive layer, and
wherein the second bus bar is electrically connected to the second conductive layer.

15. The optically switchable window of claim 1, wherein the non-rectangular optically switchable device is a triangle-shaped device.

* * * * *